(12) United States Patent
Vossoughi et al.

(10) Patent No.: US 11,978,285 B2
(45) Date of Patent: May 7, 2024

(54) TECHNIQUES FOR VEHICLE PARKING MANAGEMENT AND INVITATION-BASED PERMITTING

(71) Applicant: CITIFYD, INC., Portland, OR (US)

(72) Inventors: Sohrab Vossoughi, Portland, OR (US); Gabriel Lopes, Florianópolis (BR); Massoud Mollaghaffari, Tigard, OR (US); Igor Cornelio Lira, Portland, OR (US); Guilherme Henrique Sehn, Santa Cruz do Sul (BR)

( * ) Notice: Subject to any disclaimer, the term of this patent is extended or adjusted under 35 U.S.C. 154(b) by 156 days.

(21) Appl. No.: 17/804,875

(22) Filed: Jun. 1, 2022

(65) Prior Publication Data

US 2022/0392271 A1 Dec. 8, 2022

Related U.S. Application Data

(60) Provisional application No. 63/196,104, filed on Jun. 2, 2021.

(51) Int. Cl.
*G07B 15/06* (2011.01)
*G06Q 10/02* (2012.01)
(Continued)

(52) U.S. Cl.
CPC ........... *G07B 15/063* (2013.01); *G06Q 10/02* (2013.01); *G06Q 20/208* (2013.01); *G06Q 20/325* (2013.01); *G06Q 20/3276* (2013.01); *G06Q 20/3278* (2013.01); *G06Q 20/4016* (2013.01); *G06T 7/70* (2017.01); *G06V 10/141* (2022.01);
(Continued)

(58) Field of Classification Search
CPC ...... G07B 15/063; G07B 15/04; G07B 15/02; G06Q 10/02; G06Q 20/208; G06Q 20/325; G06Q 20/3276; G06Q 20/3278; G06Q 20/4016; G06Q 2240/00; G06Q 20/127; G06Q 20/202; G06T 7/70; G06T 2207/30242; G06T 2207/30252; G06V 10/141; G06V 20/54; G06V 2201/08; G06V 10/82; G06V 20/52; G08G 1/042; G08G 1/056; G08G 1/146; G08G 1/148; G07F 17/24

See application file for complete search history.

(56) References Cited

U.S. PATENT DOCUMENTS

2017/0358208 A1\* 12/2017 Kazemi .................. G08G 1/144

\* cited by examiner

*Primary Examiner* — Daryl C Pope
(74) *Attorney, Agent, or Firm* — Stoel Rives LLP

(57) ABSTRACT

A parking management system identifies vehicles in entrance lanes, exit lanes, or both, of a parking facility and provides a real-time vehicle inventory count. One or more beacons locate point of sale (POS) devices assigned to parking attendants to determine which of them are performing vehicle transactions. Vehicles can be associated with specific transactions, as well as the transaction-authorizing attendant and the barrier gate and vehicle travel lane to which the attendant is assigned. To reduce fraud, this transaction information can be monitored in real time by a web or mobile dashboard and analyzed in real time or upon attendant end-of-shift checkout. The parking management system also implements permit parking invitation techniques that provide registration, payment in advance or on demand, or both, for parking of an invitee's vehicle. These tasks are accomplished without an inviter's knowledge about the invitee, the invitee's vehicle, or both.

22 Claims, 61 Drawing Sheets

(51) Int. Cl.
*G06Q 20/20* (2012.01)
*G06Q 20/32* (2012.01)
*G06Q 20/40* (2012.01)
*G06T 7/70* (2017.01)
*G06V 10/141* (2022.01)
*G06V 20/54* (2022.01)
*G08G 1/042* (2006.01)
*G08G 1/056* (2006.01)
*G08G 1/14* (2006.01)

(52) U.S. Cl.
CPC ............. *G06V 20/54* (2022.01); *G08G 1/042* (2013.01); *G08G 1/056* (2013.01); *G08G 1/146* (2013.01); *G08G 1/148* (2013.01); *G06Q 2240/00* (2013.01); *G06T 2207/30242* (2013.01); *G06T 2207/30252* (2013.01); *G06V 2201/08* (2022.01)

Communication/Activation
Device (Portable Display)

Ingress – Vehicles Entering Parking Area

1. Directional antenna limits reception of Bluetooth signal to vehicle nearest the Beacon.
2. Antenna ideally positioned to provide line-of-sight into vehicle.

Egress – Vehicles Exiting Parking Area

1. Second beacon, at rear of parking kiosk or gate, provides exit monitoring.

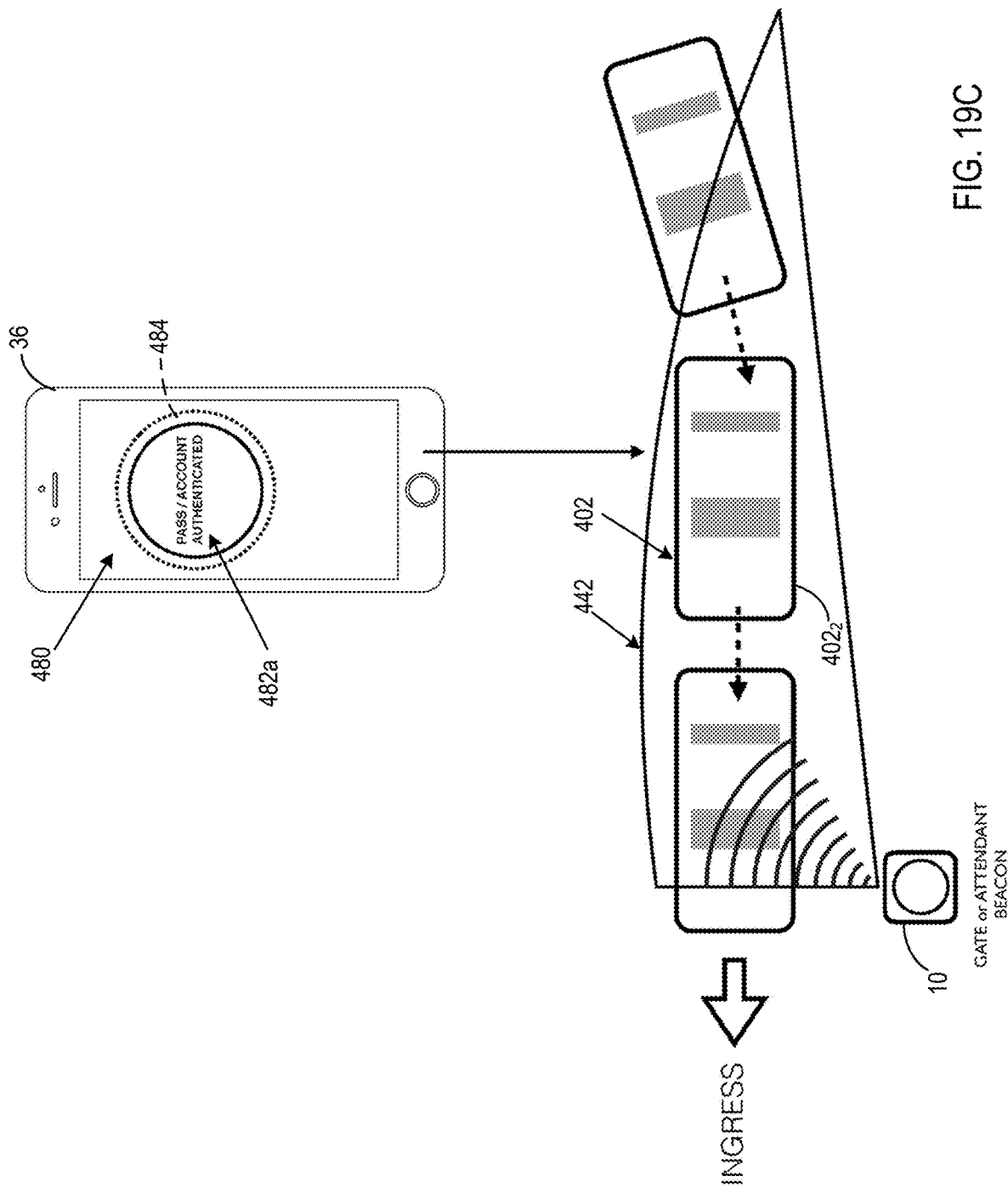

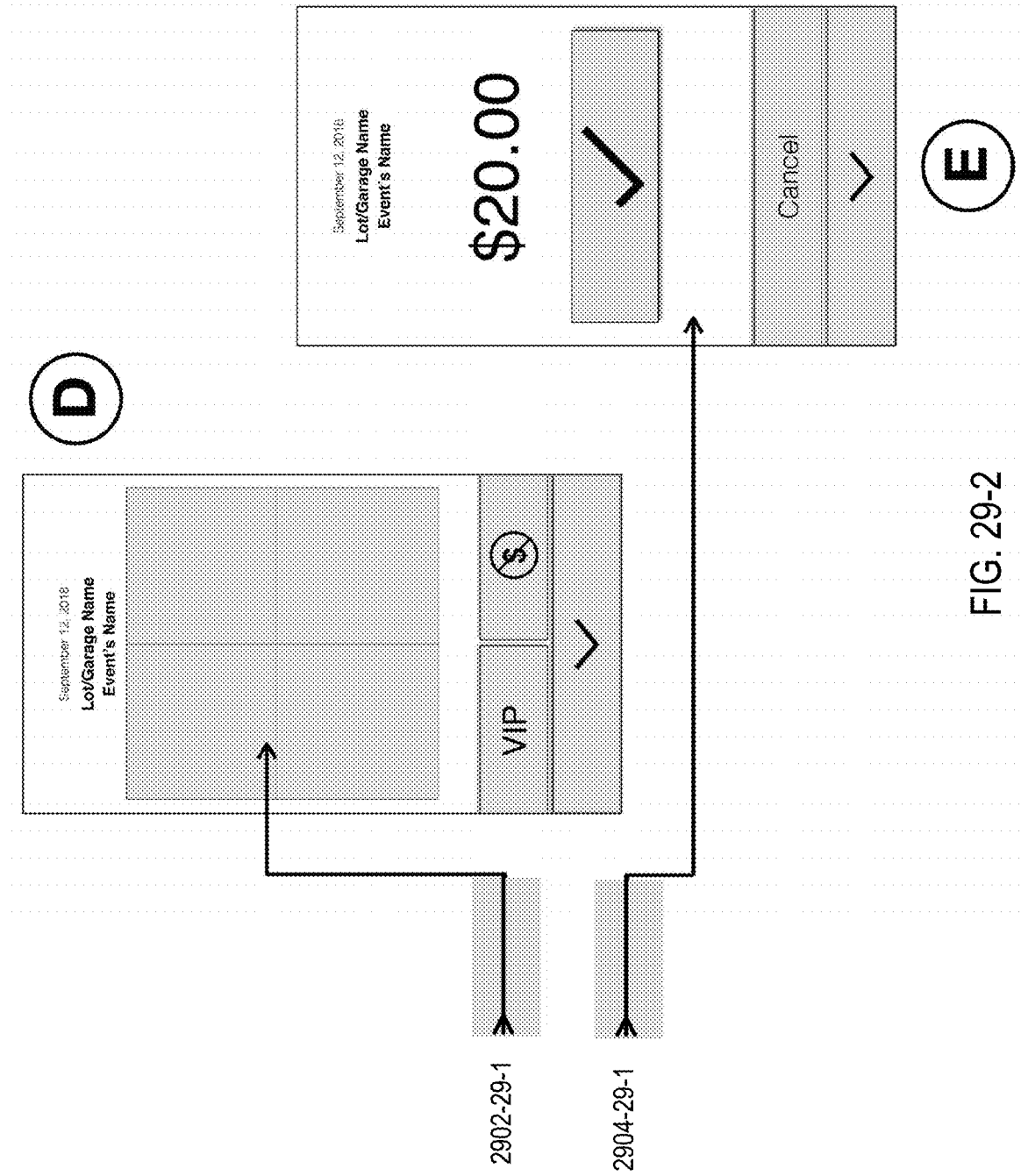

TECHNIQUES FOR VEHICLE PARKING MANAGEMENT AND INVITATION-BASED PERMITTING

COPYRIGHT NOTICE

© 2022 Citifyd, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application relates to parking management technology, and in particular, parking management systems that monitor vehicles entering and exiting parking lots or garages and associate point of sale devices that process vehicle transactions with respective vehicles. This application also relates to technology that grants parking permits to customers.

SUMMARY OF THE DISCLOSURE

A preferred parking management system is configured to identify vehicles in one or both of entrance and exit lanes of a parking facility and provide a real-time vehicle inventory count for the location. Further, the system using one or more beacons is configured to locate point of sale (POS) devices assigned to particular parking attendants so as to determine which attendant is performing vehicle transactions. Accordingly, vehicles can be associated with specific transactions (or the lack of transactions), as well as the attendant who authorized the transaction (or lack thereof) and the barrier gate and vehicle travel lane to which the attendant is assigned. To reduce fraud, this information can be monitored in real time by a web or mobile dashboard and analyzed in real time or checkout at the end of the attendant's shift. For example, the information can inform of discrepancies in the attendant's performance and the amount of cash needed to be delivered by the attendant when a shift ends.

The system can also aid in directing personnel during management of a parking facility. For example, by analyzing one or both of entrance and exit load factors at parking gates or lanes and knowing the number and identities of attendants at locations of a parking facility, an operator can determine and manage changes in operation caused by unplanned circumstances and reassign, add, or remove attendants to optimize the operation and cost.

Another aspect of the disclosure relates to parking permit registration. For example, a system allows the modification of permit information, such as driver or vehicle information, up to the time when a parking session is to begin. This system is advantageous in situations where a parking permit is required in advance of a parking session, but the identity of the vehicle that will be used for the parking session is not known at the time of application for the permit.

Additional aspects and advantages will be apparent from the following detailed description of preferred embodiments, which proceeds with reference to the accompanying drawings.

BRIEF DESCRIPTION OF THE DRAWINGS

FIGS. 9-1 and 9-2 form an annotated flow diagram outlining and describing the process steps performed in the operation of the disclosed parking and mass transport beacon system in the case of a transit system passenger or rider entering into and exiting from a mass transit vehicle.

FIGS. 10-1 and 10-2 form an annotated flow diagram outlining and describing the process steps performed in the operation of the disclosed parking and mass transport beacon system in the case of a vehicle driver entering into and exiting from a gated parking facility having a beacon attached to a barrier gate.

FIGS. 19A, 19B, 19C, 19D, and 19E are pictorial diagrams presenting different processing stages in the implementation of a method of achieving accurate authorization of a vehicle approaching a parking garage or surface lot entrance or exit location.

FIGS. 20-1, 20-2, 20-3, and 20-4 are annotated screenshots of a parking attendant's hand-held device that show the functions performed by a monitoring App operating on a parking attendant's hand-held device in cooperation with a backend server in carrying out parking facility management activities.

FIGS. 26-1, 26-2, 26-3, and 26-4 are pictorial diagrams illustrating techniques for detecting vehicles entering or exiting a parking area.

FIGS. 27-1, 27-2, and 27-3 form an annotated flow diagram outlining and describing the process steps performed with use of a vision system configured to track vehicles in a region of interest of a vehicle travel lane to execute vehicle parking transaction matching of point of sale (POS) verification to a vehicle at a barrier to a parking area.

FIGS. 28-1, 28-2, and 28-3 form an annotated flow diagram outlining and describing the process steps performed with use of a vision system configured to track vehicles crossing multiple regions of interest (i.e., rows of vehicles) of a vehicle travel lane to execute vehicle parking transaction matching of POS verification to multiple vehicles approaching a barrier to a parking area.

FIGS. 29-1, 29-2, 29-3, and 29-4 are annotated screenshots of a parking attendant's point of sale (POS) device that show the functions performed by an App operating on the device.

FIGS. 31-1, 31-2, and 31-3 show a detailed annotated flow diagram showing further details of the parking permit invitation and registration process of FIG. 30.

DETAILED DESCRIPTION OF PREFERRED EMBODIMENTS

Figure 1A:
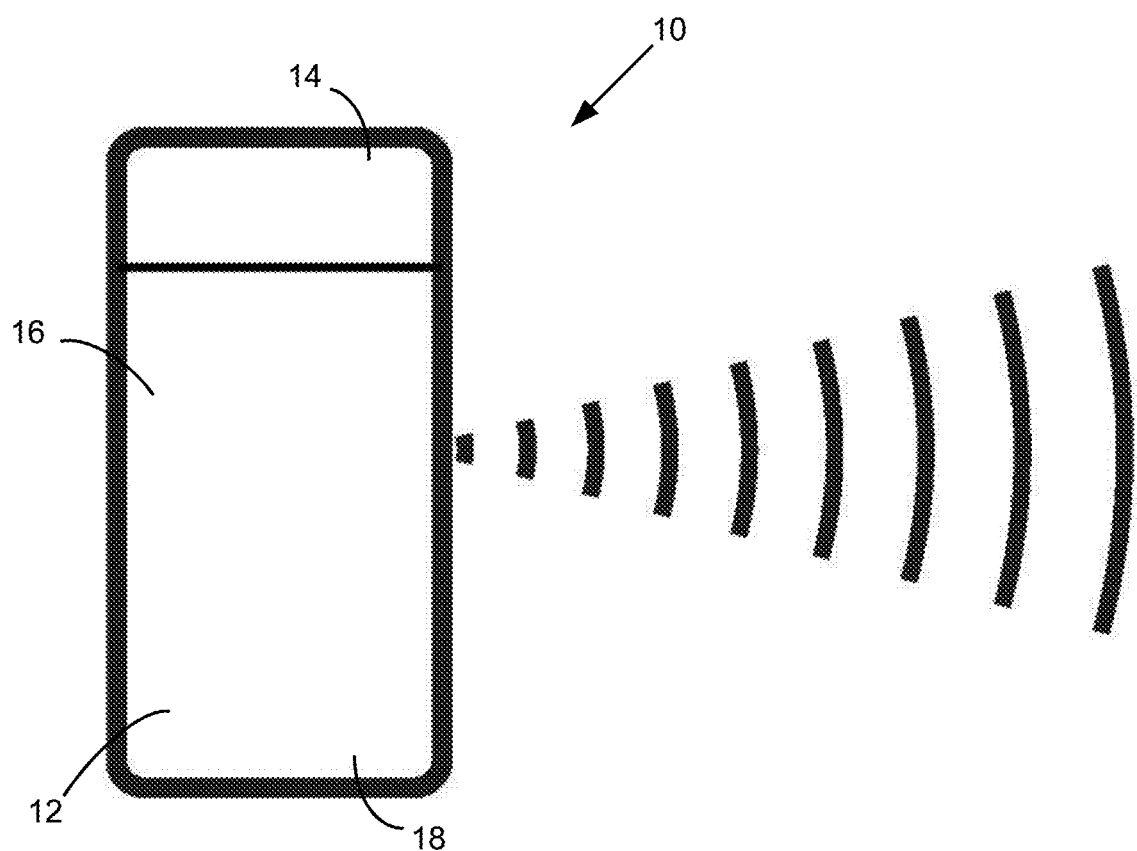
FIGS. 1A, 1B, and 10 are, respectively, a simplified pictorial diagram, a component block diagram, and a software/hardware stack diagram of a source beacon of the present disclosure.
Figure 1C:
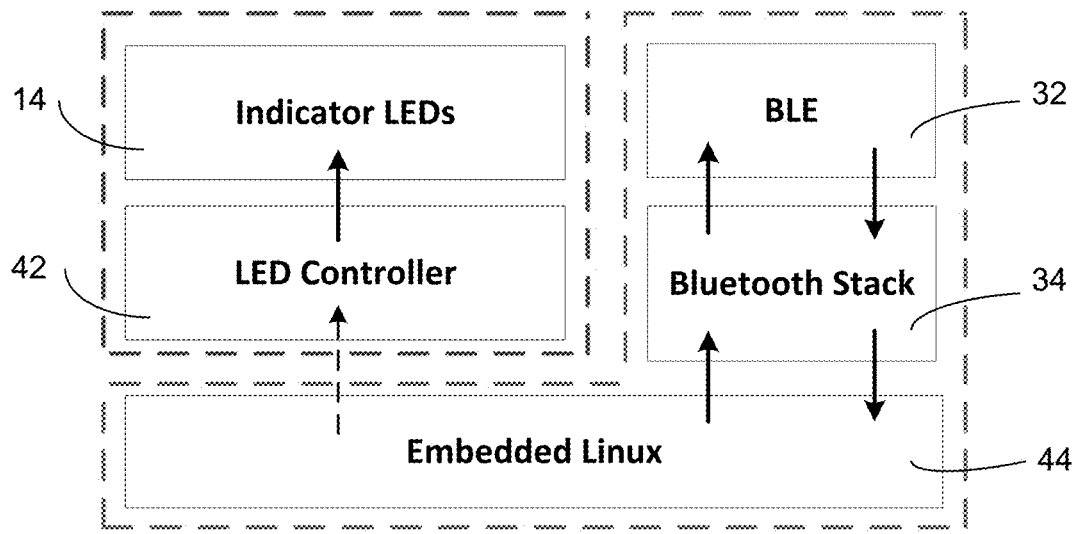
FIGS. 3A-1 and 3A-2, 3B-1 and 3B-2, and 3C are flow diagrams outlining the process steps performed cooperatively by the source beacon and a user smart device in initiating the start and the end of a vehicle parking or mass transit travel transaction session.
Figure 1B:
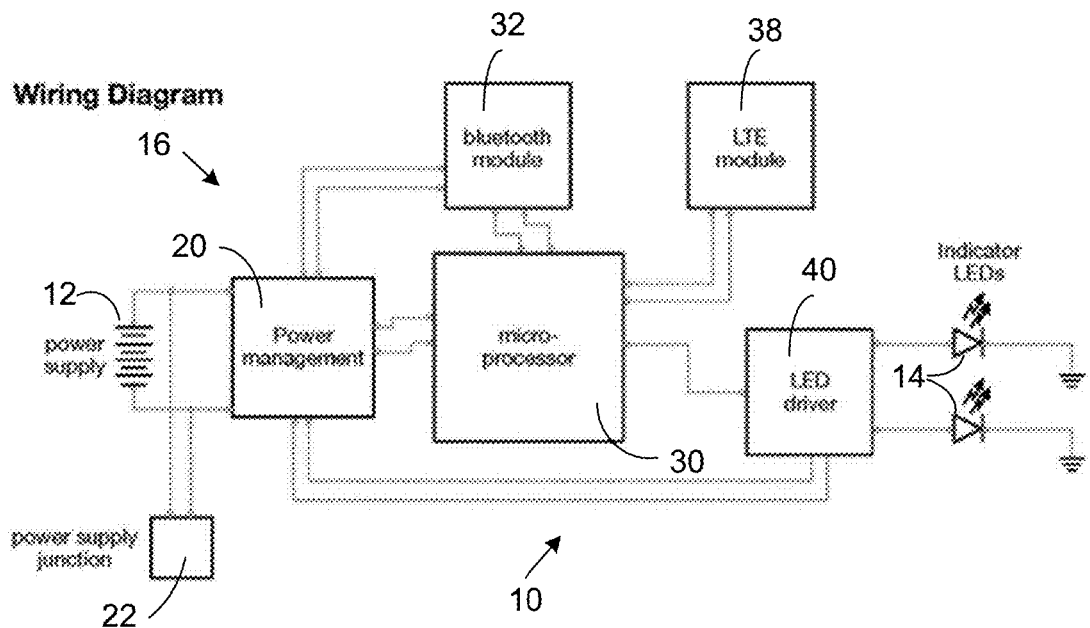
Figures 1, 10:
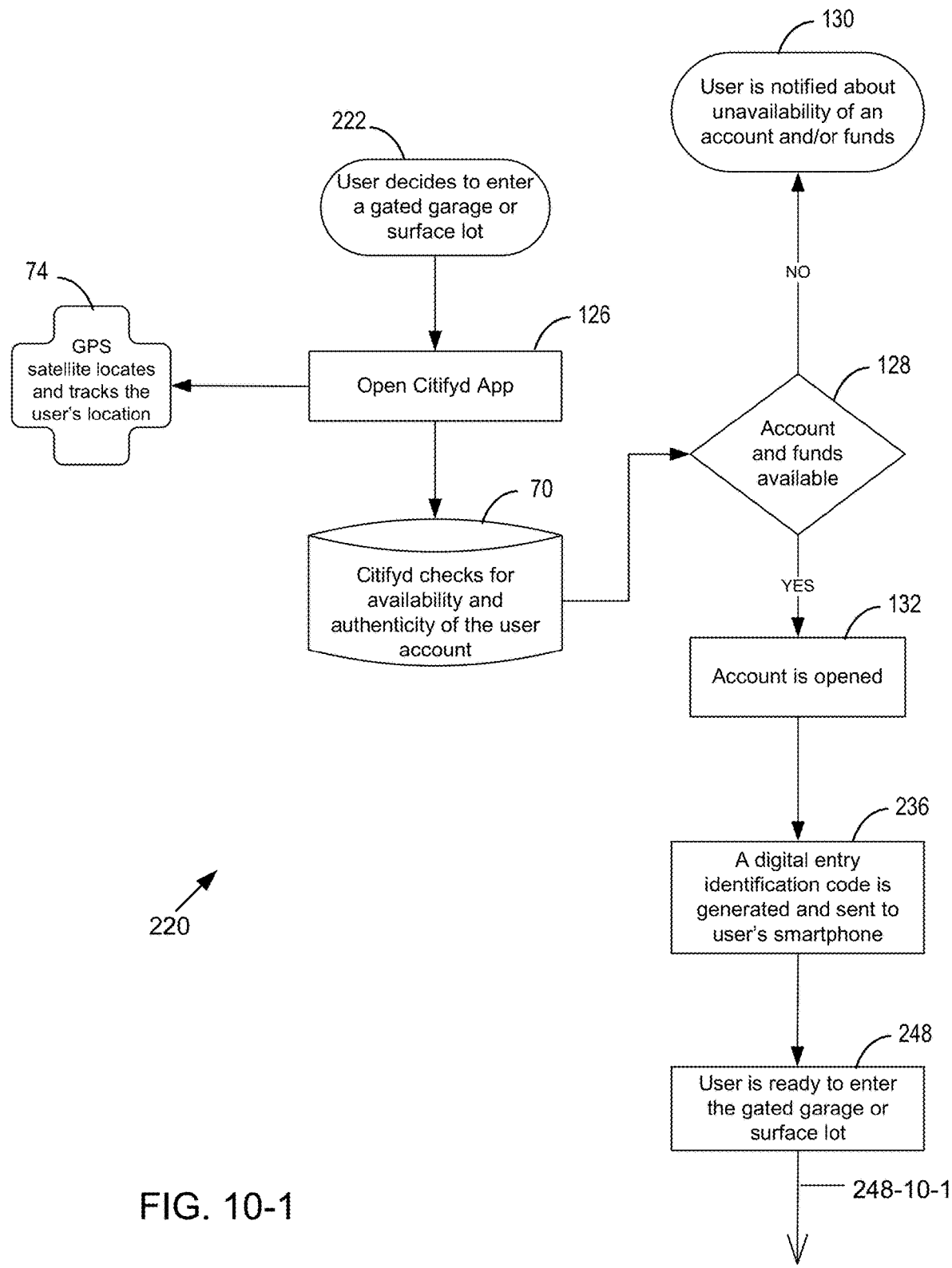
Figures 2, 10:
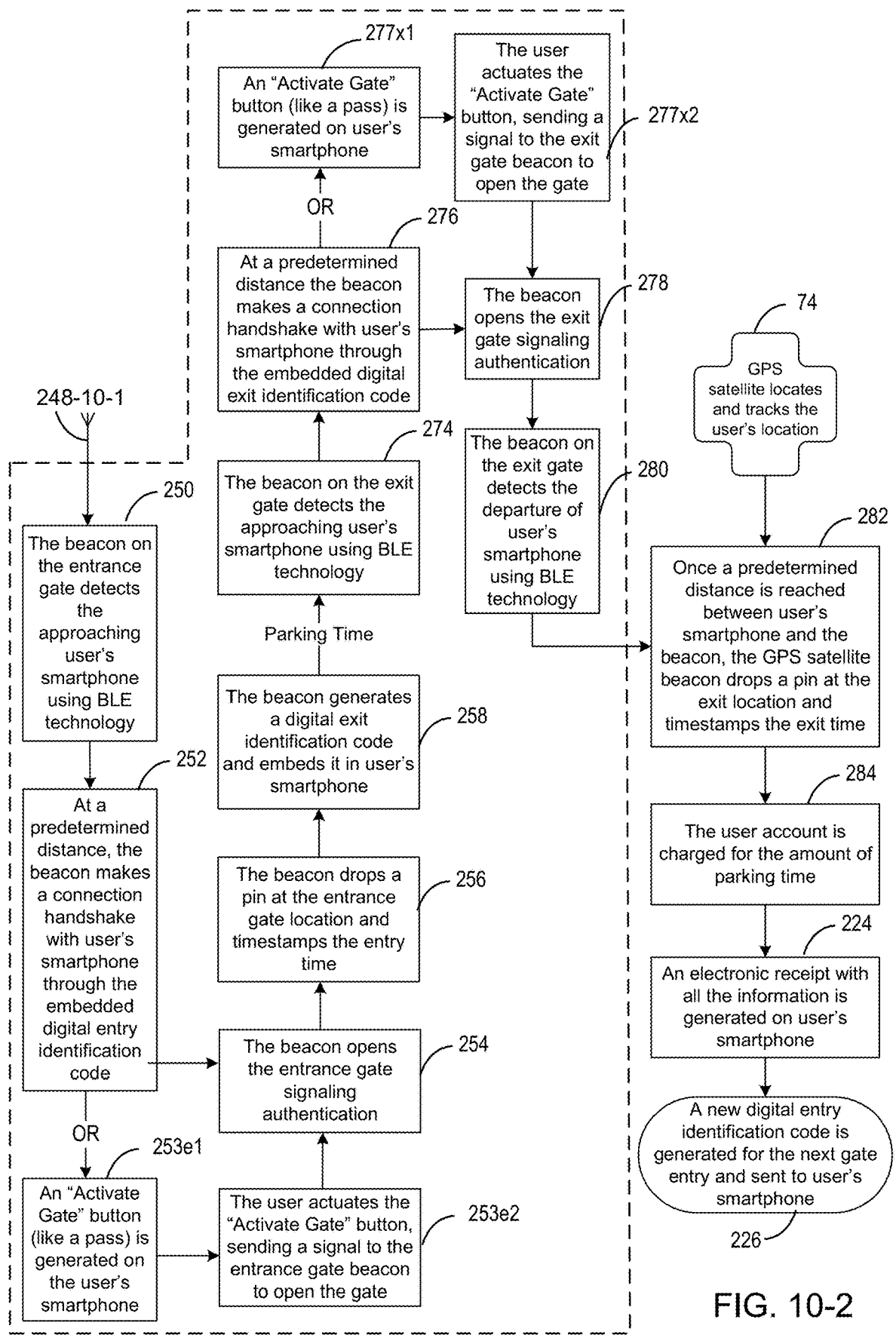

FIGS. 1A, 1B, and 10 are, respectively, a simplified pictorial diagram, a component block diagram, and a software/hardware stack diagram of a source beacon 10 of the present disclosure.

With reference to FIG. 1A, beacon 10 is a small self-contained device with a power supply 12, light-emitting diode (LED) indicator lights 14, and electronic components 16 housed in a durable watertight housing 18.

Figure 4:
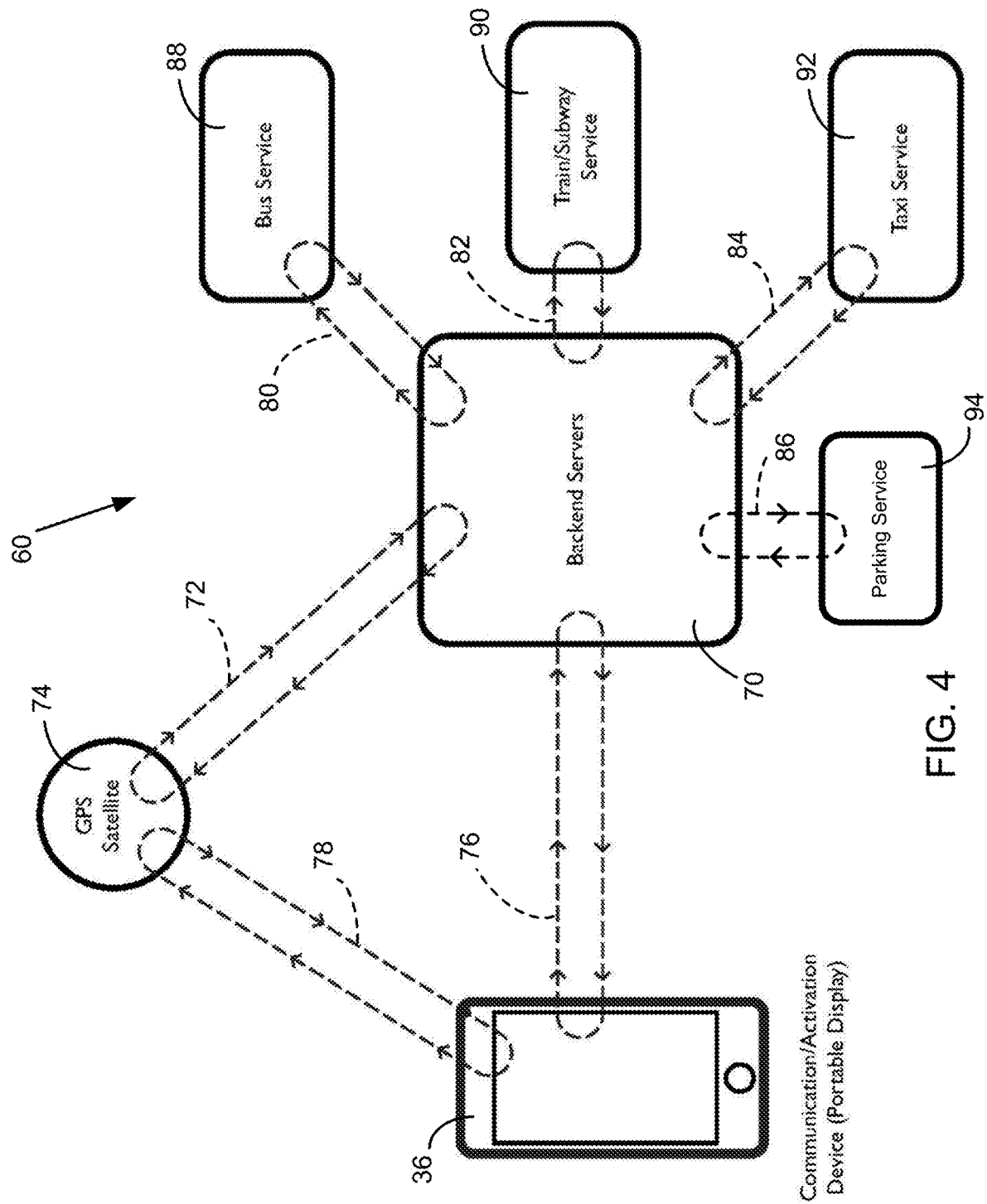
FIG. 4 is a system block diagram showing, with the source beacon of FIGS. 1A, 1B, and 10 removed, the configuration and communication links between different components included in the group of main components of a parking and mass transport beacon system of the present disclosure.
Figure 5:
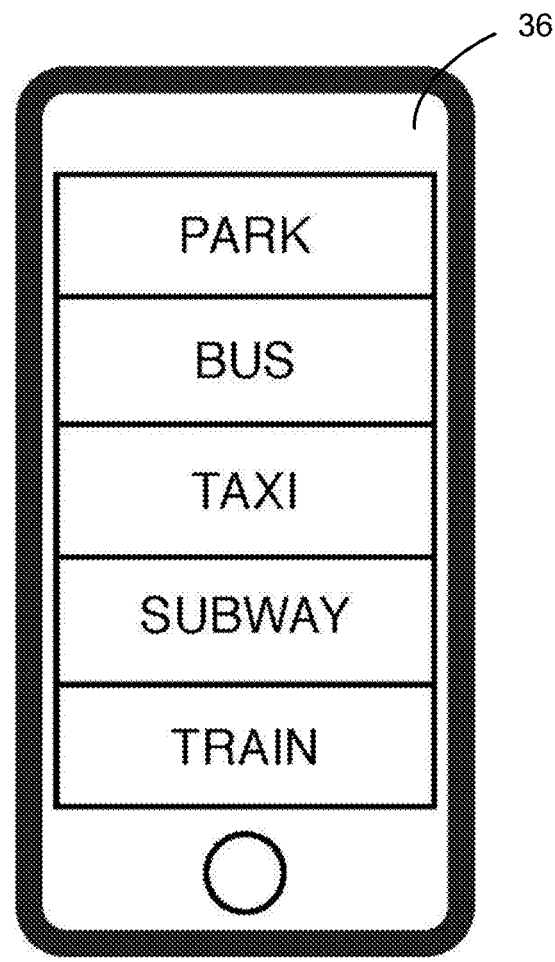
FIG. 5 is a diagram of an on-screen smartphone menu display of parking or mode of transportation activities from which a customer can select during operation of the disclosed parking and mass transport beacon system.

With reference to FIGS. 1B and 10, beacon 10 includes a lithium polymer (LiPo) rechargeable battery functioning as power supply 12 that is connected to a power management module 20. Beacon 10, implemented with the information transfer capabilities described below, is sometimes referred to herein as SmartBeacon device. Power management module 20 delivers appropriate voltages for application to the several electronic components 16 contained in housing 18. A power supply junction 22 provides external power supply access to beacon 10. A microprocessor 30 controls the operation of a wireless connection interface module 32, which is wireless communication circuitry using a wireless communication protocol to produce a short-range wireless radio signal (e.g., Bluetooth®, Zigbee®, or Near Field Communication (NFC) wireless communication technologies). In the embodiments described, a multiprotocol system on a chip (SoC) such as an nRF51822 Bluetooth® Smart (also called Bluetooth® low energy or BLE) and 2.4 GHz SoC having an embedded 2.4 GHz transceiver constitutes a Bluetooth® signal interface module 32 that receives program instructions from a Bluetooth® protocol stack 34 for short range communication with a customer smart device 36 such as a smartphone (FIG. 4). Microprocessor 30 also controls the operation of a long-term evolution (LTE) module 38 implementing a standard for wireless communication of high-speed data transfer for mobile devices and data terminals. An LED driver 40 applies, in response to an LED controller 42, voltages to red, green, blue (RGB) LED indicator lights 14 providing visual status information about the operation of beacon 10. An embedded Linux operating system software module 44 provides program instructions to microprocessor 30 to control the operation of beacon 10, including LED controller 42 and Bluetooth® protocol stack 34.

Figure 2A:
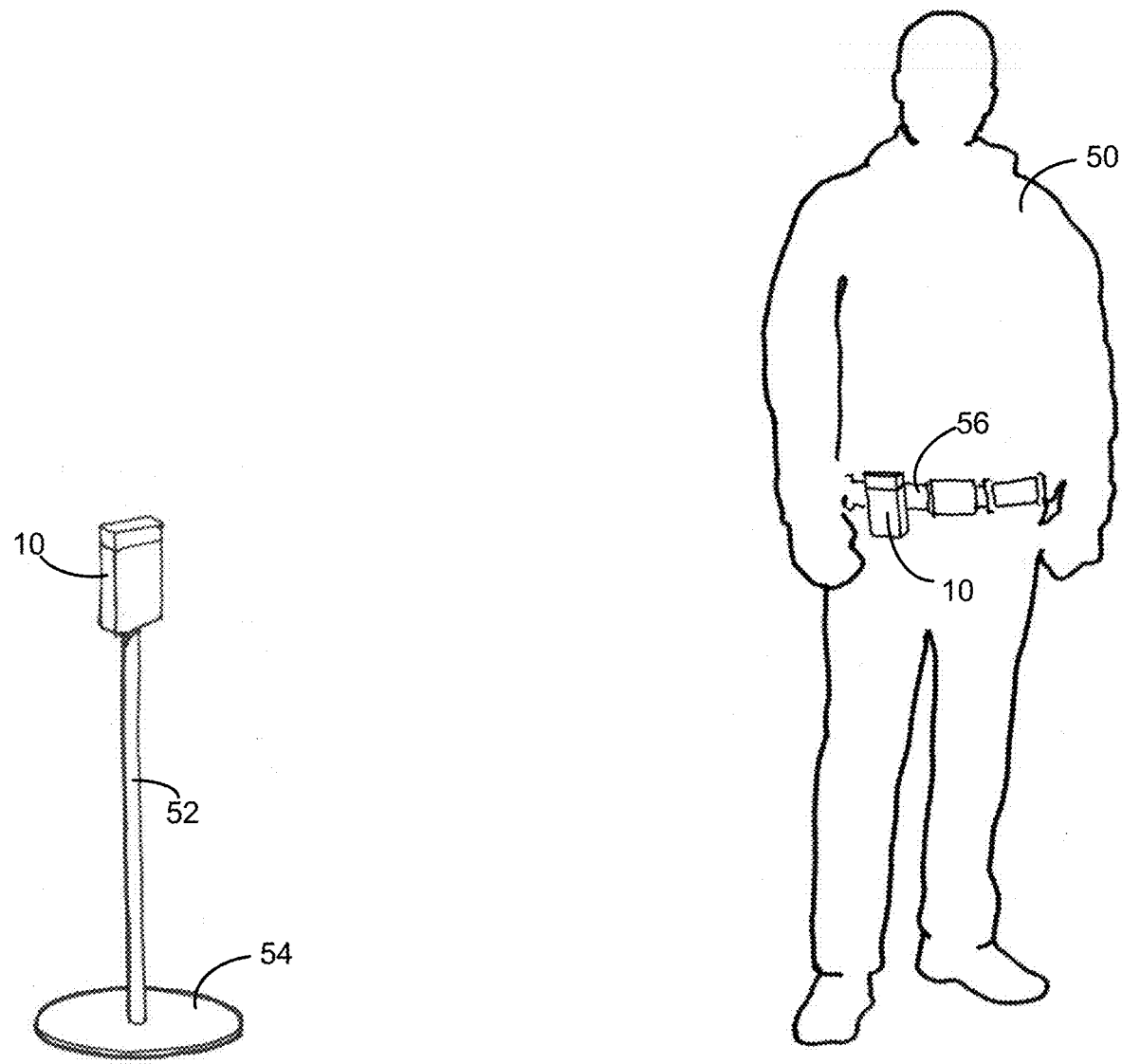
FIG. 2A is a diagram showing a source beacon mounted on top of a pole supported on a floor base or mounted on a waist belt worn by an attendant (e.g., an operator/agent)
Figure 2B:
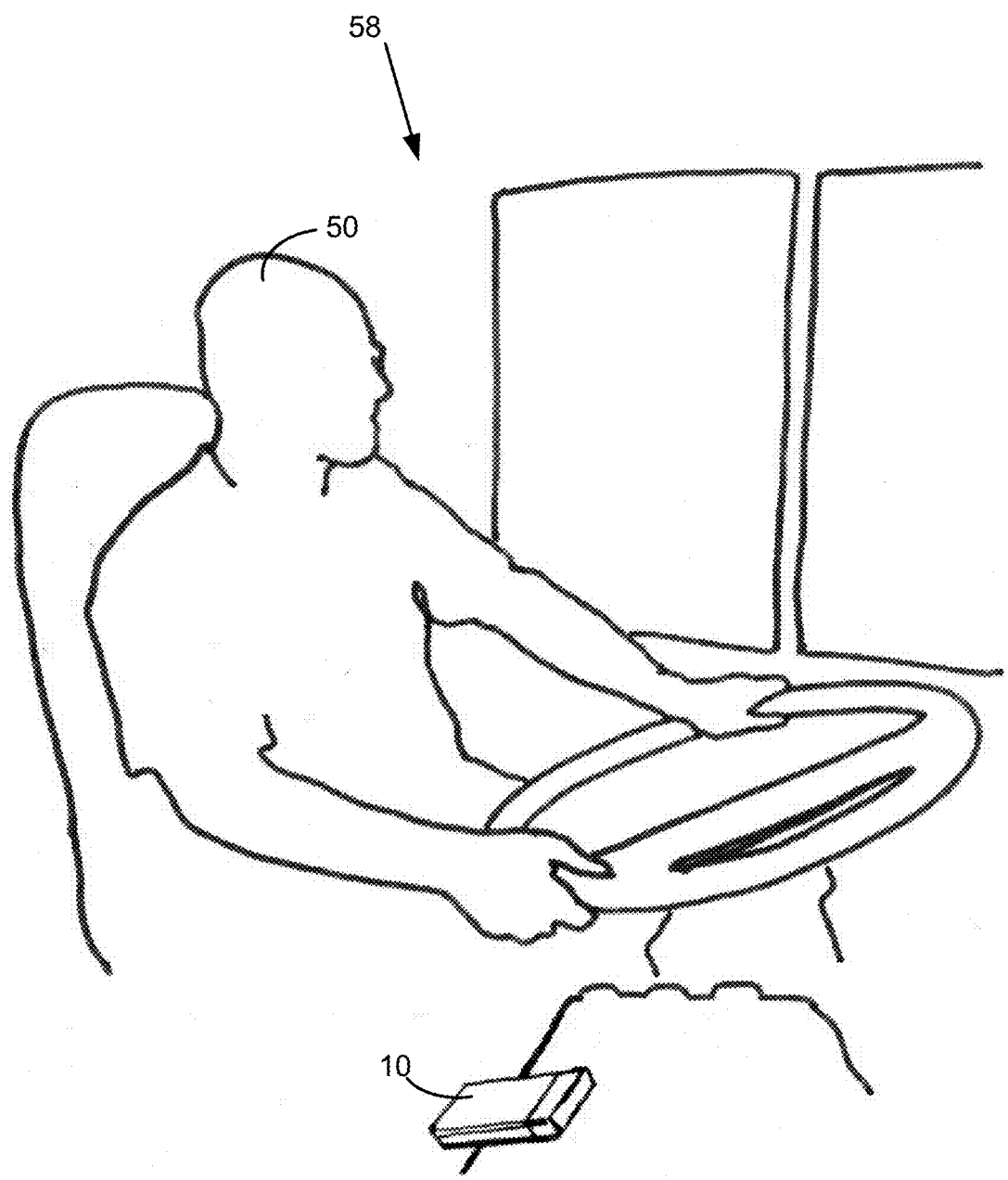
FIG. 2B is a diagram showing a source beacon placed in a mass transit vehicle cab.

FIGS. 2A and 2B show that beacon 10 can be worn by an operator/agent 50 or attached to many surfaces of and locations in a vehicle parking or mass transit service facility. FIG. 2A shows beacon 10 that is mounted on top of a pole 52 supported on a floor base 54 or that is attached to a waist belt 56 worn by a vehicle driver, vehicle operator, system agent, or system attendant (hereafter, driver/attendant) 50, allowing mobility and outdoor usage. Beacon 10 can be mounted also on a wall or other fixed structure. FIG. 2B shows beacon 10 placed in a transit vehicle 58, such as a bus, taxi, ferry, or train, at a location close to an entry or exit door of the vehicle.

Figures 1, 3A:
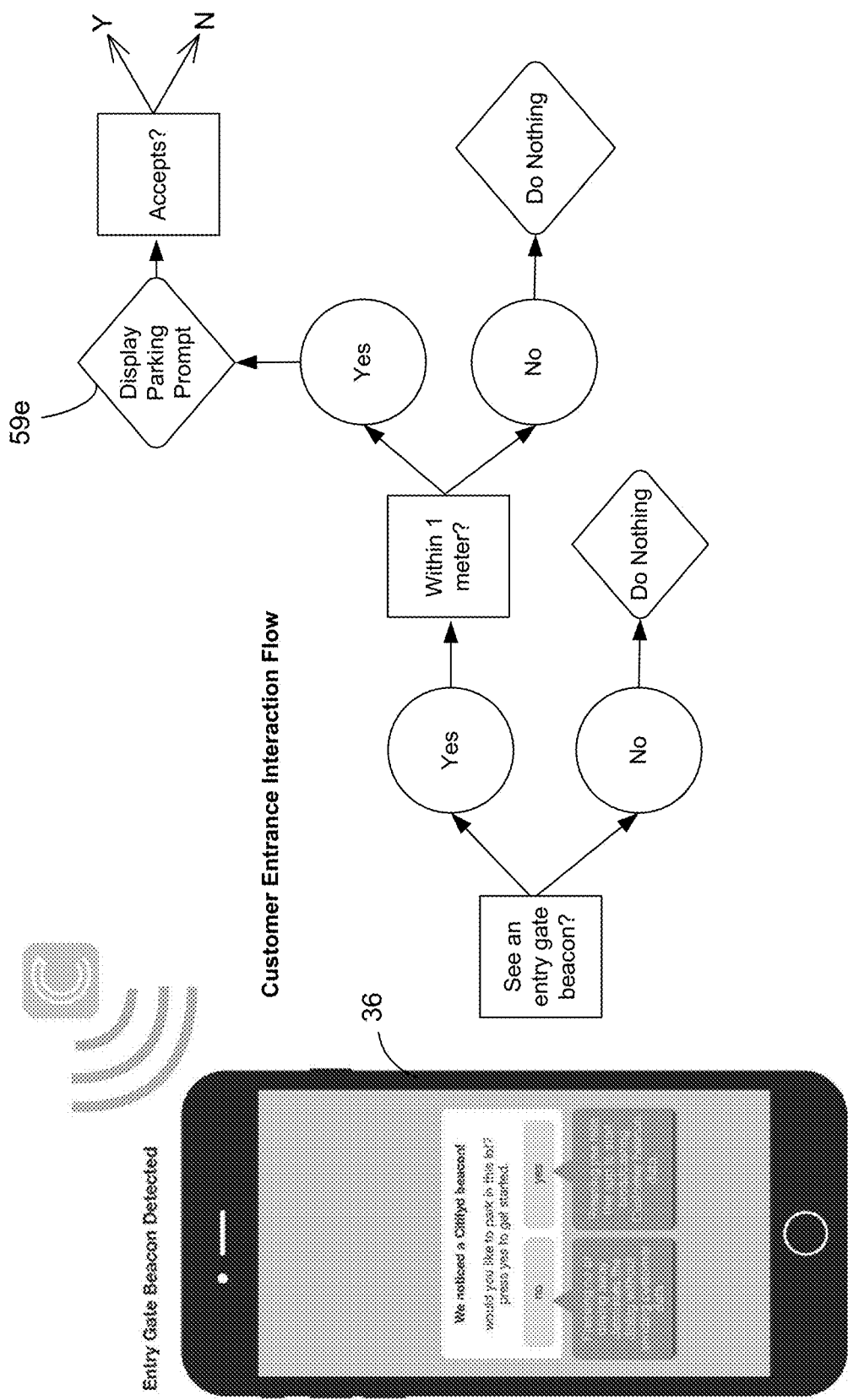
Figures 2, 3A:
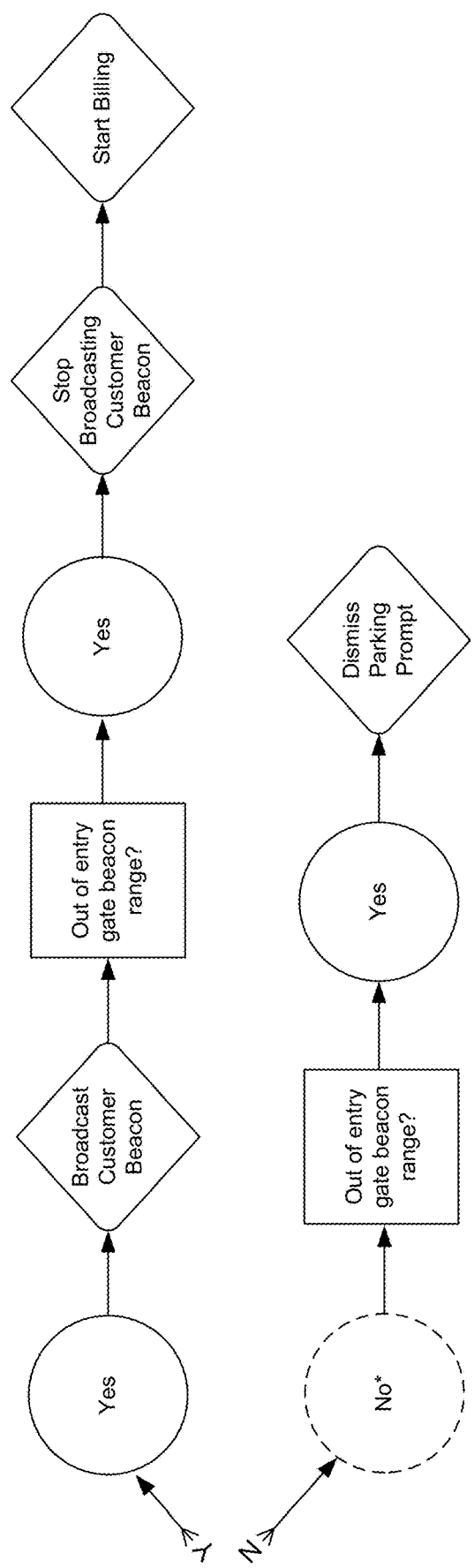
Figures 1, 3B:
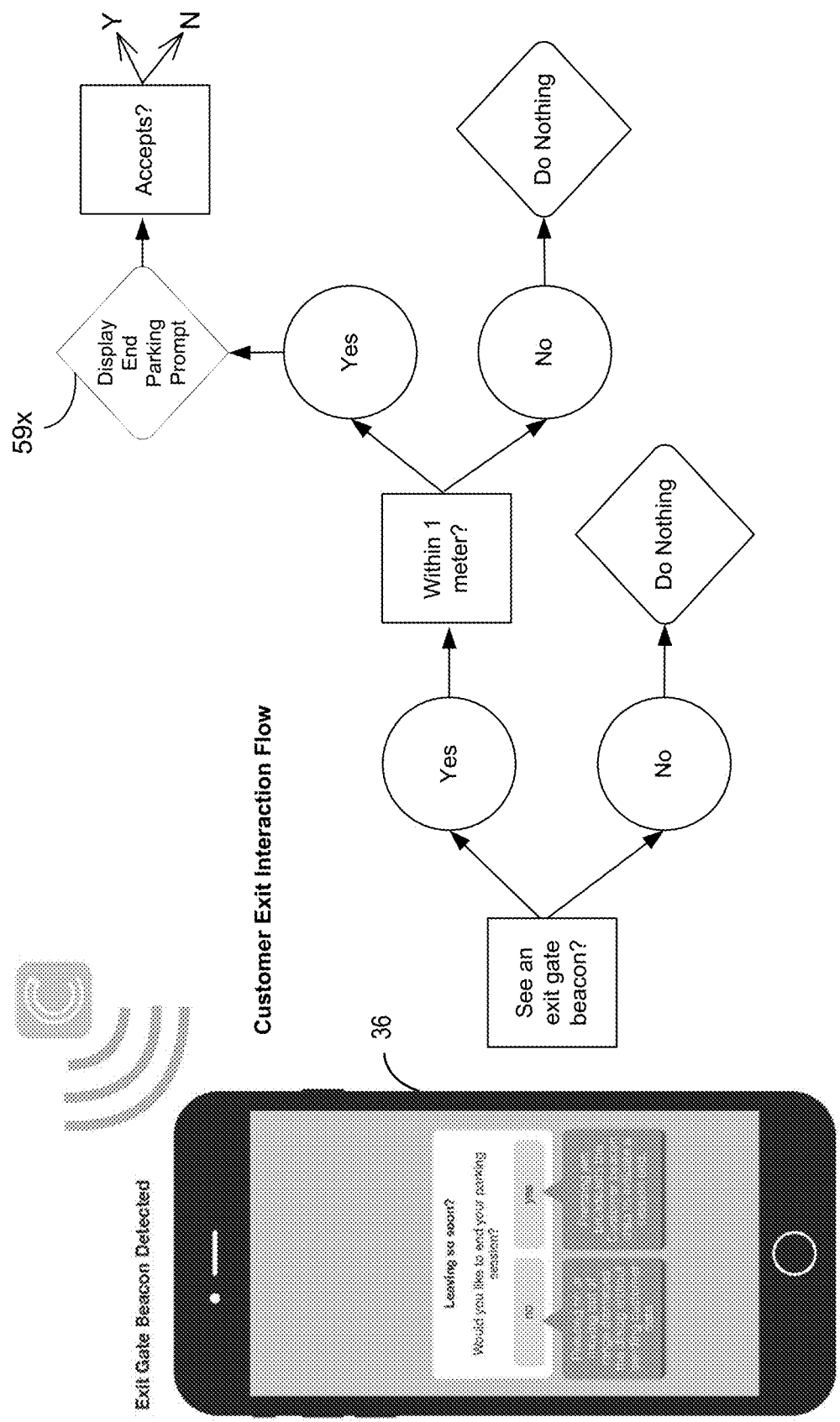
Figures 2, 3B:
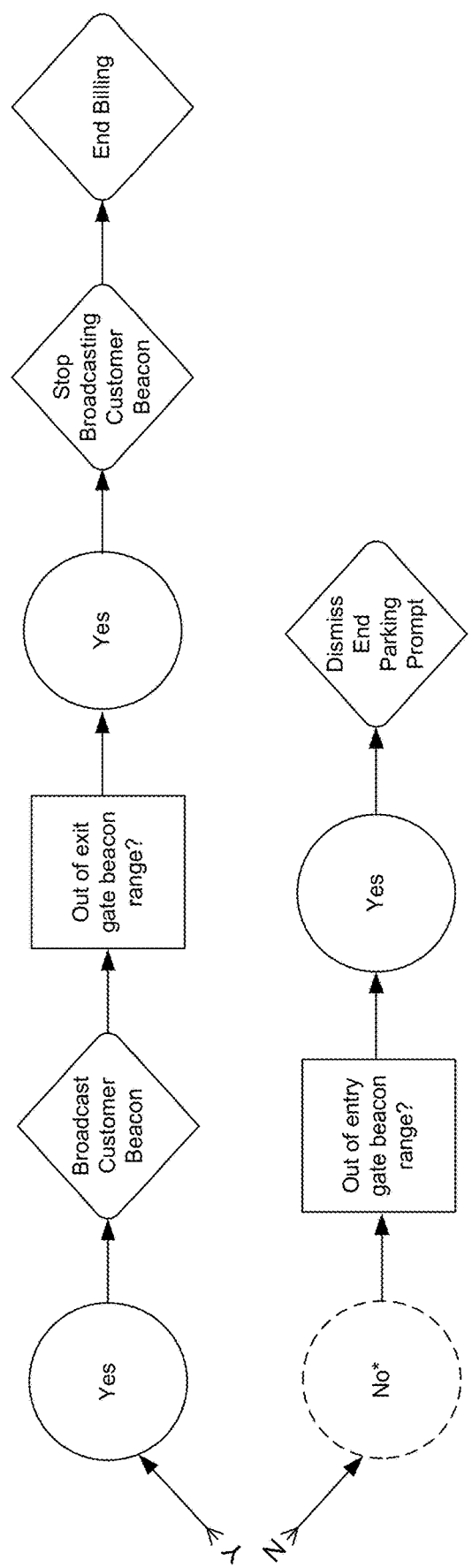
Figure 3C:
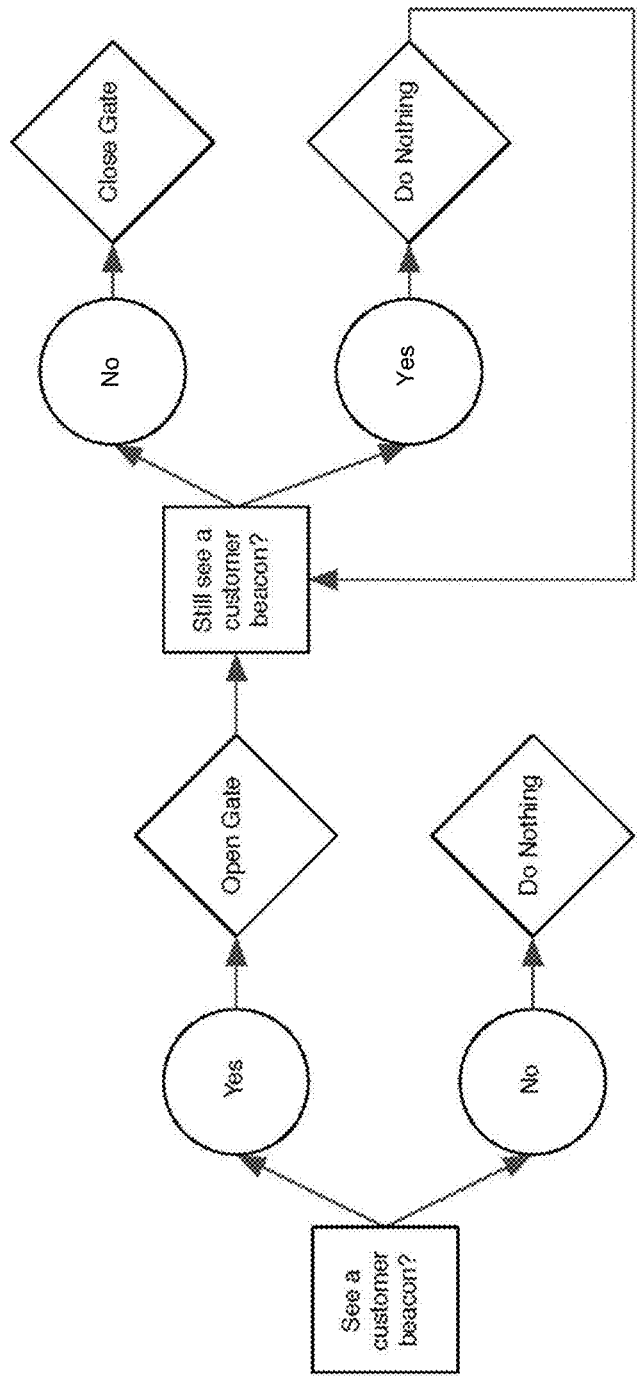

FIGS. 3A-1 and 3A-2 (hereafter, FIG. 3A), FIGS. 3B-1 and 3B-2 (hereafter, FIG. 3B), and FIG. 3C are flow diagrams outlining the process steps performed cooperatively by beacon 10 and smartphone 36 in initiating the start and the end of a vehicle parking or mass transit travel transaction session. FIGS. 3A and 3B show, in response to detection of beacon 10 by smartphone 36, the interaction between them during the processes of, respectively, customer entrance (i.e., ingress) into and customer exit (i.e., egress) from a parking surface lot or garage facility or a mass transit station. FIG. 3A also shows a display parking prompt produced by an App operating on smartphone 36 to appear on the display screen of smartphone 36 as the customer approaches the customer entrance, as indicated by a decision block 59e of the flow diagram. "Citifyd App" is the name given to the App operating with a user beacon on user smartphone 36. FIG. 3B also shows a display end parking prompt produced by the Citifyd App to appear on the display screen of smartphone 36 as the customer approaches the customer exit, as indicated by a decision block 59x of the flow diagram. FIG. 3C shows, in response to detection of the customer beacon in smartphone 36 by beacon 10, the operation of beacon 10 in the control of opening and closing a barrier gate of the parking facility or mass transit station terminus.

In all device-to-device interactions taking place in the preferred embodiments described, smartphone 36 acts as the primary or Master device informing all secondary or Slave devices of the customer's intentions. When smartphone 36 is within range (e.g., 1 m) of beacon 10, the Citifyd App operating on smartphone 36 informs the customer of actions the customer can take. If the customer has no active vehicle parking or mass transit travel session, the Citifyd App prompts with messaging asking whether the customer would like to start a session. If the customer is currently in an active session, the Citifyd App prompts the customer to end the session.

Beacon 10, when broadcasting, can be identified from 45 ft (13.7 m) to 230 ft (70 m) away with fair accuracy. The closer smartphone 36 is to beacon 10, the greater the accuracy. Once smartphone 36 detects beacon 10, functional data are automatically sent to and from beacon 10 without the customer's permission. The Citifyd App tracks and calculates its distance from beacon 10 and prompts smartphone 36 when a range of 1.0 m or less has been reached. The Citifyd App begins broadcasting its own advertisement data until the distance between beacon 10 and smartphone 36 exceeds 1.0 m. For a case in which beacon 10 is the sole device with Internet connectivity, beacon 10 can be configured to send from a backend server over a wireless communication link through cellular communication network protocols (FIG. 4) to smartphone 36 a push notification asking further permission for action. If the customer responds by granting permission, the Citifyd App begins broadcasting its own advertisement data until the distance between beacon 10 and smartphone 36 exceeds 1.0 m.

FIGS. 4, 5, 6, 7, and 8 are system block diagrams presented to facilitate an understanding of the following description of the operation of a vehicle parking and mass transport beacon system 60 implemented with beacon 10. The Citifyd App and SmartBeacon device cooperate in system 60, which is referred to as Citifyd system or Citifyd SmartBeacon system.

FIGS. 4 and 6-8 show the main components and communication links between different ones of the main components in vehicle parking and mass transport beacon system 60. FIG. 4 omits beacon 10 from system 60 to show the system infrastructure and communication links established before beacon 10 is placed in operation.

With reference to FIG. 4, system 60 includes one or more platform or backend servers 70 (hereafter, backend servers 70) on which a parking or transportation service provider stores vehicle parking and transit rider customer account information and transaction information. A preferred parking service provider is a municipality, a private parking provider, or other business organization that uses backend servers 70 to process transactions associated with established vehicle driver parking fee payment accounts. (A parking service provider could, of course, enter into a contractual arrangement with a separate entity to process transactions associated with the parking fee payment accounts.) A preferred transportation service provider is a regional mass transit agency offering one or more of bus and any one of various rail transportation services, or a private organization offering transportation services. Backend servers 70 are implemented with a communication signal interface to establish a wireless radio signal communication link 72 with a navigation system 74, such as the global positioning system (GPS) space-based satellite network, and a wireless communication link 76 through cellular communication network protocols with a smart, wireless-connection enabled mobile communication device, such as smartphone 36 carried by the customer.

Smartphone 36 is implemented with a communication signal interface to establish communication link 76 and establish a wireless radio signal communication link 78 with GPS navigation system 74. Communication links 72 and 78 established with GPS navigation system 74 are used to determine, and provide backend servers 70 with, information about the location and movement of the customer carrying smartphone 36. GPS navigation system 74 knows the customer's exact location (e.g., gate, bus stop, street corner, and the like) by tracking customer smartphone 36.

FIG. 4 shows backend servers 70 established with communication links 80, 82, 84, and 86 through wireless globally accessible information (e.g., Internet Protocol) networks with transit rider customer accounts of a bus service provider 88, a train/subway service provider 90, and a taxi service provider 92 and parking customer accounts of a parking service provider 94, respectively. Communication links 80, 82, and 84 enable bus service provider 88, train/subway service provider 90, and taxi service provider 92 to access travel activity and payment information relating to their respective transit rider customer accounts. Communication link 86 enables parking service provider 94 to access parking activity and payment information relating to its parking customer accounts.

Figure 6:
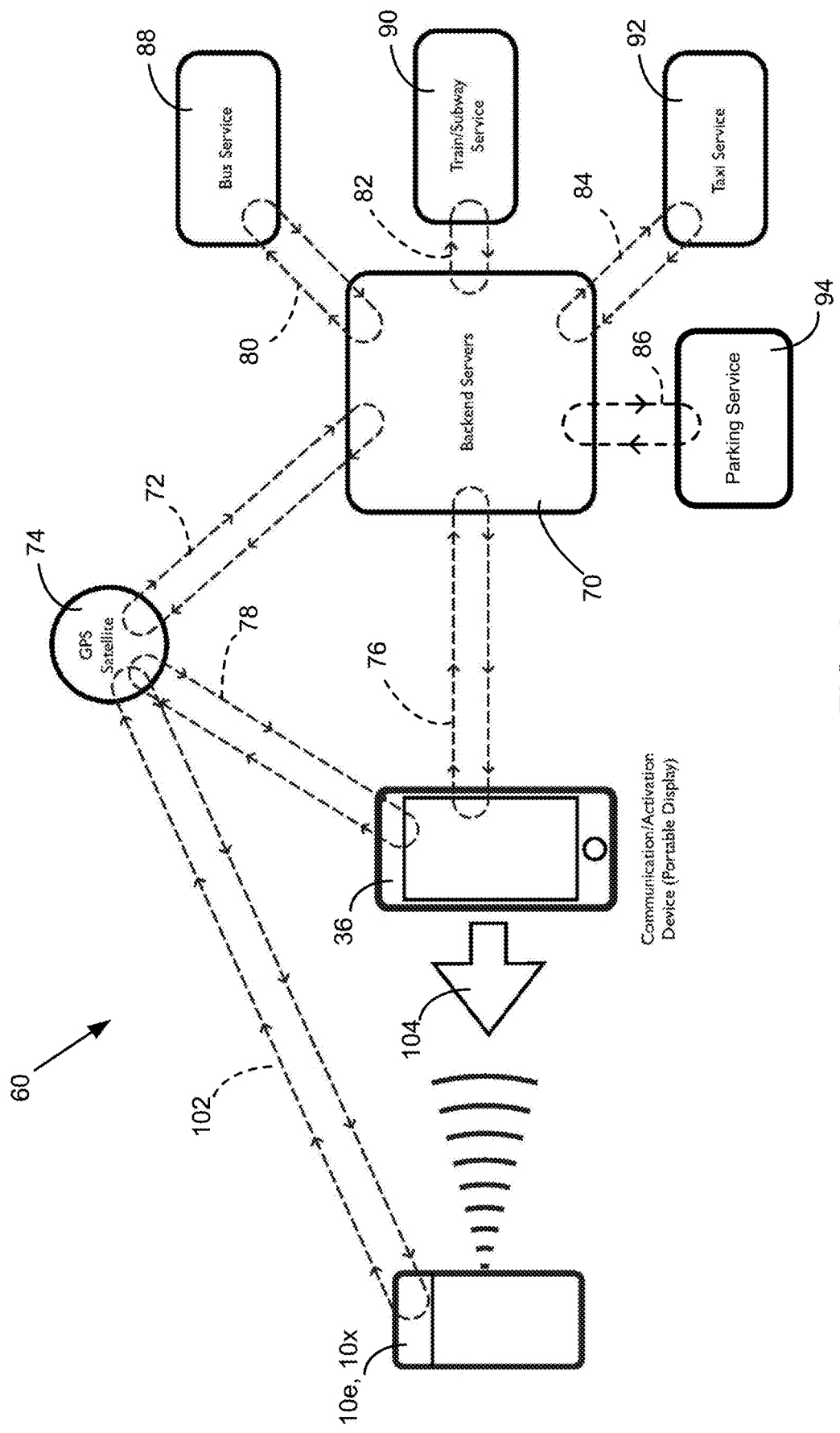
FIGS. 6, 7, and 8 show among the components of the disclosed parking and mass transport beacon system the various communication links that are active during various stages of system operation.
Figure 7:
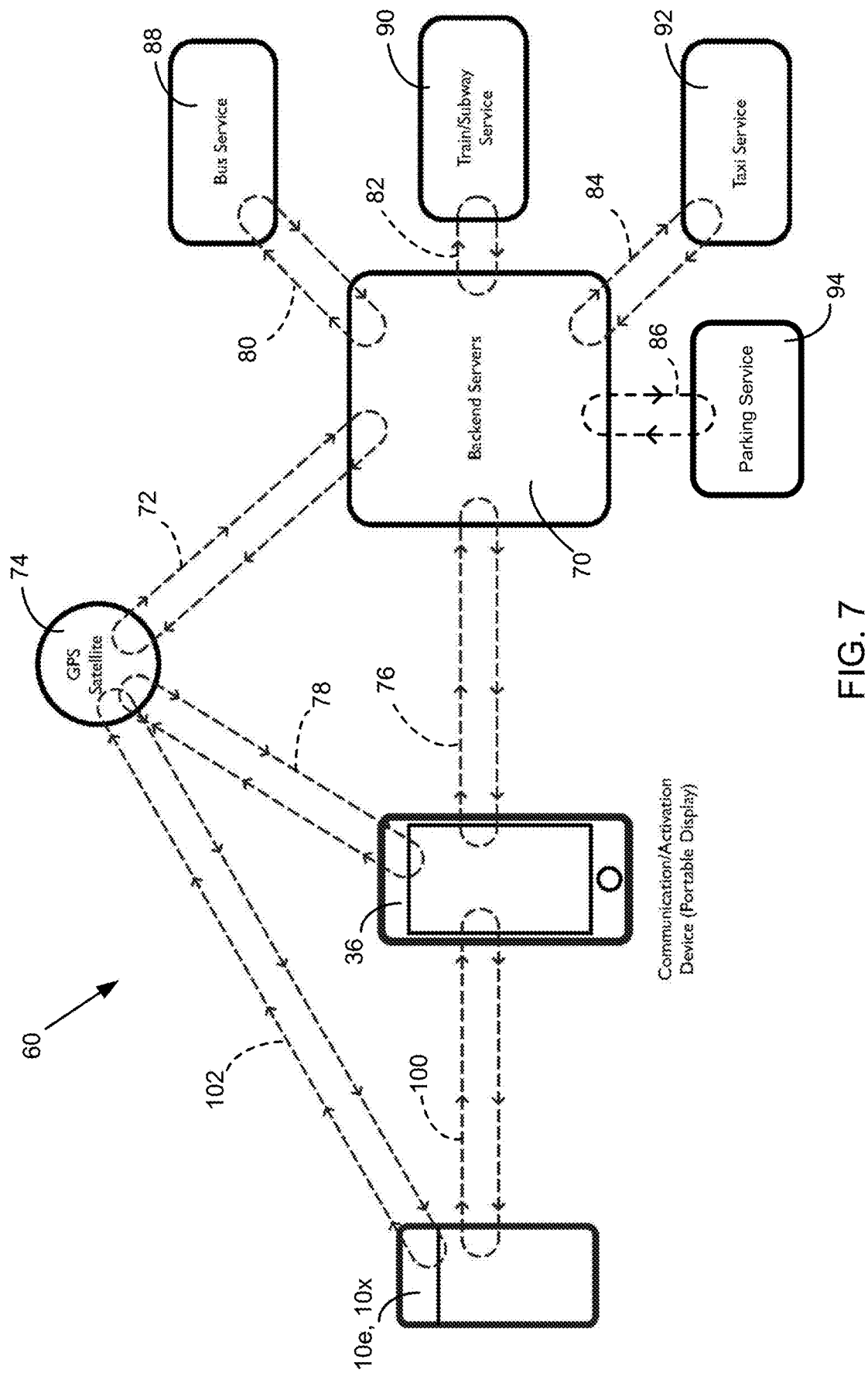
Figure 8:
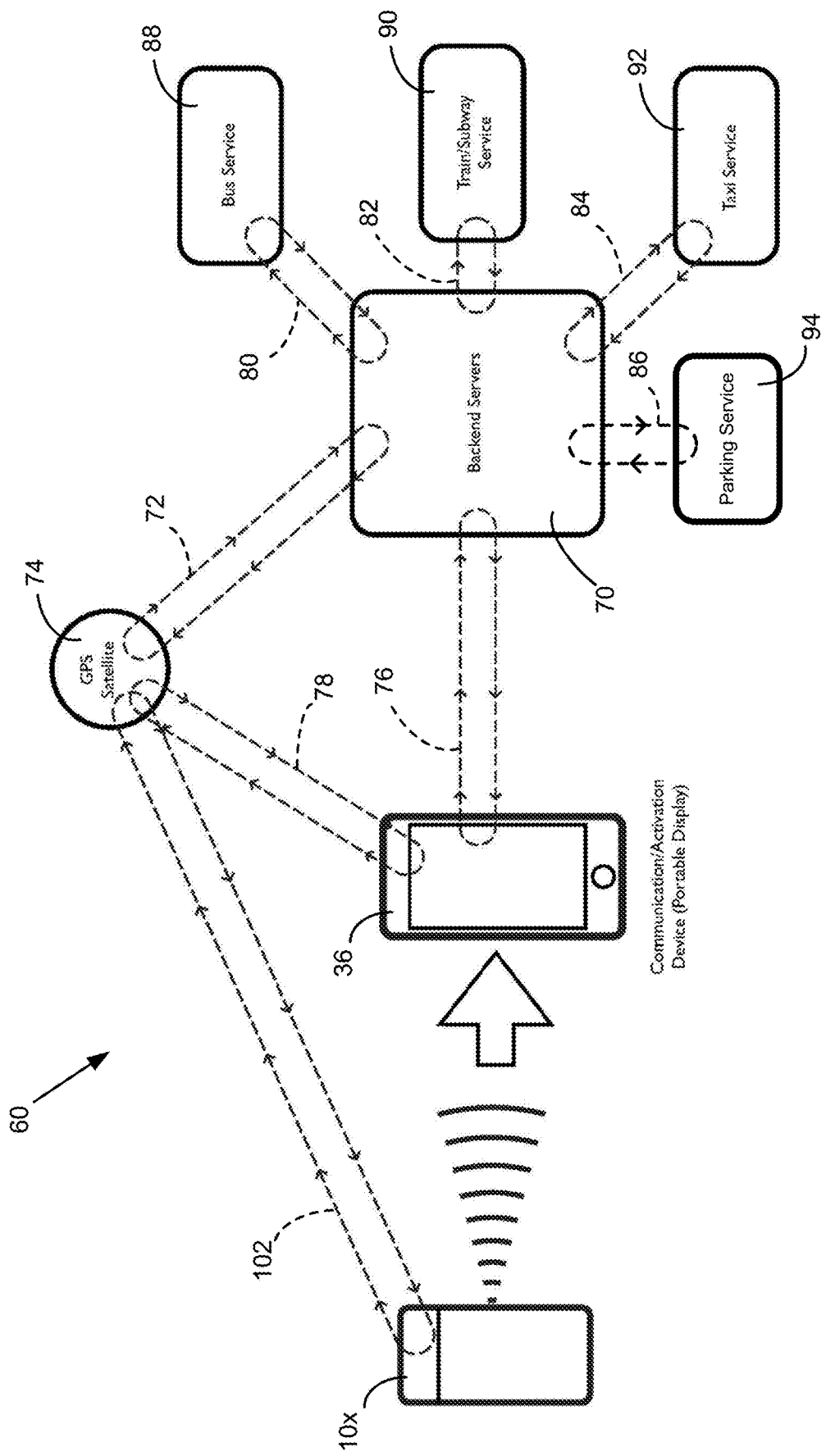

FIGS. 6, 7, and 8 show system 60 including beacon 10. With reference to FIGS. 6, 7, and 8, the radio signal produced by Bluetooth® signal interface module 32 is used to establish a wireless communication link 100 (FIG. 7) between beacon 10 and smartphone 36. Beacon 10 is implemented with LTE communication signal interface module 38 to establish a wireless radio communication link 102 with GPS navigation system 74 to determine and provide to backend servers 70 information about the location and movement of beacon 10.

The following describes the operation of vehicle parking and mass transport beacon system 60. With reference to FIG. 6, a customer's smartphone 36 is loaded with the Citifyd App provided by the operator of system 10, and backend servers 70 store account information for a transaction account set up by the customer. To enter a parking gate or board a bus, taxi, subway, train, or other transportation vehicle, the customer taps on the screen of smartphone 36 to select an intended activity from an on-screen menu display of parking or mode of transportation activities, which are shown in the diagram of a menu screenshot presented as FIG. 5. After the customer taps the selected activity displayed, GPS navigation system 74 recognizes the location of customer smartphone 36, and perforce the location of the customer carrying it, and, in the case of mass transit travel, directs the Citifyd App operating on customer smartphone 36 to open an App of the local transportation agency to provide the customer with travel routes, maps, schedules, and timetables. At the same time, backend servers 70 check the customer account for authenticity, available funds, and credits and thereafter opens the account. If the account is in good order, backend servers 70 issue a "start session" identification code and create within customer smartphone 36 an authorization screen/ticket that is hidden from the customer's access and view. (The terms "parking pass" and "parking ticket" are used interchangeably throughout.) This procedure reduces the possibility of fraud because the customer cannot duplicate the authorization screen by photographing the authorization screen image and sharing it with others. The customer is now ready to board a vehicle of any of the modes of transportation or park at any gated or attended parking locations that are part of system 60.

As a customer moves toward the transportation vehicle or parking gate or attendant, an entry beacon 10e detects customer smartphone 36 at about 30-45 ft (10.7-13.7 m) and prepares for a connection handshake 104. With reference to FIG. 7, at a preset distance (e.g., 2 ft (0.6 m)) a connection handshake between entry beacon 10e and customer smartphone 36 is made instantly on communication link 100 through the Bluetooth protocol. If the identification/shared codes match, authentication is completed, the authorization is presented on the screen of smartphone 36, and indicator lights 14 on entry beacon 10e turn on, signaling the vehicle driver or gate attendant to allow customer entry or boarding. In the case of a barrier gate, instead of indicator lights 14 turning on, entry beacon 10e signals the barrier to be lifted, allowing the customer's vehicle to pass through. At this moment, the identification code also turns to a "stop session" identification code.

Figure 8A:
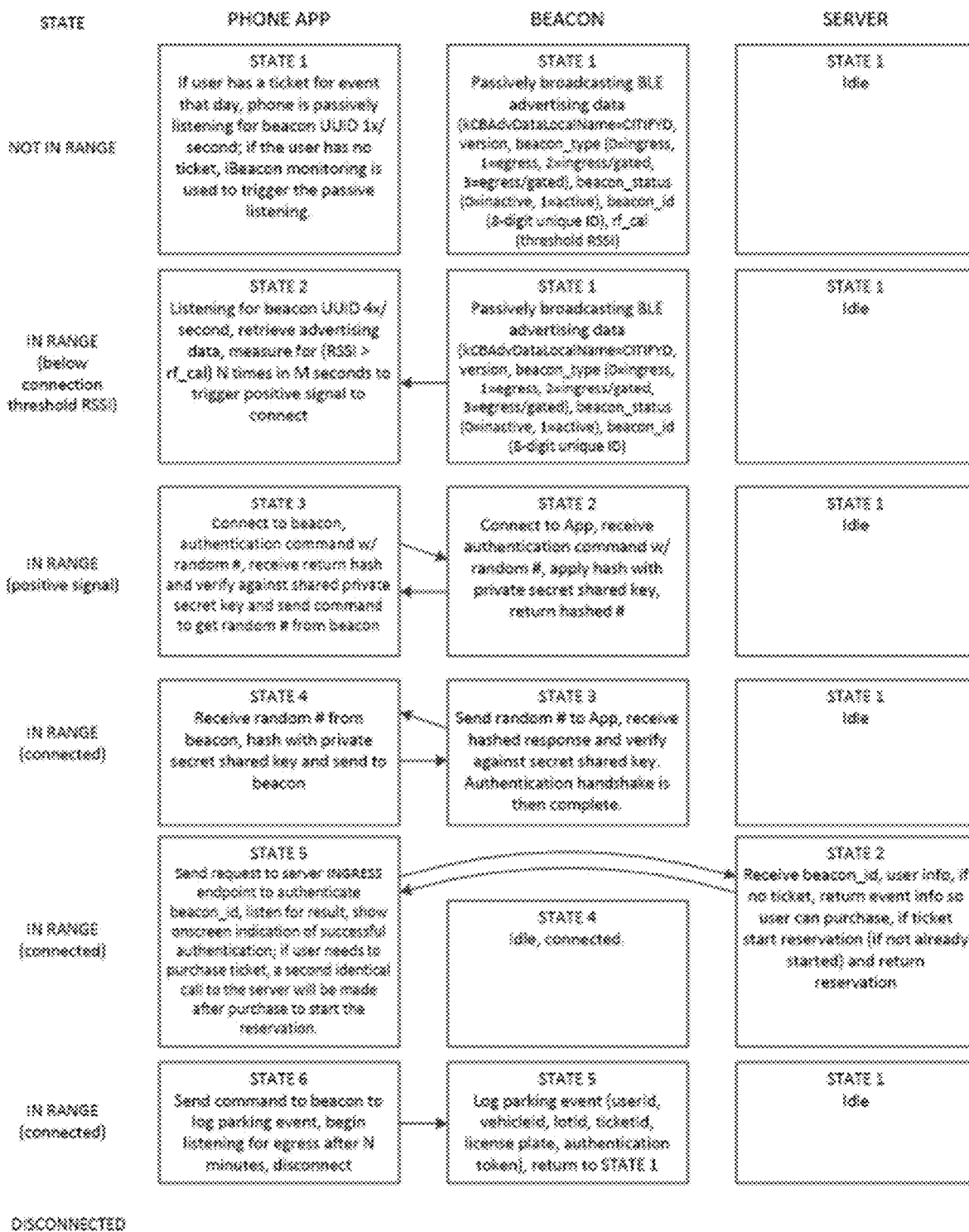
FIGS. 8A and 8B are diagrams outlining logic state flow of an entry beacon and a customer smartphone on which there is, respectively, Internet capability and no Internet capability implemented for processing ingress of a vehicle to a parking facility.
Figure 8B:
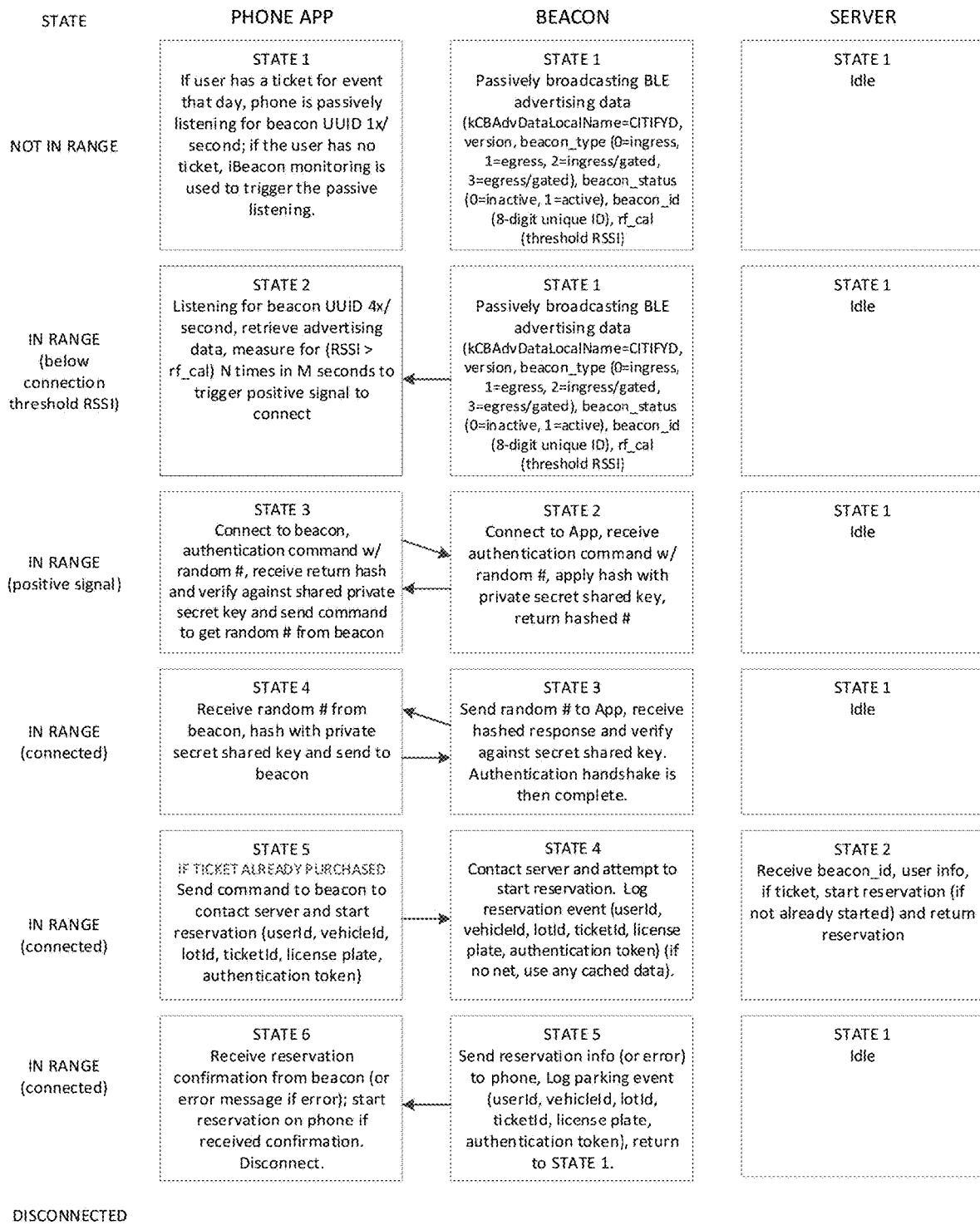

FIGS. 8A and 8B are diagrams outlining the logic state flow of the beacon and customer smartphone for parking ingress, in which there is, respectively, Internet capability and no Internet capability implemented on the customer smartphone.

With reference to FIGS. 6, 7, and 8, after the completion of travel or the vehicle parking session, as the customer disembarks the vehicle or departs from the parking surface lot or facility, an exit beacon 10x (which could be the same as entry beacon 10e if disembarkation or departure takes place through the entry door or gate) detects the approach of the customer and prepares for connection handshake 104 (FIG. 6) and connection on connection link 100 (FIG. 7). At the present distance, connection handshake 104 is made (FIG. 6). If the identification/shared codes match, and as soon as the connection handshake on communication link 100 is broken and GPS navigation system 74 detects separation of beacon 10x (FIG. 8), the system finishes the travel or parking session (in the case of parking, the barrier gate is lifted) and the account is closed and charged appropriately. A confirmation screen with the details of the transaction is presented on customer smartphone 36.

Alternatively, as soon as GPS navigation system 74 detects the separation of beacon 10x from customer smartphone 36 with a "stop session" identification code (FIG. 8), the system finishes the travel/parking session, and the account is closed and charged appropriately. A confirmation screen with details of the transaction is then presented to the customer.

Figure 8C:
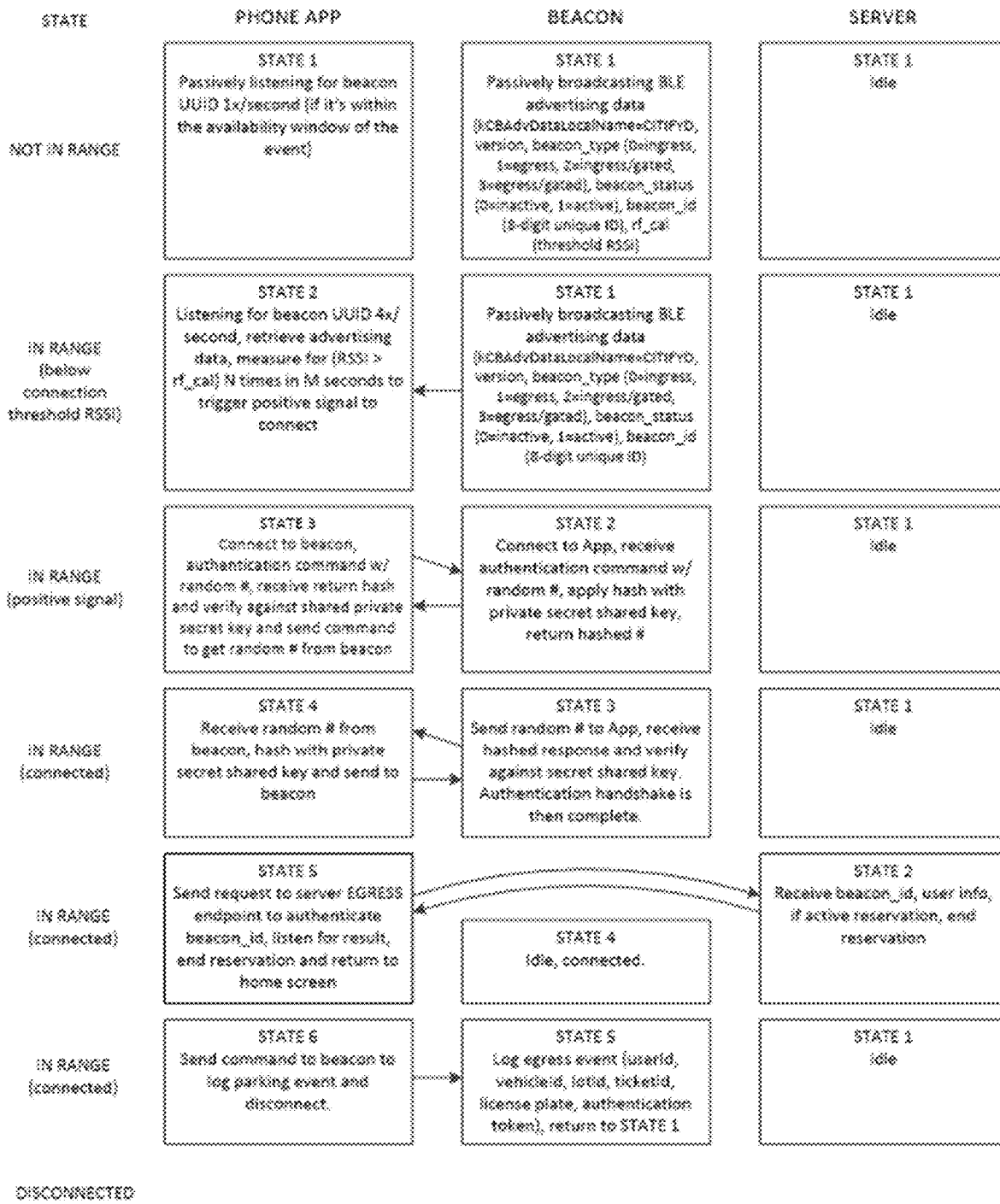
FIG. 8C is a diagram outlining logic state flow of an exit beacon and a customer smartphone for processing egress of a vehicle from a parking facility.

FIG. 8C is a diagram outlining the logic state flow of the beacon and customer smartphone for parking egress.

The process can be repeated multiple times during the day, week, or other set period, and the customer account keeps the tally. At the end of that period, the customer credit card is charged only once.

The system reliance on the cellular or Wi-Fi communication connection at the moment of authorization is eliminated or reduced, and the problem of cellular or Wi-Fi connection delays is removed by (1) performing pre-authorization and account verification before embarking or approaching a parking gate/attendant and within the Citifyd App creating one or both of an identification code and an authorization screen hidden from the customer and (2) verifying the customer/authorization at the moment of entrance or embarkation through the connection handshake with beacon 10 only.

Figures 1, 9:
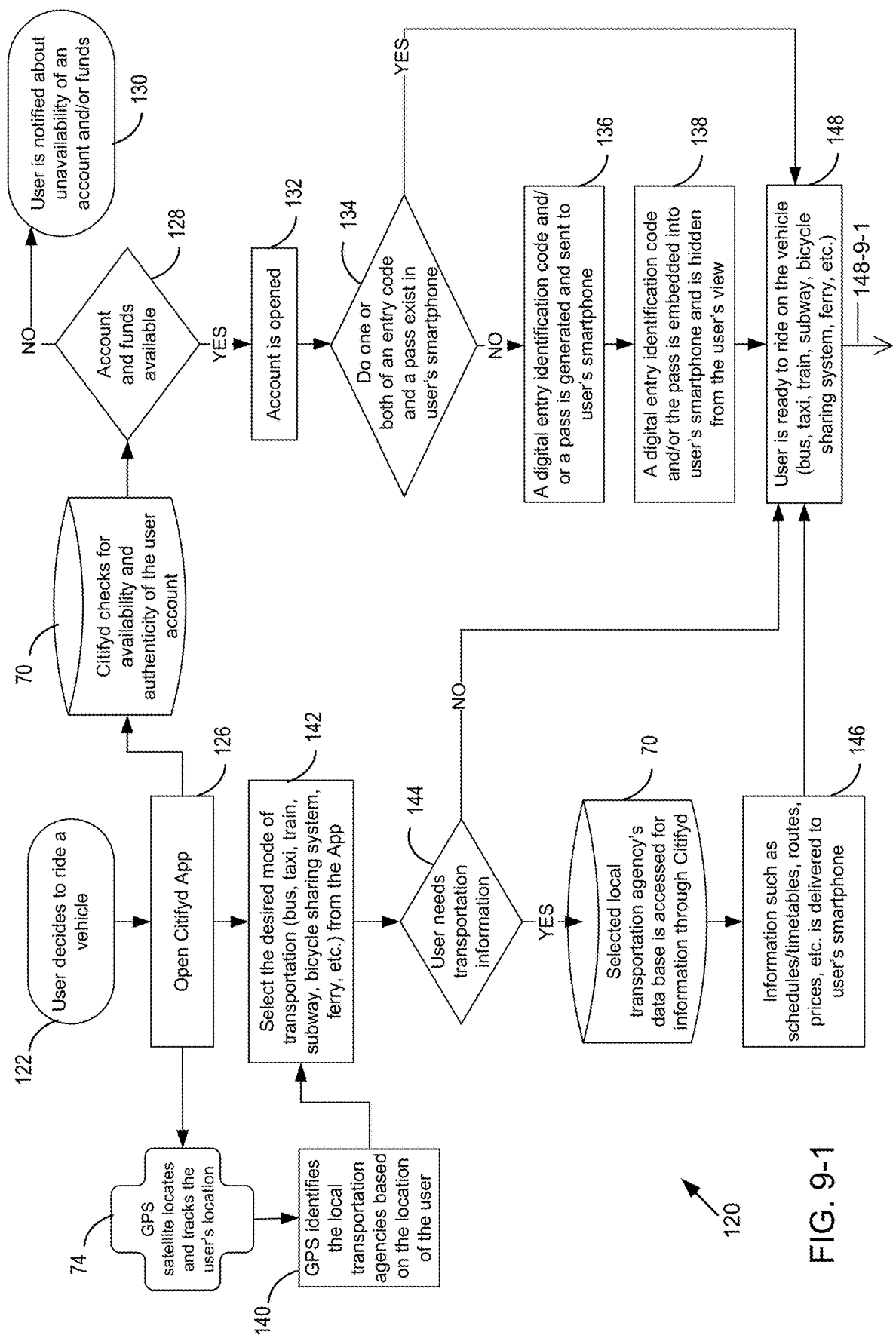
Figures 2, 9:
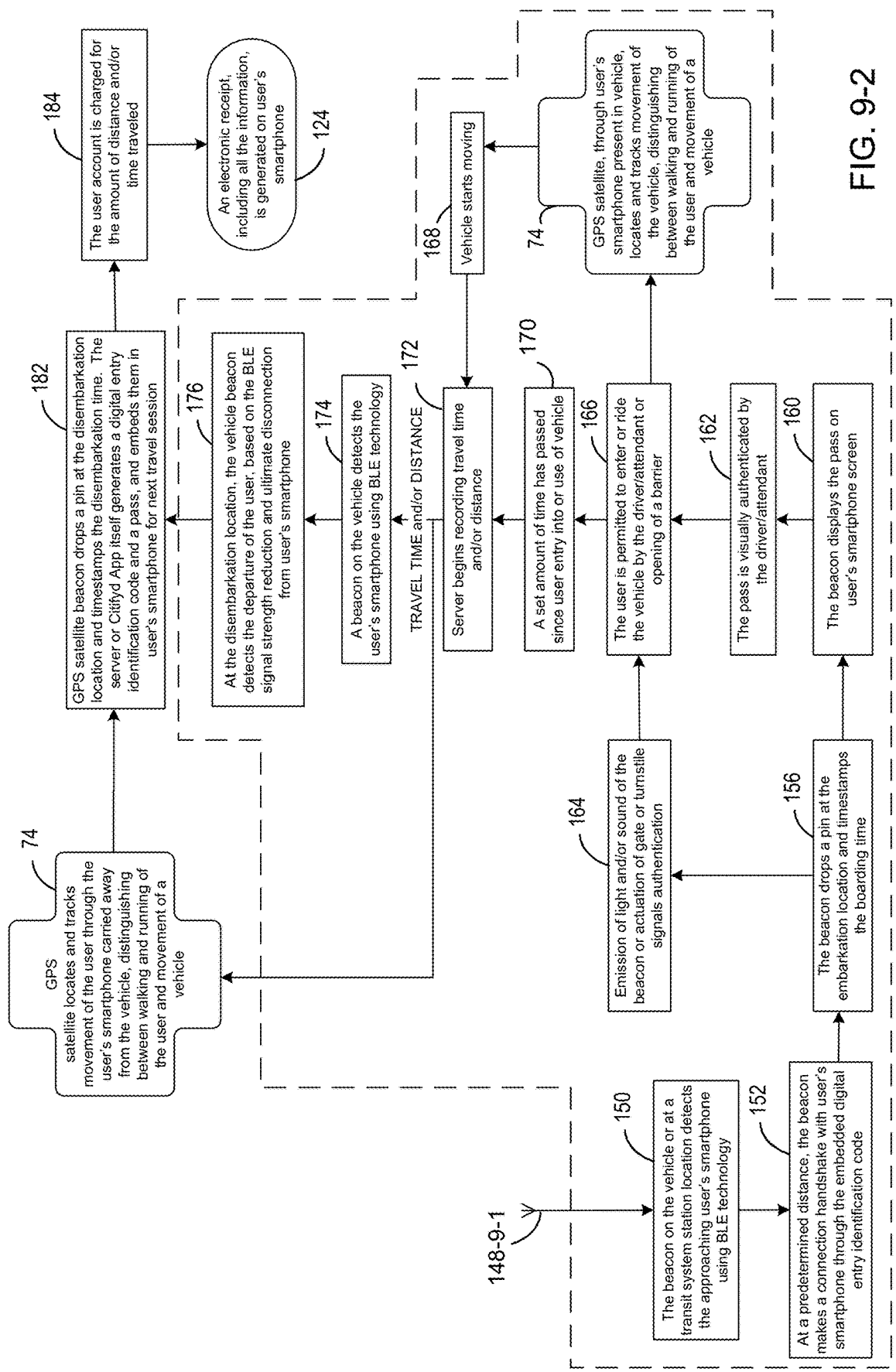

FIGS. 9-1 and 9-2 form an annotated flow diagram 120 outlining and describing the process steps performed in the operation of vehicle parking and mass transport beacon system 60 in the entry into and exit from a mass transit vehicle 58, such as, for example, a bus, taxi, train, subway, bicycle from a bicycle sharing system, ferry, or other such vehicle. The process flow begins with a transit system rider (also referred to as user) deciding, at process block 122, to ride a vehicle and ends the ride with generation, at process block 124, of an electronic receipt presenting all transaction information on user smartphone 36.

To select a desired mode of transportation, a transit rider opens, at decision block 126, the "Citifyd App" operating on user smartphone 36. FIG. 9-1 shows that this selection by the transit rider results in operation of the Citifyd App to perform (1) user account authentication and processing and (2) transportation mode logistics processing.

With respect to user account authentication and processing, backend servers 70 check whether an authentic account is available for the transit rider. Backend servers 70 determine, at decision block 128, whether a user account exists and, if so, whether it contains a minimum account balance of available funds. If either no user account exists or there are insufficient funds available, backend servers 70 send, at process block 130, to user smartphone 36 notification to the transit rider that payment processing using system 60 cannot proceed. If a user account exists and contains sufficient funds, backend servers 70, at process block 132, open the user account and, at decision block 134, determine whether one or both of a digital entry identification code and a pass are stored on user smartphone 36. A negative response to this determination causes backend servers 70, at process block 136, to generate and send to user smartphone 36 one or both of a digital entry identification code and a pass. Whether a transit rider needs one or both of an entry identification code and a pass depends on the mode of authentication required at the transit vehicle entry point. Process block 138 indicates that the digital entry identification code, pass, or both, are embedded in, but not available for visual display on the screen of, user smartphone 36.

With respect to transportation mode logistics processing, upon the opening of the Citifyd App at process block 126, GPS navigation system 74 finds and tracks the location of user smartphone 36 carried by the transit rider and identifies, at process block 140, local transportation agencies based on the location of transit rider. The user location-based local transportation agency information is delivered to user smartphone 36 over communication link 78. The transit rider selects, at process block 142, from the Citifyd App, a desired mode of transportation, such as, for example, bus, taxi, train, subway, bicycle sharing system, or ferry. The Citifyd App inquires, at decision block 144, whether the transit rider needs transportation information, and upon the transit rider's affirmative response, receives, at process block 146, timetables, schedules, routes, fares, and other transportation related information accessed from the database of the selected transportation agency and delivered through backend servers 70 over communication link 76. Process block 148 shows that, after user smartphone 36 has one or both of an embedded digital entry identification code and pass, and the transit rider has received or has no need for transit schedule and cost information, the transit rider is ready to ride on the selected mass transit vehicle.

FIG. 9-2 shows the process flow from the time the transit rider boards or starts to ride, to the time the transit rider leaves, the selected mass transit vehicle. With respect to processing the conveyance of a transit rider, beacon 10 installed on transit vehicle 58 detects, at process block 150, BLE technology-enabled user smartphone 36 of the transit rider approaching transit vehicle 58. Other installation locations of beacon 10 are possible. A first example is the case of a subway system, in which beacon 10 could be installed at a turnstile or gate location of a subway system station. A second example is the case of a bicycle sharing system, in which beacon 10 could be installed on a sharing system bicycle or at a bicycle pick-up or drop-off station terminus. Beacon 10 installed on the bicycle could be powered by a battery that is charged as the bicycle rider pedals. At a predetermined threshold distance between beacon 10 and user smartphone 36, beacon 10 makes, at process block 152, a connection handshake with user smartphone 36 through its embedded digital entry identification code. Beacon 10 thereafter, at process block 156, drops a pin at the transit rider's embarkation location and timestamps the transit rider's boarding time. Having already opened the user account, backend servers 70 start processing and keep track of travel time and distance and other pertinent information.

The next processing step performed depends on whether the selected transit mode is configured for user smartphone 36 to display a pass for a transit system driver/attendant 50 to inspect to authenticate, or to emit light or sound authenticating, or to open a gate or unlock a turnstile to admit the transit rider for passage. Whenever a pass is to be displayed, the display screen of user smartphone 36 presents, at process block 160, the pass for visual inspection. Process block 162 represents visual authentication of the pass by transit system driver/attendant 50. Whenever authenticating light or sound is to be emitted, or a gate or a turnstile barrier is to be activated, user smartphone 36 signals, at process block 164, authentication by emitting light or sound, for recognition by transit driver/attendant 50, or by opening a gate or unlocking a turnstile, for admitting the transit rider. Upon authentication by display of a pass to or visual or auditory recognition by transit driver/attendant 50, or by opening of a gate or turnstile barrier, the transit rider receives, at process block 166, permission to enter or ride the mass transit vehicle. In the specific case of a bicycle, after authentication, the bicycle beacon 10 or station terminus beacon 10 mechanically unlocks the bicycle from a bicycle parking rack and releases the bicycle for use.

The transit rider embarking transit vehicle 58 initiates two processes that cause backend servers 70 to begin recording one or both of transit vehicle travel time and distance. The first process entails GPS navigation system 74 locating and tracking of user smartphone 36, which is present in or carried by the transit rider in or on transit vehicle 58 as it moves. The operation of GPS navigation and motion sensors such as an accelerometer and a pedometer installed in user smartphone 36 enable distinguishing between walking and running movements of the transit rider and movement of transit vehicle 58. Process block 168 indicates detection of movement of transit vehicle 58. The second process entails a timer determining, at process block 170, when a set amount of time has passed from the time the transit rider received permission to enter or use transit vehicle 58. An operational failure of communication link 78 with GPS navigation system 74 in carrying out the first process would not be fatal in the recording of one or both of transit vehicle travel time and distance because the second process is independent of and carried out separately from the first process.

Upon one or both of detection of movement of transit vehicle 58 and passage of the set amount of time after the receipt of authorization, backend servers 70 start, at process block 172, recording one or both of the travel time and distance from the location where the authorization connection took place. There may be several beacons 10 on transit vehicle 58, such as a bus, subway car, or ferry vessel. Each beacon 10 is identified by its own unique identifier (UID), but the beacons share the same transit vehicle UID. The sharing of the same vehicle UID by beacons 10 enables system 60 to maintain identification of a transit rider while walking through the same transit vehicle 58 and forming connection handshakes between user smartphone 36 and each of the several beacons 10 installed on transit vehicle 58. A connection between user smartphone 36 and a beacon 10 during conveyance of the transit rider inside transit vehicle 58 has no effect on opening and closing of a user account and calculation of either a distance or fare.

Upon conclusion of the transit rider's time of travel, the nearest one of the several beacons 10 installed on transit vehicle 58 detects, at process block 174, the approaching user smartphone 36 of the transit rider proceeding to disembark transit vehicle 58. The Citifyd App operating on user smartphone 36 is programmed to select for connection handshake the beacon 10 located nearest to user smartphone 36 as the transit rider moves about transit vehicle 58. At a predetermined distance between the nearest beacon 10 and user smartphone 36, the nearest BLE technology-enabled beacon 10, based on BLE signal strength reduction and ultimate disconnection from user smartphone 36, detects, at process block 176, departure of user smartphone 36 as the transit rider carries it away from transit vehicle 58. The operation of GPS navigation and the accelerometer and pedometer sensors installed in user smartphone 36 carried outside of transit vehicle 58 distinguish between walking and running movements of the transit rider and movement of the vehicle. In the specific case of a bicycle, the rider's locking the bicycle parked at the station terminus rack can alternatively be used to signal conclusion of the rider's time of travel.

Once a predetermined distance is reached separating the nearest beacon 10 installed on transit vehicle 58 and user smartphone 36, the BLE signal between them is disconnected, and GPS navigation system 74 locating and tracking the location of the transit rider drops, at process block 182, a pin at the disembarkation location and timestamps the disembarkation time of the transit rider. Backend servers 70 generate a digital entry identification code and pass and embeds them in user smartphone 36 for use in a next travel session. Alternatively, the Citifyd App itself could generate through a binary system an alternate sequence of an entrance code and an exit code. Upon effecting a connection handshake for operating an entrance code, the Citifyd App thereafter generates an exit code for later use in system processing. Similarly, upon effecting a connection handshake for operating an exit code, the Citifyd App thereafter generates an entrance code. System 60 calculates from one or both of the distance traveled and the elapsed time of travel a transit fare amount and, at process block 184, charges that amount to the transit rider customer account residing in backend servers 70. As stated above, processing of the conveyance of the transit rider ends with generation, at process block 124, of an electronic receipt, presenting all pertinent information, on user smartphone 36.

Transit vehicle 58 has its own UID. When user smartphone 36 connects with one or more beacons of another transit vehicle, system 60 recognizes one or more of a change in route, the vehicle type, and a new transaction.

FIGS. 10-1 and 10-2 form an annotated flow diagram 220 outlining and describing the process steps performed in the operation of vehicle parking and mass transport beacon system 60 for a vehicle entering into and exiting from a gated parking facility (e.g., parking garage structure or surface lot) using beacon 10 attached to a barrier gate. The process flow begins with a vehicle driver (also referred to as user) deciding, at process block 222, to enter a gated garage or surface lot and ends with generation, at process block 224, of an electronic receipt presenting all transaction information on user smartphone 36, followed by production, at process block 226, of a new digital entry code generated for the next gate entry and sent to user smartphone 36.

FIG. 10-1 shows that this decision causes the vehicle driver user to open, at process block 126, the Citifyd App to perform user account authentication and processing. Upon opening the Citifyd App, GPS navigation system 74 finds and tracks the location of user smartphone 36 carried by the vehicle driver.

With respect to user account authentication and processing, backend servers 70 check whether an authentic account is available for the vehicle driver. Backend servers 70 determine, at decision block 128, whether a user account exists, and, if so, whether it contains a minimum account balance of available funds. If either no user account exists or there are insufficient funds available, backend servers 70 send, at process block 130, to user smartphone 36 notification to the vehicle driver that payment processing cannot proceed. If a user account exists and contains sufficient funds, backend servers 70, at process block 132, open the user account and, at process block 236, generate and send to user smartphone 36 a digital entry identification code. Process block 248 shows that, after user smartphone 36 has embedded a digital entry identification code, the vehicle driver is ready to enter the gated parking garage or surface lot.

FIG. 10-2 shows the process flow from the time the vehicle operated by the vehicle driver enters, to the time the vehicle operated by the vehicle driver exits, the gated parking garage or surface lot. Beacon 10 mounted on the entrance gate at the garage or surface lot entrance detects, at process block 250, BLE technology-enabled user smartphone 36 accompanying the vehicle driver as the vehicle approaches the entrance gate. The presence of user smartphone 36 in the vehicle approaching the entrance gate affords two alternative ways for authenticating the vehicle driver for entry. In a first alternative, at a predetermined distance between beacon 10 and user smartphone 36, beacon 10 makes, at process block 252, a connection handshake with user smartphone 36 through its embedded digital entry identification code. In a second alternative, user smartphone 36 responds to detection of emissions from beacon 10 by generating, at process block 253$e1$, an activate button in the form of an "Activate Gate" button image on the smartphone display screen. The generation of the Activate Gate button is described below with reference to FIGS. 19A-19E, and especially FIG. 19D. The vehicle driver actuates, at process block 253$e2$, the "Activate Gate" button to transmit to beacon 10 a signal to open the entrance gate. In response to the connection handshake of process block 252 or the signal of process block 253$e2$, beacon 10 signals, at process block 254, authentication of the vehicle driver by opening the gate. Beacon 10 thereafter, at process block 256, drops a pin at the entrance gate location and timestamps the vehicle driver's time of entry into the parking garage or surface lot and, at process block 258, generates a digital exit identification code and embeds it in user smartphone 36.

Upon conclusion of a vehicle parking session, beacon 10 mounted on the exit gate detects, at process block 274, the approaching BLE technology-enabled user smartphone 36 of the vehicle driver. (Skilled persons will appreciate that only one gate on which beacon 10 is mounted could be used for both entrance to and exit from a parking garage or surface lot.) The presence of user smartphone 36 in the vehicle approaching the exit gate affords two alternative ways for authenticating the vehicle driver for exit. In a first alternative, at a predetermined distance between beacon 10 and user smartphone 36, beacon 10 makes, at process block 276, a connection handshake with user smartphone 36 through its embedded digital exit identification code. In a second alternative, user smartphone 36 responds to detection of emissions from beacon 10 by generating, at process block 277$x1$, and "Activate Gate" button image on the smartphone display screen. The vehicle driver actuates, at process block 277$x2$, the "Activate Gate" button to transmit to beacon 10 a signal to open the exit gate. In response to the connection handshake of process block 276 or the signal of process block 277$x2$, beacon 10 signals, at process block 278, authentication of the vehicle driver by opening the exit gate to clear the way for the vehicle to leave the parking garage or surface lot. BLE technology-enabled beacon 10 detects, at process block 280, departure of user smartphone 36 as the vehicle driver drives the vehicle away from the exit gate.

Once a predetermined distance is reached between user smartphone 36 and beacon 10 installed on the exit gate, GPS navigation system 74 locating and tracking the location of the vehicle driver drops, at process block 282, a pin at the exit location and timestamps the exit time of the vehicle driver. System 60 calculates from the elapsed time of the parking session a parking fee amount and, at process block 284, charges that amount to the vehicle driver customer account residing in backend servers 70. As stated above, processing of the parking session ends with generation, at process block 224, of an electronic receipt on user smartphone 36. A new digital entry identification code is generated, at process block 226, for the next gate entry and is sent to user smartphone 36.

Each of flow diagrams 120 and 220 has an area defined by dashed lines, which area indicates activities performed by vehicle parking and mass transport beacon system 60 in absence of connection to a cellular or Wi-Fi communication network from the moment of authorization to the moment of disconnection of user smartphone 36 upon departure of the transit rider from a transit vehicle or exit of the vehicle from a parking garage or surface lot. This capability afforded by use of communication between beacon 10 and customer smartphone 36 avoids delay and communication coverage issues stemming from use of a cellular or Wi-Fi communication network.

Figure 11:
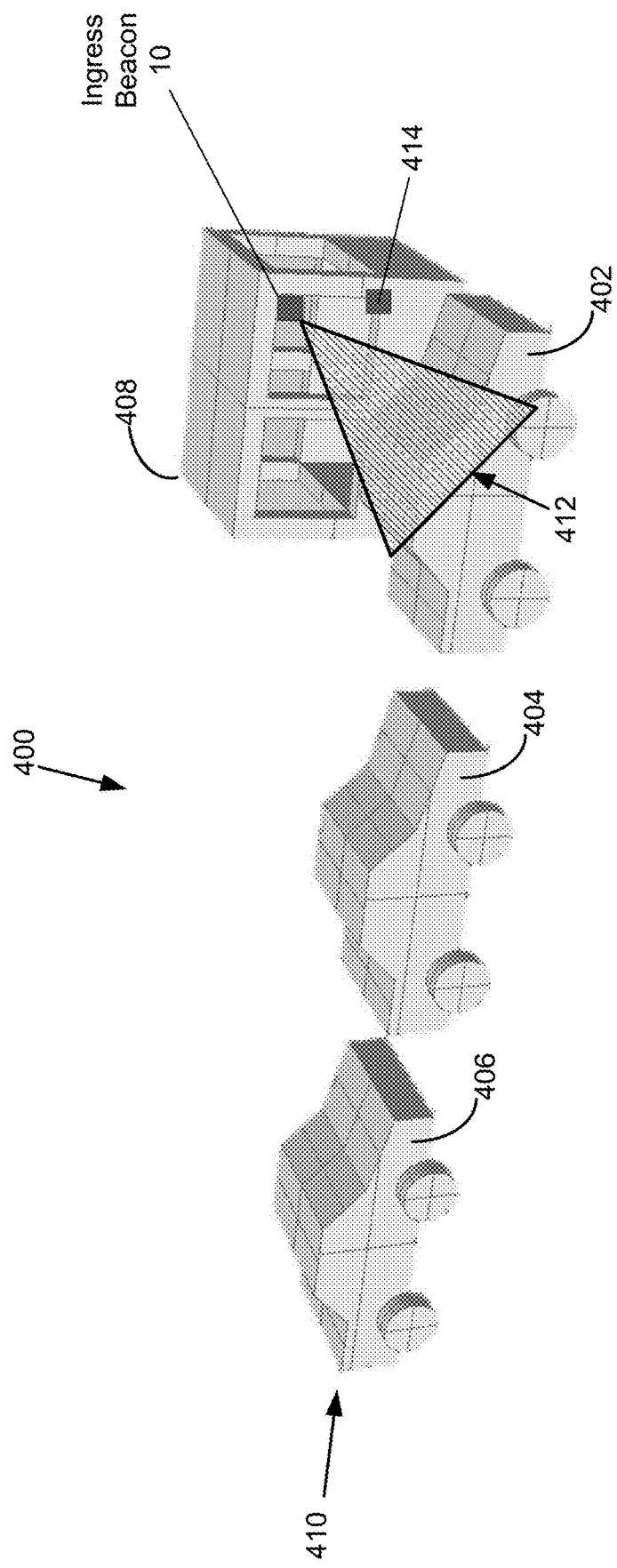
FIGS. 11, 12, and 13 are pictorial diagrams illustrating source beacon placement for detecting, respectively, vehicles entering, vehicles exiting, and vehicles entering and exiting a parking area.
Figure 12:
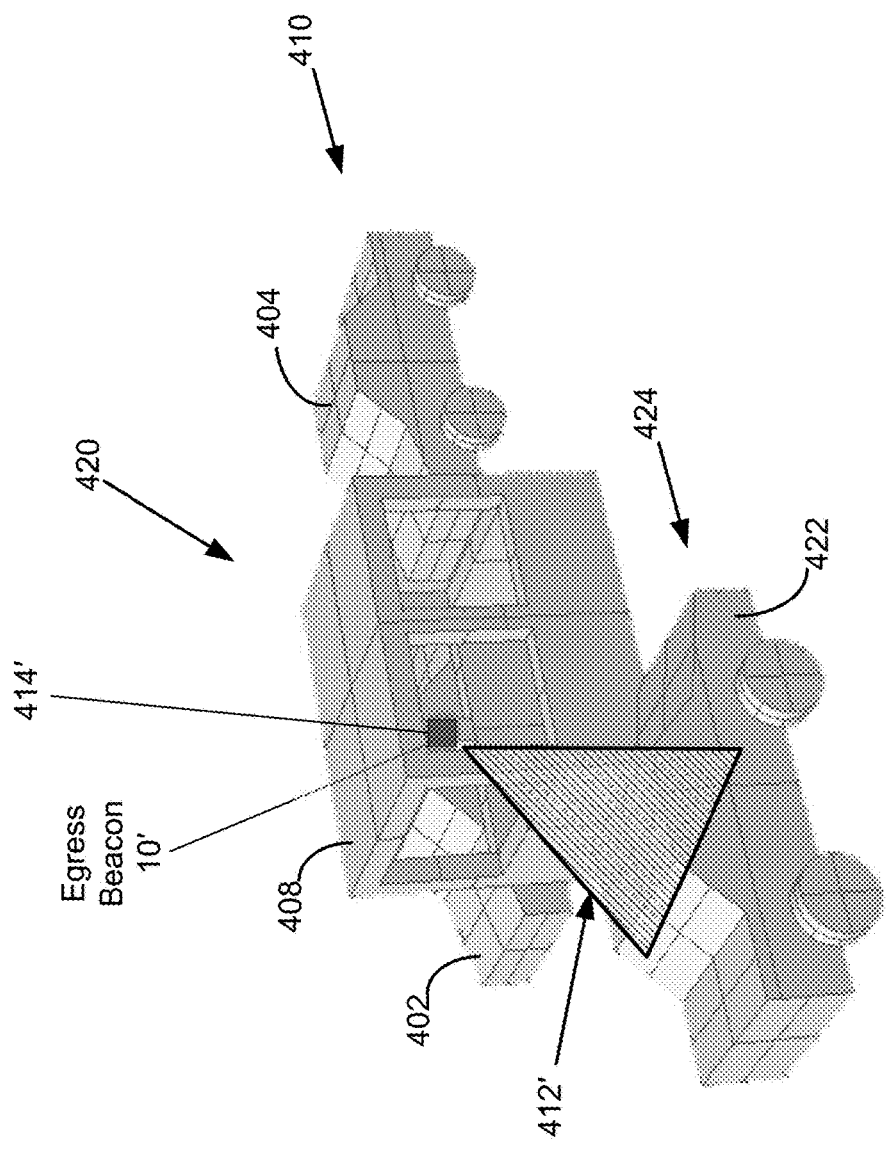
Figure 13:
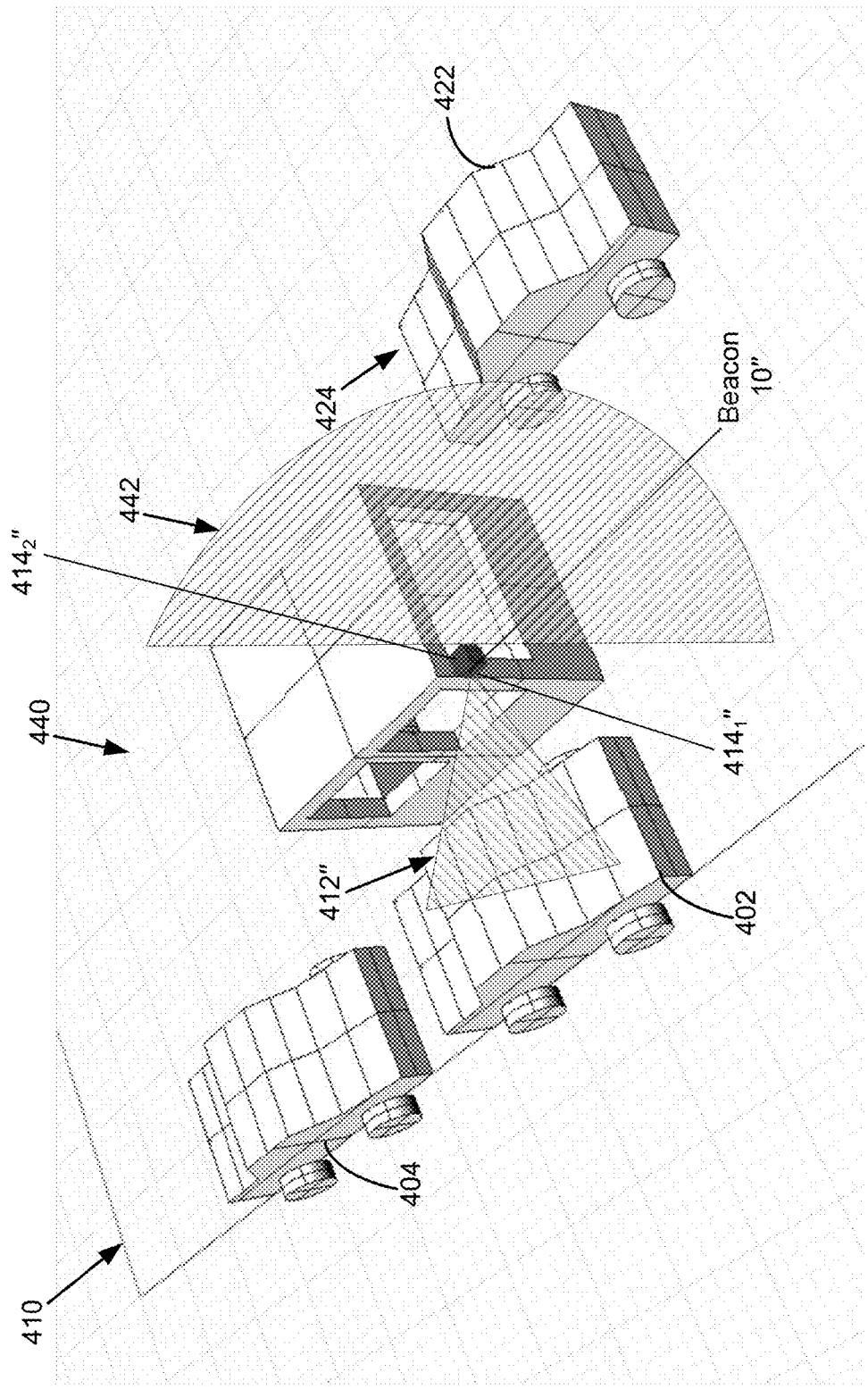
Figure 14:
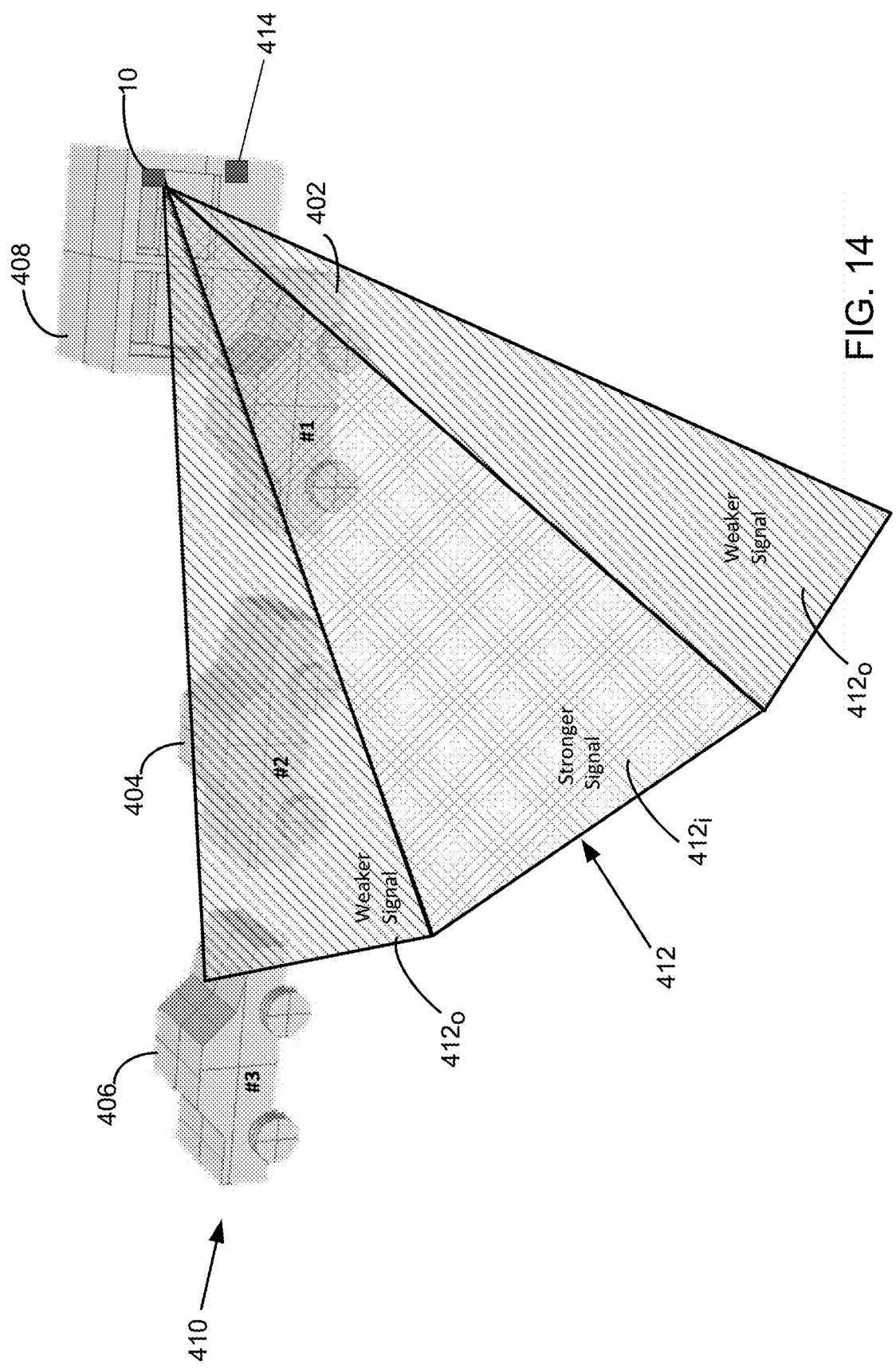
FIG. 14 is a pictorial diagram showing an antenna radiation pattern of the source beacon shown in FIG. 11, in which the radiation pattern is tailored to virtually eliminate premature detection by a vehicle before its turn to check-in a parking area.

FIGS. 11, 12, and 13 are pictorial diagrams illustrating source beacon placement for detecting, respectively, vehicles entering (ingress beacon), vehicles exiting (egress beacon), and vehicles entering and exiting (combined ingress/egress beacon) a parking area. FIG. 14 illustrates an antenna radiation pattern tailored to virtually eliminate premature detection by a vehicle before its turn to check-in the parking area.

FIG. 11 illustrates a vehicle ingress scenario 400 in which vehicles 402, 404, and 406 in a queue approach a gate or kiosk 408 as they enter a parking area. Beacon 10 is fixed to kiosk 408 to direct RF emissions toward an entry lane 410 along which vehicles entering the parking area travel. Beacon 10 includes a directional antenna that is configured to emit an RF signal in a conical radiation pattern 412. Conical radiation pattern 412 of RF emission limits the region of reception of the Bluetooth® low energy (BLE) signal pointed to vehicle 402, which is positioned nearest to beacon 10. Vehicle 402 is shown in the lead position of the queue including vehicles 404 and 406. The directional antenna is preferably a patch antenna that is positioned to provide line-of-sight RF emissions into vehicle 402.

A magnetometer 414, which detects large masses of metal, is also fixed to kiosk 408 to detect the presence and direction of movement of a vehicle but not the presence of a person. Magnetometer 414 is shown as a separate item fixed to kiosk 408 but may be included inside the housing of beacon 10 to form a single unit. Magnetometer 414 is preferably an HMC5883L three-axis digital compass available from Honeywell International Inc. The three-axis digital compass detects the direction of movement of the vehicle moving in entry lane 410. Placement of magnetometer 414 eliminates a possibility of intentional or accidental activation of a parking facility entrance barrier gate (not shown) upon completion of a connection handshake between beacon 10 and smart device 36, authenticating or validating a vehicle parking account. There is no required sequence of detection by magnetometer 414 of a vehicle moving in entry lane 410 and of the occurrence of the connection handshake and parking account validation. The result of the connection handshake and account validation process and the use of magnetometry is reduced opportunity for fraud or accidental opening of the entrance barrier gate.

The effort to reduce incidence of accident or fraud can be accomplished also by the motion sensor technology, including the accelerometer and pedometer, implemented in smart device 36. Motion sensor technology can be used to distinguish between walking and running movements of the vehicle driver and movement of the vehicle and thereby detect when a vehicle driver carrying smart device 36 attempts to prematurely conclude a vehicle parking session by approaching a parking facility exit barrier gate beacon 10 while the vehicle remains parked in its spot.

FIG. 12 illustrates a vehicle egress scenario 420 in which a vehicle 422 traveling along an exit lane 424 moves past kiosk 408 to exit the parking area. A second beacon 10' fixed at the rear portion of kiosk 408 provides monitoring of vehicles traveling along exit lane 424 to exit the parking area. Beacon 10' includes a directional antenna of the same type as that of beacon 10, emitting an RF signal in a conical radiation pattern 412' similar to conical radiation pattern 412 of beacon 10. A magnetometer 414', which is of the same three-axis type of magnetometer 414 and is shown included in the housing of beacon 10', contributes to eliminating accidental stoppage of elapsed parking time and the parking account. Such stoppage could take place by a customer, while standing at kiosk 408 and away from the parked vehicle, attempting to end a parking session.

FIG. 13 illustrates a combined vehicle ingress/vehicle egress scenario 440 in which a beacon 10" is equipped with two Bluetooth® low energy radios, the first one of which monitoring vehicles 402 and 404 traveling in entry lane 410 and the second one of which monitoring vehicle 422 traveling in exit lane 424. The first BLE radio, monitoring entry lane 410 for vehicle ingress, includes a directional antenna emitting an RF signal in a conical radiation pattern 412", as described with reference to beacon 10 in FIG. 11. The second BLE radio, monitoring exit lane 424 for vehicle egress, includes an omni-directional antenna that is configured to emit an RF signal in a hemispherical radiation pattern 442 of RF emission to monitor vehicles exiting the parking area. Two magnetometers 4141" and 4142", each of the same three-axis type of magnetometer 414, are shown included in the housing of beacon 10" for the same reasons given above for magnetometers 414 and 414'. Magnetometers 4141" and 4142" face toward, respectively, entry lane 410 and exit lane 424 to detect vehicles and their directions of movement.

FIG. 14 illustrates, for the ingress scenario 400 of FIG. 11, sectors of relative signal intensity in conical radiation pattern 412 of RF emission to demonstrate early radiation detection and thresholding by the BLE receiver in smartphone 36 to prevent premature check-in of vehicle 404 or vehicle 406 following behind vehicle 402. Conical radiation pattern 412 of RF emission from beacon 10 has an inner sector $412_i$ of stronger signal intensity pointed into vehicle 402 and two outer sectors $412_o$ of weaker signal intensity located adjacent either side of inner sector $412_i$ and pointed away from the front and rear of vehicle 402. To prevent premature check-in of a trailing vehicle, beacon 10 continually broadcasts a signal-strength calibration signal that indicates minimum and maximum "in-range" signal thresholds. The Citifyd App operating on user smartphone 36 uses the in-range signal values to determine whether a received RF emission from beacon 10 is of sufficient strength to begin communication with beacon 10, in accordance with the above-described procedure.

FIGS. 15, 16, 17, and 18 are block diagrams showing, among the components of the disclosed parking beacon system, various communication links that are active in different system communication scenarios.

Figure 15:
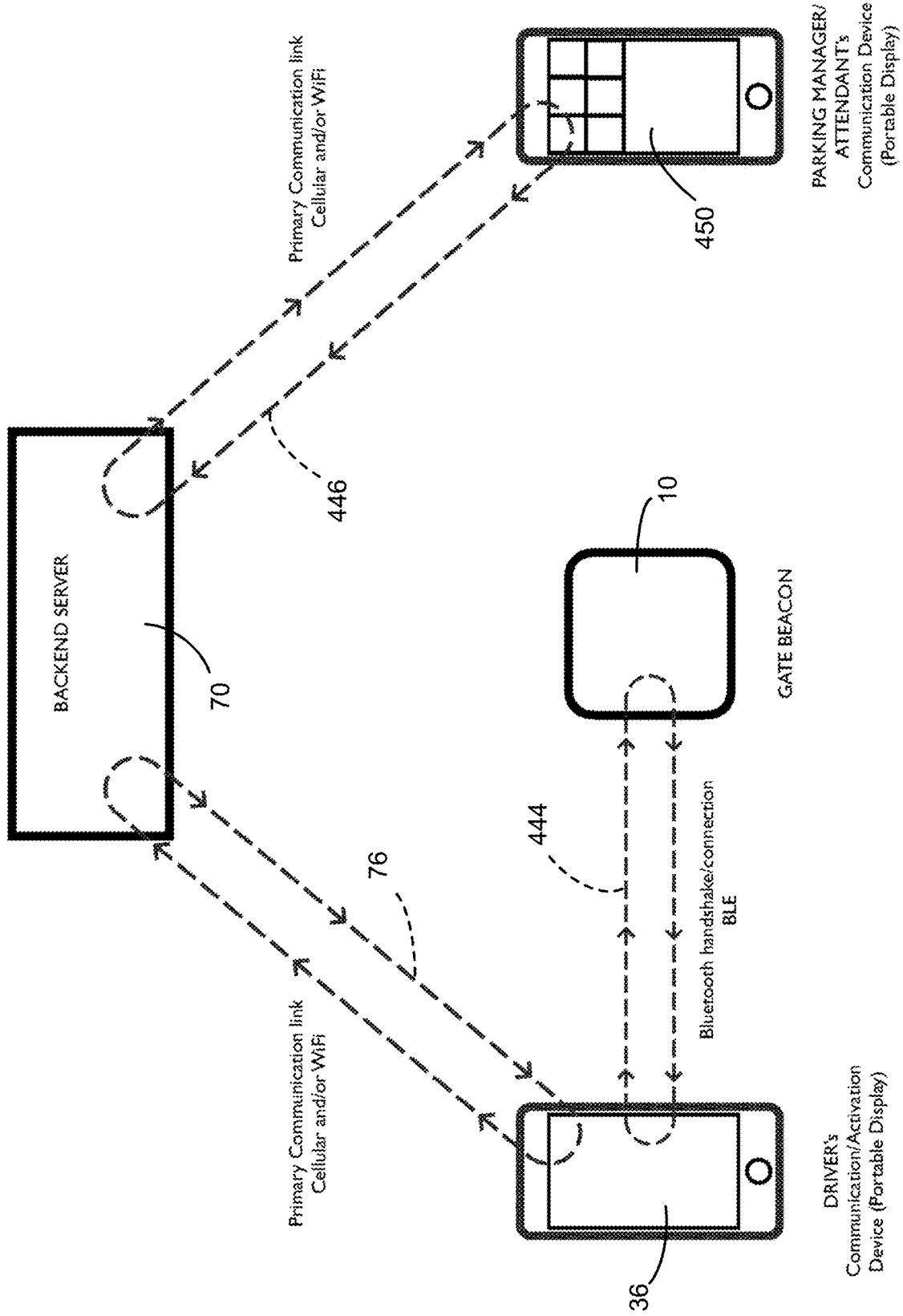
FIGS. 15, 16, 17, and 18 are block diagrams showing, among the components of the disclosed parking beacon system, various communication links that are active in different system communication scenarios.

FIG. 15 illustrates communication links established for a scenario in which user smartphone 36 communicates information to backend servers 70. User smartphone 36 has embedded in its memory stores parking pass and other user identification information available before the approaching vehicle reaches kiosk 408. User smartphone 36 receives the BLE signal to establish a communication link 444 to connect to beacon 10, and a connection handshake (i.e., information transfer) takes place to authenticate or not authenticate the parking pass purchase, to open the parking account, or both. Beacon 10 then uses smartphone 36 to communicate the parking pass and parking account information back to backend servers 70. Backend servers 70 use, as their primary communication link 446, one or both of their cellular and Wi-Fi communication network capabilities to provide real-time inventory and other related parking management information at the same time to an attendant's hand-held device 450 and to other stationary monitoring dashboards.

Figure 16:
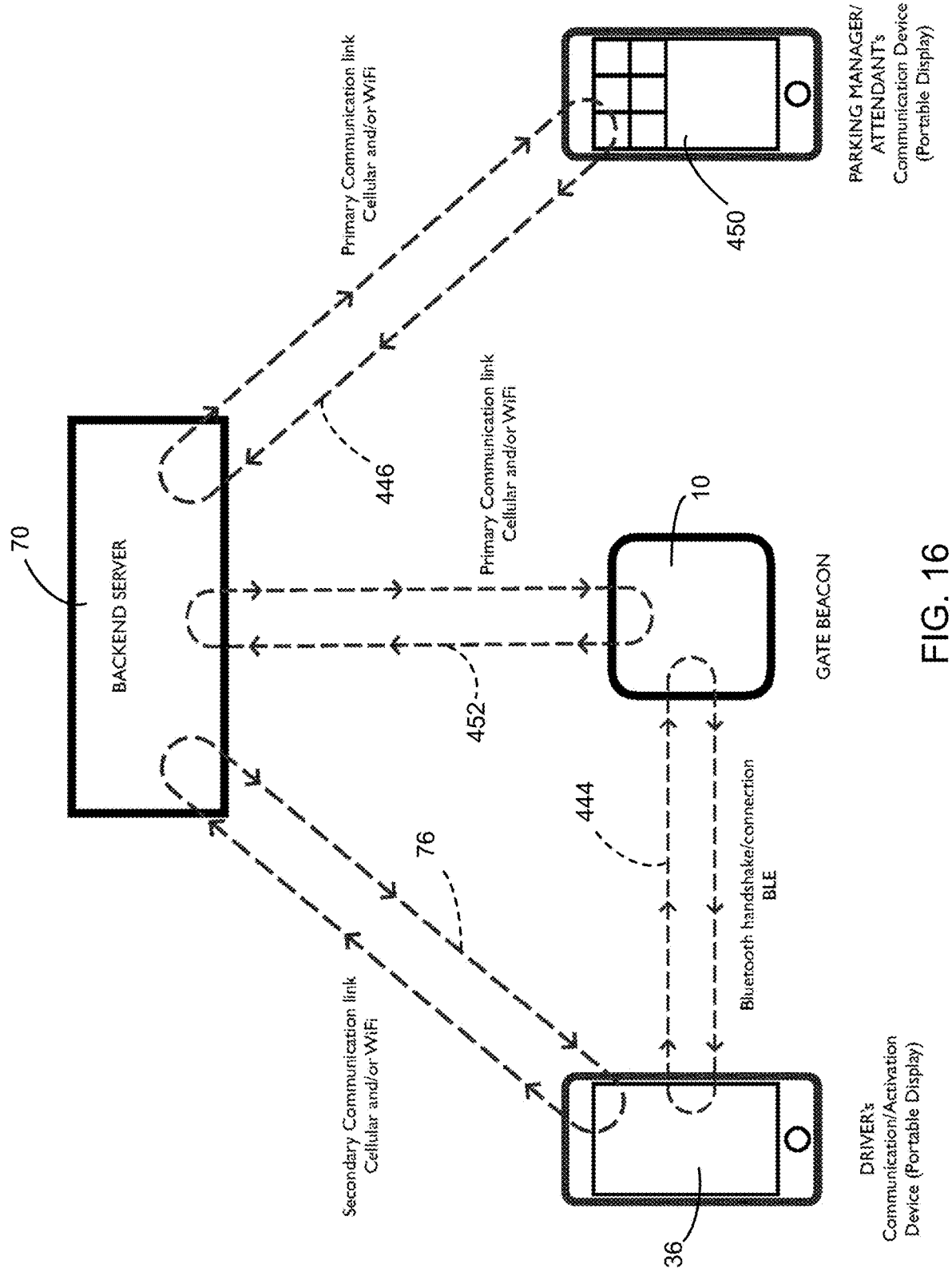

FIG. 16 illustrates communication links established for a scenario in which beacon 10 uses one or both of its Wi-Fi and cellular communication network capabilities to transmit information to backend servers 70. User smartphone 36 has embedded in its memory stores parking pass and other user identification information available before the approaching vehicle reaches kiosk 408. Smartphone 36 receives the BLE signal to establish communication link 444 to connect to beacon 10, and a connection handshake (i.e., information transfer) takes place to authenticate or not authenticate the parking pass purchase, to open the parking account, or both. Beacon 10 uses, as its primary communication link 452, one or both of its own Wi-Fi and cellular communication network capabilities to transmit the information back to backend servers 70. As a backup, the beacon 10 can use, as a secondary communication link 76, one or both of the cellular and Wi-Fi communication network capabilities of smartphone 36 to communicate with backend servers 70. Backend servers 70 use, as their primary communication link 446, one or both of their cellular and Wi-Fi network communication capabilities to provide real-time inventory and other related parking management information at the same time to attendant's hand-held device 450 and to other stationary monitoring dashboards.

Figure 17:
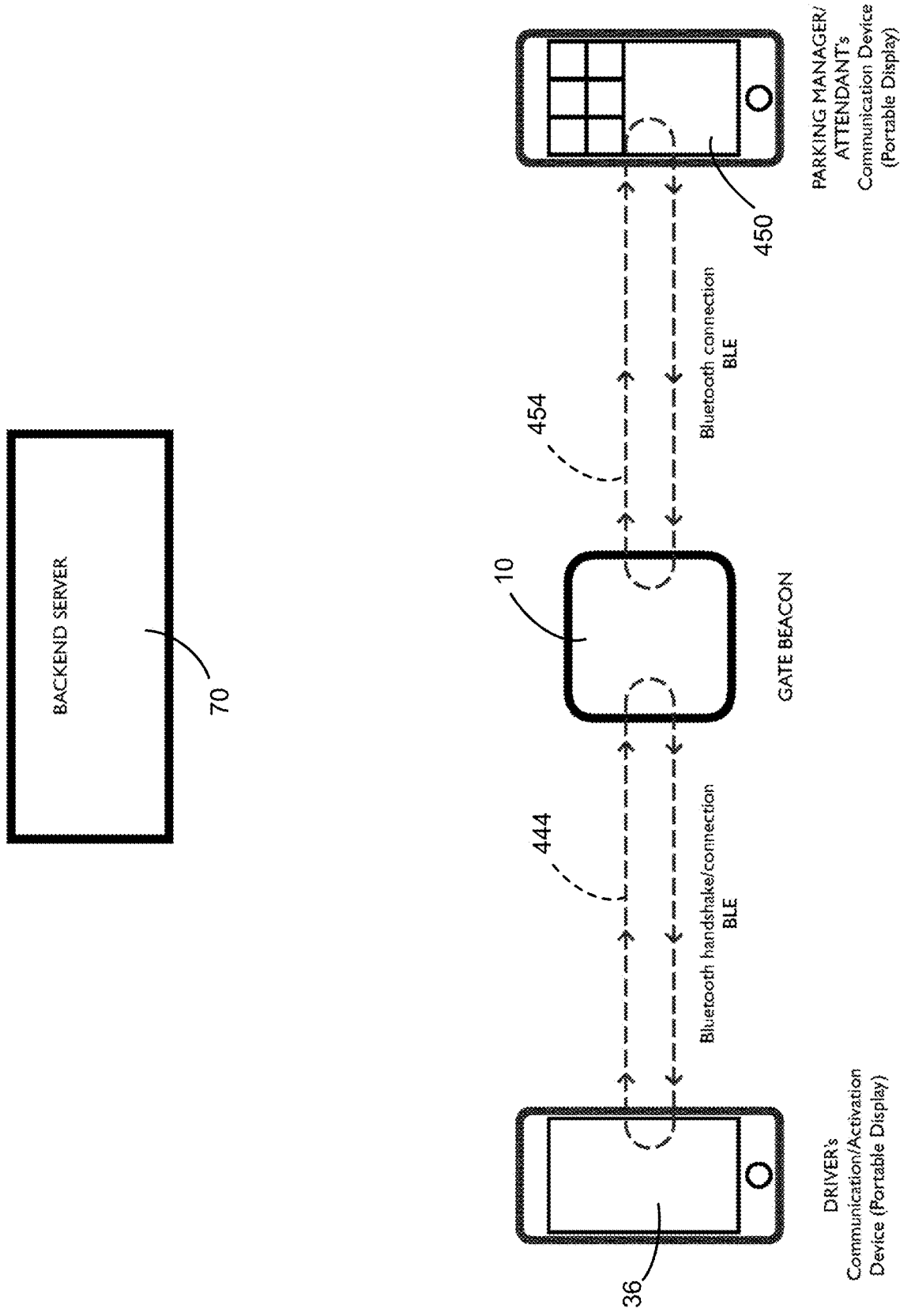

FIG. 17 illustrates communication links established for a scenario in which there is a lack of, or disruption in, communication network connection to backend servers 70. User smartphone 36 has embedded in its memory stores parking pass and other user identification information available before the approaching vehicle reaches kiosk 408. Smartphone 36 receives the BLE signal to connect to beacon 10, and a connection handshake (i.e., information transfer) takes place to authenticate or not authenticate the parking pass purchase, to open the parking account, or both.

Whenever there is a lack of or disruption in communication network connection to backend servers 70, beacon 10, which has stored in its memory, for all parking system users, identification information and parking passes for an event previously uploaded or uploaded and updated every few minutes, can at the same time use BLE connectivity to establish a communication link 454 to communicate and provide real-time inventory and other related parking management information to attendant's hand-held device 450 and other stationary monitoring dashboards in its vicinity. This back-up method is independent from either one or both of cellular and Wi-Fi communication network connectivity and reduces any disruption of authentication during vehicle ingress and egress. Upon restoration of communication network connectivity, the data are transmitted at a later time to backend servers 70 by one or both of beacon 10 and parking attendant's hand-held device 450 for further analysis and permanent storage in backend servers 70.

Figure 18:
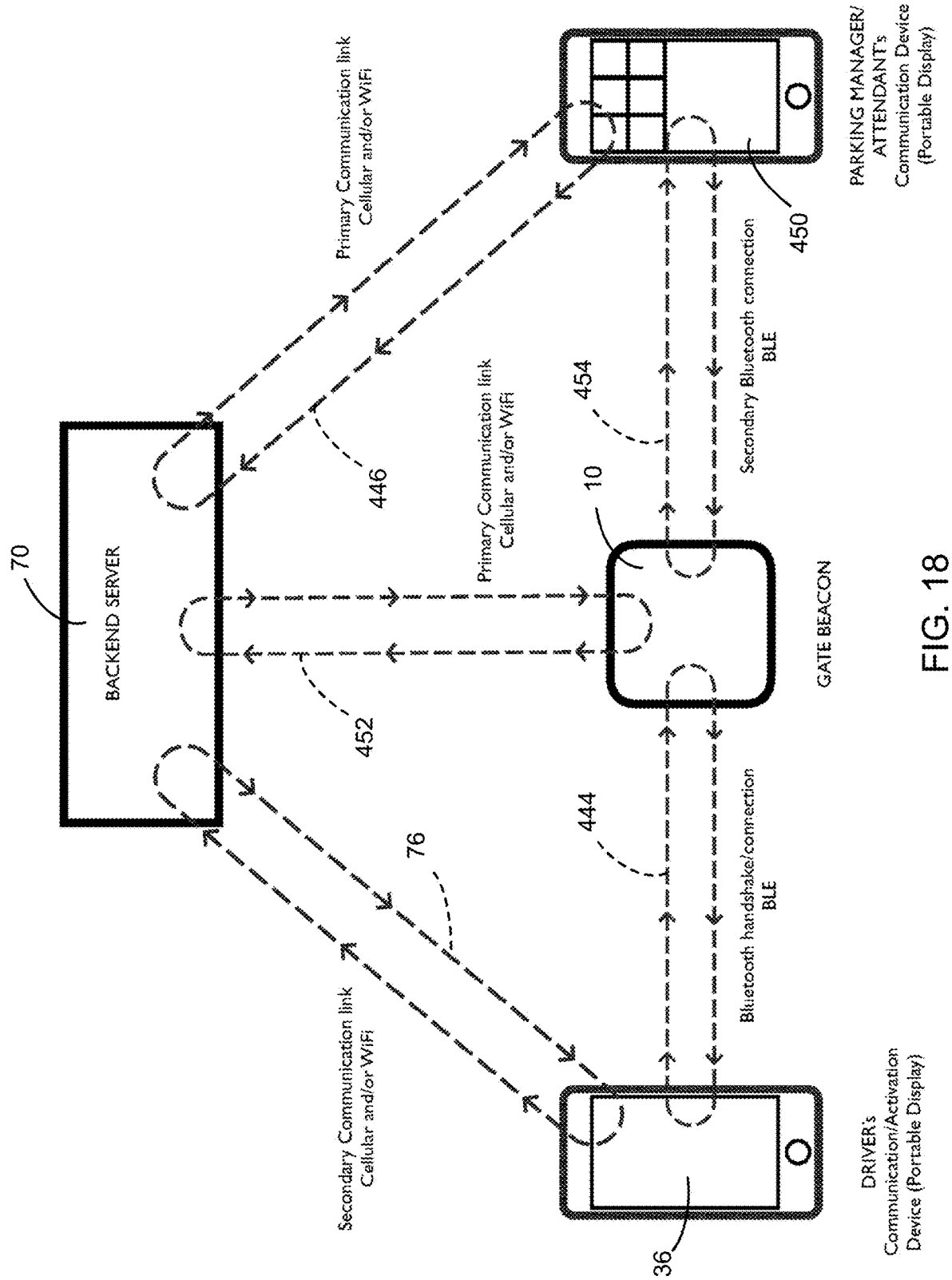

FIG. 18 illustrates communication links established for a scenario in which beacon 10 uses smartphone 36 as a backup to communicate with backend servers 70, the BLE signal connection of beacon 10 to communicate with parking attendant's hand-held device 450, or both. User smartphone 36 has embedded in its memory stores parking pass and other user identification information available before the approaching vehicle reaches kiosk 408. Beacon 10 uses, as its primary communication link 452, one or both of its own Wi-Fi and cellular communication network capabilities to transmit the information back to backend servers 70. As a backup, beacon 10 can also use smartphone 36 to communicate by communication link 76 with backend servers 70, the BLE signal connection 454 of beacon 10 to communicate with parking attendant's hand-held device 450, or both. Backend servers 70 use, as their primary communication link 446, one or both of their cellular and Wi-Fi communication network capabilities to provide real-time inventory and other related parking management information at the same time to parking attendant's hand-held device 450 and to other stationary monitoring dashboards.

FIGS. 19A, 19B, 19C, 19D, and 19E present different processing stages in the implementation of a method of achieving accurate authorization of a vehicle approaching a parking garage or surface lot entrance or exit location. The method is carried out using a gate/attendant (hereafter, gate) beacon 10, backend servers 70, and user smartphone 36 in operative cooperation with communication links 76, 444, and 452 configured as shown in FIG. 16. Each of FIGS. 19A, 19B, 19C, 19D, and 19E shows vehicle 402 at three different locations (4023, 4022, and 4021) as it approaches gate beacon 10 in the direction indicated by the INGRESS arrow.

Figure 19A:
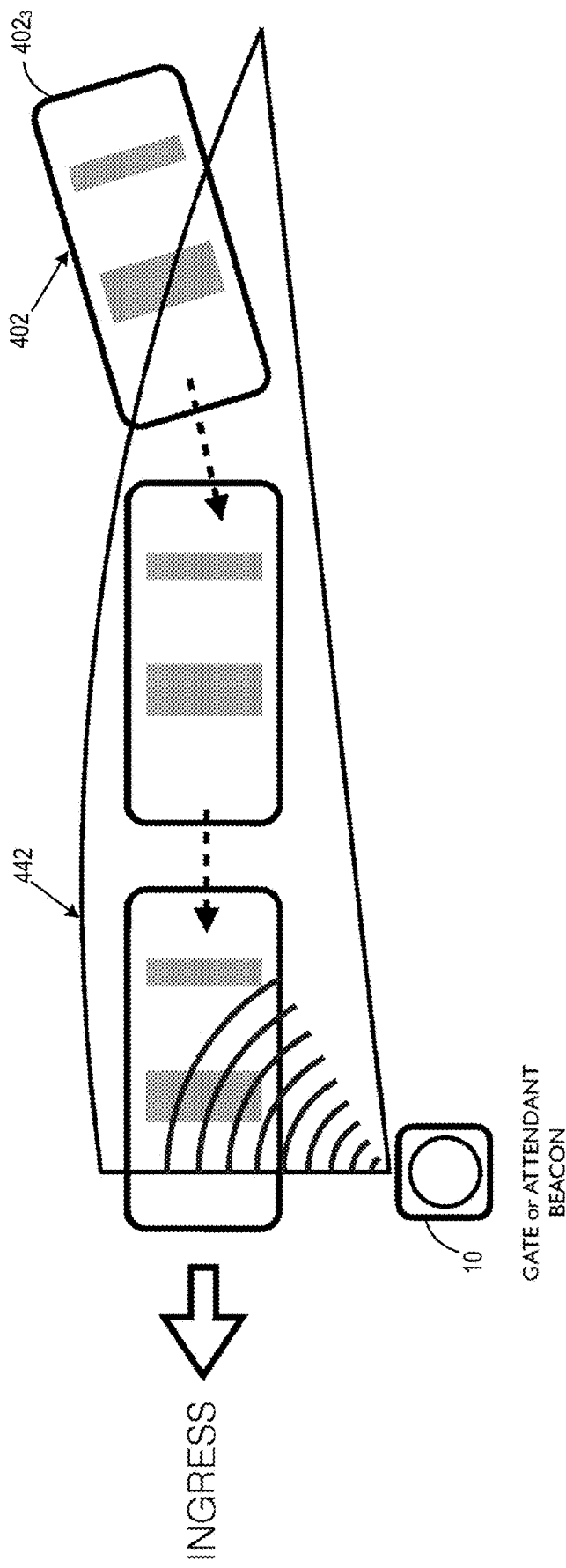

With reference to FIG. 19A, gate beacon 10 is equipped with a BLE radio including an omni-directional antenna that is configured to emit an RF signal in hemispherical (180°) radiation pattern 442 of RF emission. Gate beacon 10, using its antenna emitting radiation in the hemispherical radiation pattern 442 and BTLE-GATT technology, can detect user smartphone 36 in vehicle 402 at location 4023 from about 70 m away as vehicle 402 approaches gate beacon 10.

Figure 19B:
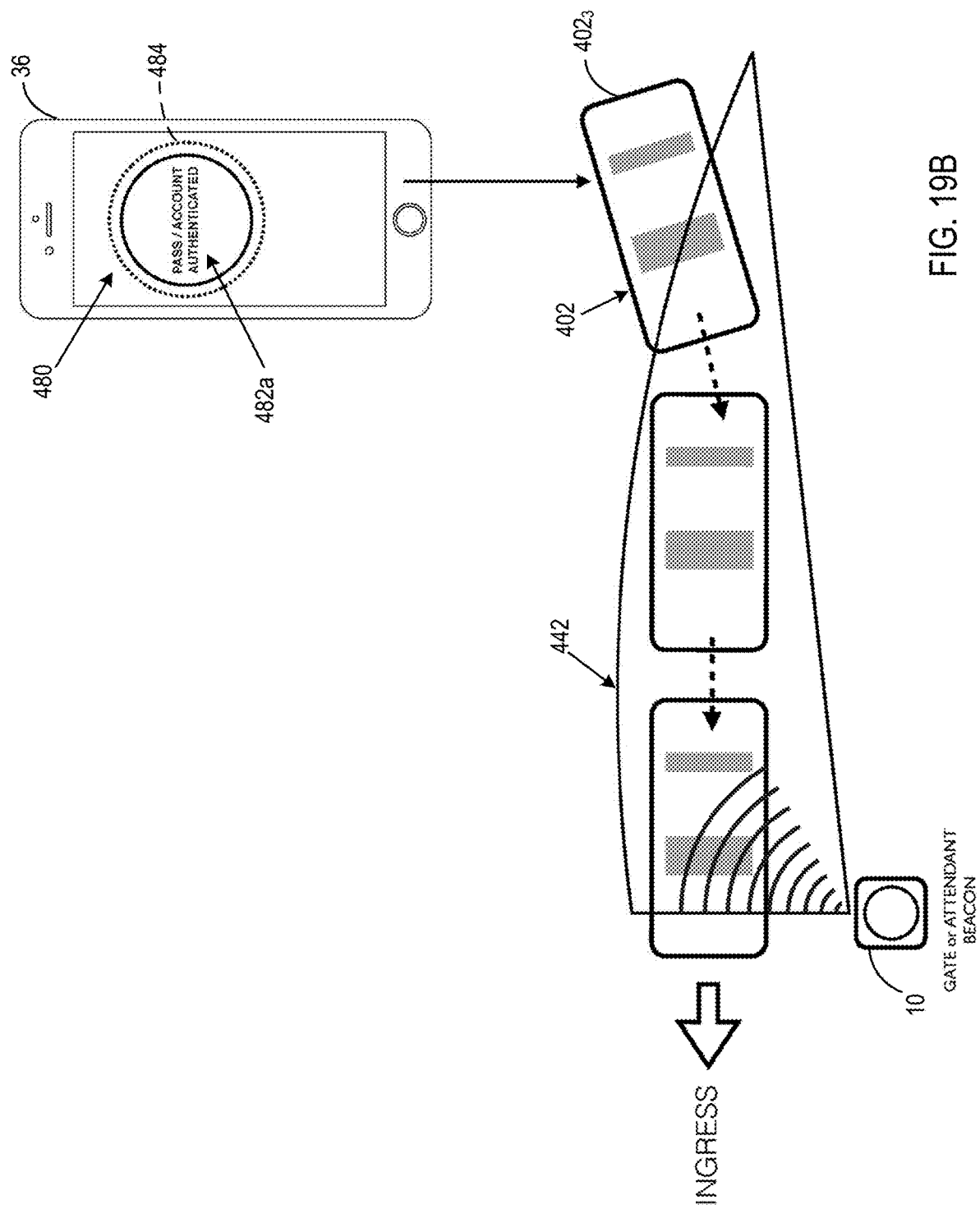

With reference to FIG. 19B, at this time, if the Citifyd App is off, the BTLE-GATT technology wakes up the Citifyd App and a connection handshake takes place over communication link 444 between user smartphone 36 and gate beacon 10. Through communication among user smartphone 36, gate beacon 10, and backend servers 70 (FIG. 16), the authentication process is complete. A change in a display screen background color 480 and a message 482a appearing on user smartphone 36 indicate successful completion of authentication. A moving component, such as a ring 484, on the display screen of user smartphone 36 provides assurance to the attendant that the display screen is live and not a photograph.

With reference to FIG. 19C, as vehicle 402 gets closer, at location 4022, to the gate or attendant, the changing movement (e.g., rotation or pulsation) of ring 484 and screen background color 480 indicate the approach to an authorization zone 486, where the gate is located or an attendant is standing.

Figure 19D:
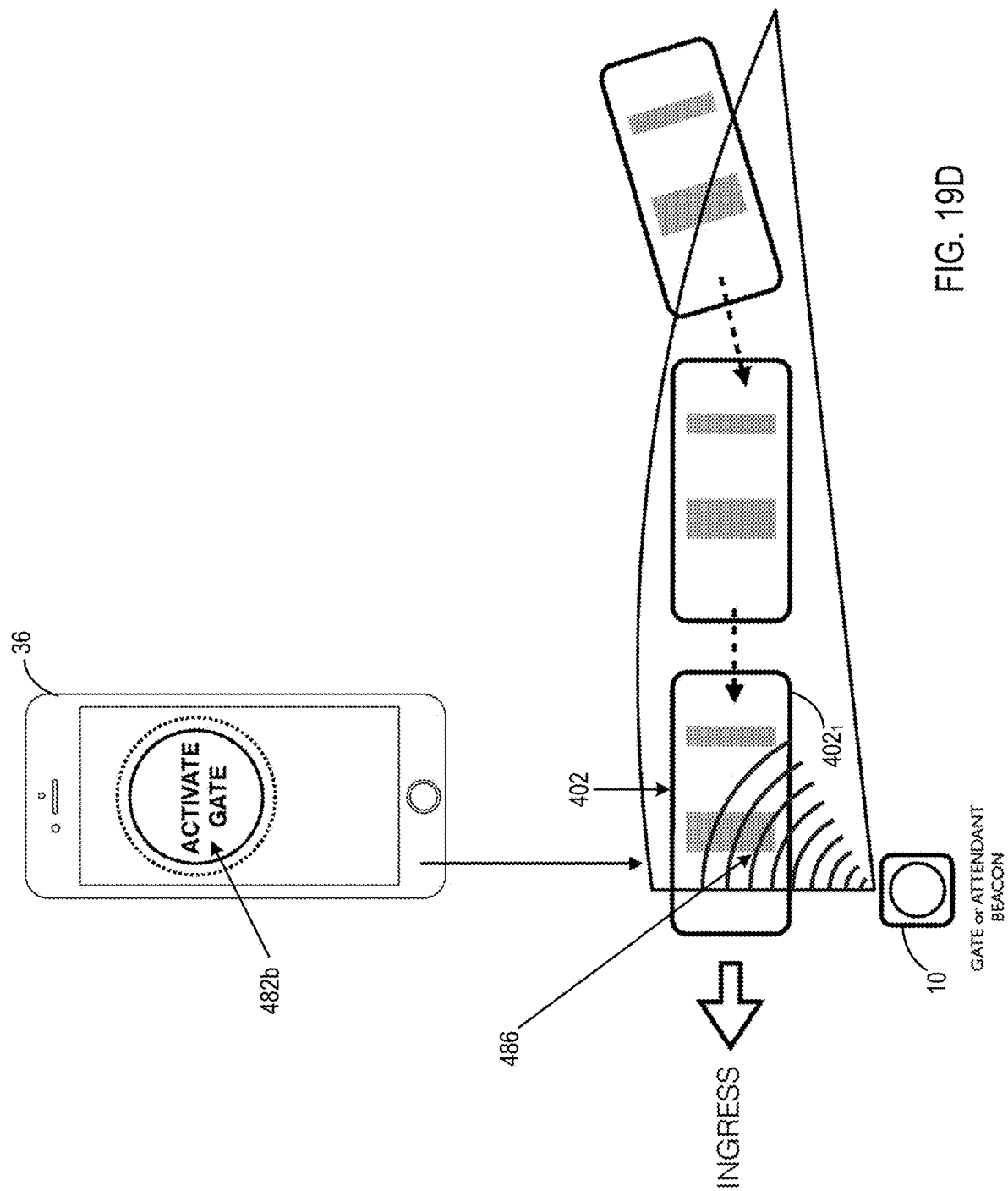

With reference to FIG. 19D, when vehicle 402 reaches authorization zone 486 at location 4021, the connection over communication link 444 between gate beacon 10 and user smartphone 36 changes the display screen such that an activation button/message 482b replaces authentication message 482a and prompts the vehicle driver to activate one or more of the gate, pass, and ticket.

Figure 19E:
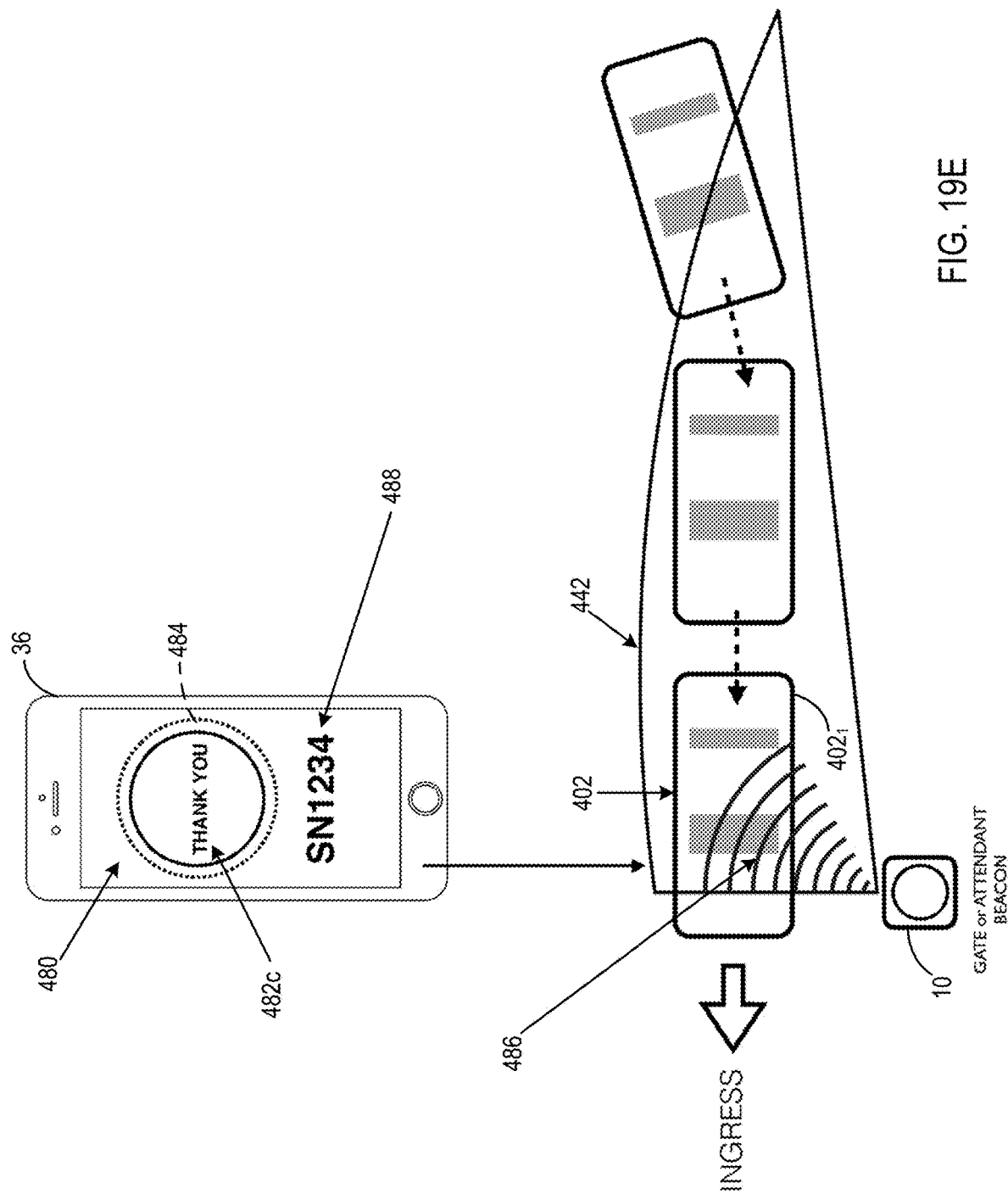

With reference to FIG. 19E, when the vehicle driver actuates button 482b on the display screen, authorization to admit the vehicle driver is made through communication among user smartphone 36, gate beacon 10, and backend servers 70 (FIG. 16). At this time, the gate opens, the attendant allows the vehicle driver to pass through the gate, or both. For occasions in which there is no gate and there are only attendants, to enhance security and reduce fraud, the actuation of button 482b also causes a change to the display screen background color 480 and display of a different message 482c. This action also creates a code/number 488 that appears on the display screen. The code identifies the gate beacon 10 to which user smartphone 36 is connected and the authorized entrance. Code/number 488 also identifies the event for which the pass was issued. Code/number 488 in conjunction with the moving image (in this embodiment a rotating or pulsating ring 488) and changing background color 480 assure the attendant of the authenticity of one or both of the pass and ticket.

The following describes in detail parking management activities associated with event-based vehicle parking in a facility into which system 60 is installed. The parking management activities are described with reference to FIG. 20, which is an annotated flow diagram showing the interaction between parking or backend servers 70 and a monitoring App operating on a parking attendant's or operator's hand-held device 450. The last digits of the figure number indicate the consecutive order of the drawing sheets as they are assembled from left to right to present the entire flow diagram. The flow diagram is in the form of screenshots showing information displayed on attendant's hand-held device 450 for different interactions with system 60 as different associated activities take place. A screenshot is represented by an alphanumeric character within a circle. A database symbol identified by an Arabic numeral within a circle represents an operational interaction in a series of operational actions with backend servers 70 as the activity is carried out.

Figures 1, 20:
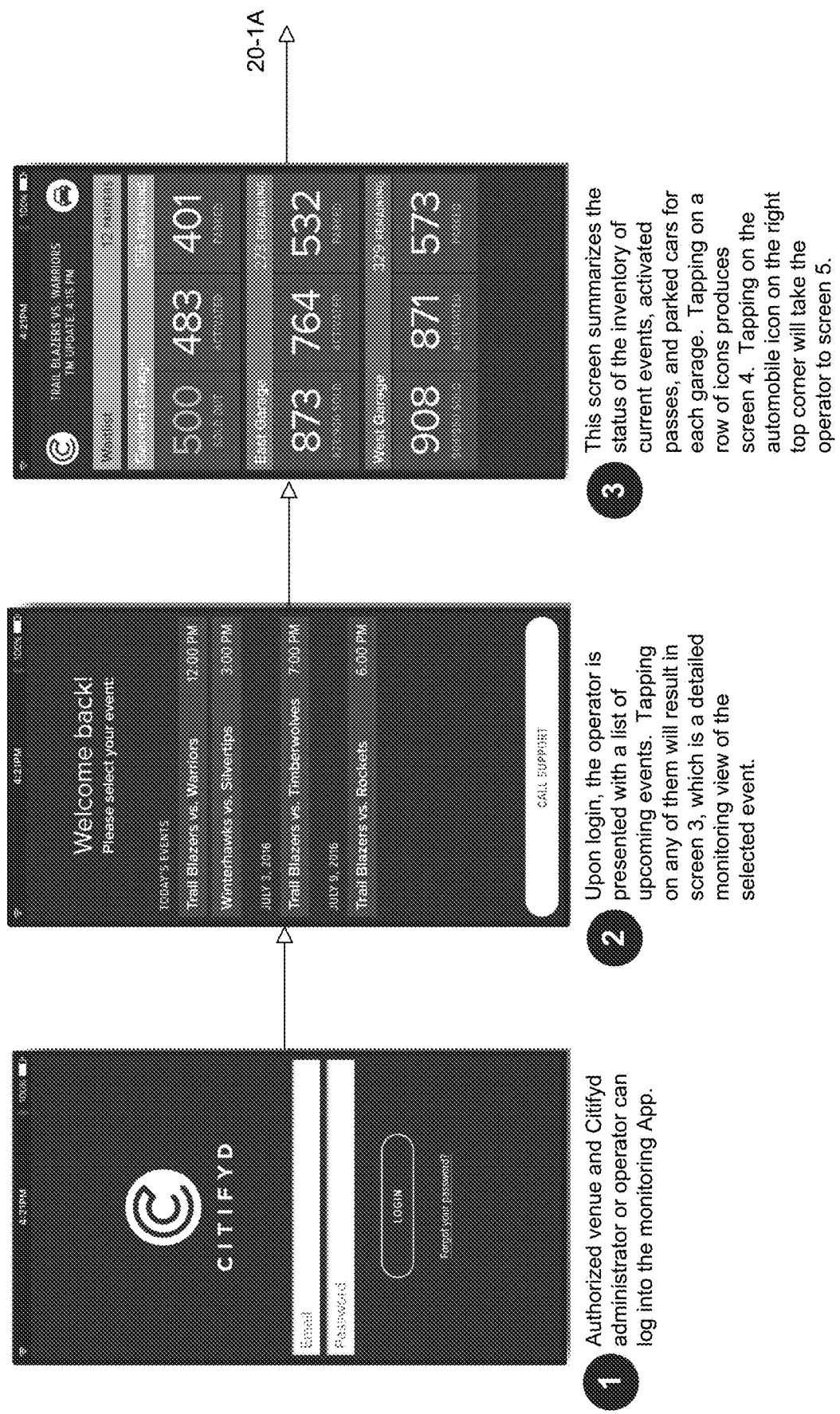
Figures 2, 20:
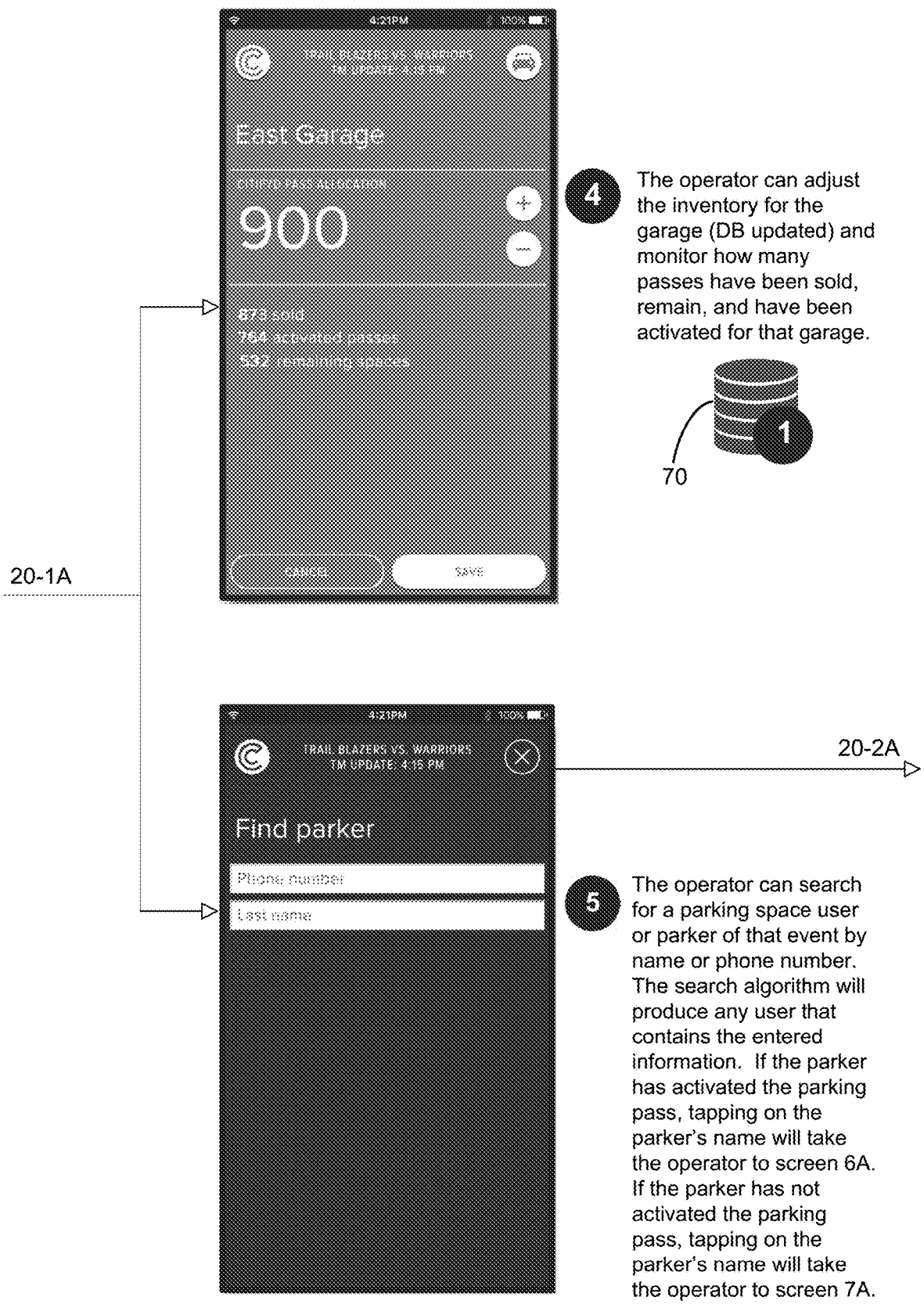

FIG. 20, which includes a set of four drawing sheets (FIGS. 20-1, 20-2, 20-3, and 20-4) describes the functions performed by the monitoring App operating on a parking attendant's hand-held device 450 in cooperation with backend servers 70 in carrying out parking facility management activities, including event-based inventory control, parking space pass purchase monitoring, and individual parking customer service tasks.

Screen 1 displays to the Citifyd system administrator or operator a Login screen that includes Email and Password fields for completion to permit access to the monitoring App. The operator, by successfully entering the proper information and tapping on the LOGIN actuator, logs into the monitoring App and produces Screen 2. Screen 2 presents a list of upcoming events for which vehicle parking spaces are allocated. The operator, by tapping on any one of the displayed parking events, produces Screen 3, which, for the selected event, shows for each of three parking garage facilities, the numbers of parking passes sold, activated parking passes, and parked vehicles. An activated parking pass is a pass sold to a vehicle parker who has confirmed through the Citifyd App operating on user smart device 36 an intention to use the parking pass for the specified event. The inventory is expressed by showing the number of parking passes sold in relation to the total number of parking spaces allocated for each garage facility.

The operator has two options for actuating Screen 3. The operator, by tapping on a row of icons shown on Screen 3 for a given garage facility, produces Screen 4. Screen 4 enables the operator to adjust the inventory of parking spaces allocated for the selected garage facility and to monitor the number of passes sold, the number of passes activated, and the number of remaining allocated parking spaces in that garage facility. Operation 1 by backend servers 70 entails storing in its database any adjustment made to the inventory of allocated vehicle parking spaces. The operator, by tapping on an automobile icon, which is an image of the front end of an automobile in the upper right-hand corner of Screen 3, produces Screen 5, which relates to direct interaction between the operator and vehicle parker and enables operator use of a search algorithm to find the parking system account of a specific vehicle parker. Screen 5 displays telephone number and parker last name fields for completion by the operator to activate a search algorithm that performs a search of parking system accounts. A vehicle parker account developed by the search performed has either activated or not activated a purchased parking pass. The operator, by tapping on the vehicle parker's name shown on Screen 5, produces Screen 6A, if the parking pass has been activated, or produces Screen 7A, if the parking pass has not been activated.

Screen 6A shows the QR code of an activated parking pass of a vehicle parker identified by the search or the QR code of a vehicle parker's pass after it has been scanned by the operator when the QR code, for some reason, was not displayed on the vehicle parker's smart device 36. The operator, by tapping on an actuator identifying the specific vehicle to be parked, associates that specific vehicle with the selected parking event. When the vehicle being parked is not listed, the operator, by tapping the Other actuator, produces Screen 8A. Screen 8A displays a License Plate required field and vehicle Make and Color optional fields for completion by the operator to add a new vehicle to the vehicle parker's account. Upon completion of entry of the information about the vehicle, the operator, by tapping the Save actuator on Screen 8A, produces Screen 8B, which is an update of Screen 6A, and causes performance of Operation 2, which entails storing in the database of backend servers 70 the newly added vehicle information for this vehicle parker's account. Screen 6B represents the state in which a new vehicle, together with the QR code, is associated with the selected parking event for this vehicle parker.

Screen 7A shows a Tap to Activate Pass actuator, which the operator taps to activate a vehicle parker's previously non-activated pass for a listed vehicle. When the vehicle being parked is not listed, the operator, by tapping the Other actuator, produces Screen 8A and proceeds as described above in connection with a vehicle driver's activated pass for an unlisted vehicle. Upon completion of adding a new vehicle to the vehicle parker's account, the operator taps the Tap to Actuate Pass actuator to activate the vehicle parker's pass for the newly added vehicle. Screen 7B shows the QR code of the newly activated pass, which the operator can scan.

As a first example, iBeacon protocol functionality can be employed in the source beacon and used for broadcast in alternate time periods with GATT to facilitate communication with the customer smart device and be compatible with both standards.

As a second example, beacon 10 may be implemented with a communication signal interface to establish, through Wi-Fi local area wireless computer networking technology or cellular communication network protocol, a wireless communication link with the communication network system operating in a vehicle parking or mass transit station facility. This capability would enable a customer to carry out a parking or mass transit transaction under a circumstance of operational delay or failure of wireless communication link 76 between user smartphone 36 and backend servers 70. Under such circumstance, a customer entering a parking garage or a transit station terminus can use smartphone 36 to carry out a transaction by establishing, through the garage or station facility Wi-Fi or cellular communication network system, a communication link between beacon 10 and backend servers 70.

As a third example, another way for a parking attendant to search for a parking pass that cannot be activated entails the parking attendant using hand-held device 450 as a beacon. By bringing hand-held device 450 close to the user smartphone 36 for a BLE connection handshake, hand-held device 450 receives the account identification number from user smartphone 36 and contacts backend servers 70 or uses its downloaded database located within hand-held device 450 to check for authorization and validation of the pass.

In the embodiments described below with particular reference to the operation of the vehicle parking management system, the Citifyd App and a SmartBeacon device are implemented with iBeacon wireless personal area network technology standard equipment, with the source beacon broadcasting regularly.

The Citifyd App operating on a customer's or user's smart device 36 (preferably, and hereafter sometimes referred to as, smartphone) scans for and monitors a SmartBeacon device. The scanning process is based on the GPS coordinates of the user's smartphone 36 and starts scanning for SmartBeacon devices in the vicinity of the user's location. The App presents to the user vehicle parking locations available in the vicinity of the user, the actual live inventory of parking spots for each parking location presented through a Live Inventory Management Engine (LIME), and identifies pricing through a Pricing Engine for each parking location. (The term parking location refers generally to a site of a surface or an open parking lot, a parking garage, or other vehicle parking facility.) The LIME and Pricing Engine operate on the backend servers. Once the user selects a parking location by one or both of advance purchasing a parking spot and landing in a parking lot that is Citifyd system-enabled with a SmartBeacon device, the App connects to the SmartBeacon device for that parking lot location. At this point, the App switches from Monitoring to a Ranging Mode for access control.

A SmartBeacon device applies a system of unique beacon ID filtering and a four-fold proximity test (i.e., ranging) to determine the appropriate SmartBeacon device to which smartphone 36 is to connect.

Backend servers 70 first provide to the App a list of unique SmartBeacon device IDs of and information associated with the nearby entrances and exits of the parking garage or lot the user driving a vehicle is entering or exiting. This information includes latitude and longitude of each of the entrances and exits, an indication whether the SmartBeacon device is dedicated for ingress or egress, a unique identification number, and indications of the hardware sensing abilities of the SmartBeacon device (specifically, is a configuration capable of sensing when a vehicle is located over an arming loop embedded in the ground (i.e., in front of an access gate), and is the configuration capable of detecting whether the access gate wired to the SmartBeacon device is physically open).

The App distinguishes whether the user driving the vehicle is in an ingress or egress scenario, and knowing the user's location, filters out any unwanted SmartBeacon devices for the current situation and scans for only the SmartBeacon devices it desired. Furthermore, if fewer than the expected number of beacons are detected, the App assumes that another Citifyd system user is currently connected to one of the SmartBeacons and will wait until it determines that the other user has disconnected before completing the scanning process.

The four-fold ranging test procedure after this filtering process includes Tests A, B, C, and D and is as follows.

Tests A and B use iBeacon proximity value measurements, which come in as "Immediate," "Near," "Far," or "Unknown" distances from the SmartBeacon device, in conjunction with the iBeacon identifying minor value, which is an integer between 0-65535 that broadcasts the unique identification number of that iBeacon.

Test A: Does iBeacon report the SmartBeacon device as "Immediate" (<~0.5 m) or "Near" (<~3.0 m) at the instantaneous moment of measurement?

Test B: Over an interval of N seconds, were over M number of "Immediate" or "Near" proximities measured? The values of N and M are adjustable (by manual or machine learning) to fine-tune Test B.

Once tests A and B pass, the iBeacon continues ranging to maintain the validity of its results, but also begins BLE communication-enabled device discovery, which scans for connectable BLE devices. Specifically, the iBeacon scans for devices whose broadcast manufacturer data and BLE device name provide additional information as to how to connect to the device. The device-naming convention of a SmartBeacon device looks like "C2<00300", and this name is parsed for the useful data it contains. The first character identifies the device as a Citifyd system SmartBeacon device and can be used for additional identification information. The second character represents the firmware version number of the SmartBeacon device, which can be used to help decide the intricacies of further communication. The third character is the ASCII code representation of the received signal strength indicator (RSSI) signal strength threshold that is required to pass Tests C and D. This character can be further adjusted by backend servers 70-side provided information received in the filtering process in order to facilitate adjustments when not in the field. The final 5 digits are again the unique identification number of the SmartBeacon device.

Test C: Over an interval of N seconds, have there been measured over M number of RSSI values that fall within the RSSI threshold defined in the device name? These N and M values can be independent from those in Test B and are adjustable to fine-tune Test C.

Test D: Over an interval of N seconds, has the Mode taken from the averaged values of all RSSI measurements been within the RSSI threshold on the device? (To take a Mode, the highest and lowest RSSI measurements in the array of RSSI measurements within the N second window are ignored.) This N value is also independently adjustable from the previous tests.

These tests, taken together, smooth out some of the moment-to-moment fluctuations in the RSSI radio signal strength of the BLE devices, thereby adding a greater degree of certainty as to the proximity of the user being within 0-3 meters of the SmartBeacon device and in all likelihood in front of the SmartBeacon device rather than to its side or behind it (the antenna on the SmartBeacon device is slightly directional).

If all four Tests A, B, C, and D are passed, the App assumes that the proximity of the user's vehicle is within a few feet of the access gate or SmartBeacon device. At this time, a connection is made between the user's smartphone and the SmartBeacon device, and a security handshake (password or shared private key exchange) takes place. Commands can then be sent between the App and the SmartBeacon device.

The SmartBeacon device also has the ability to look for Citifyd system App-enabled mobile devices for detection of the signal strength of the user's mobile device. Such ability enables the SmartBeacon devices to broadcast to which mobile device the SmartBeacon device believes is closest, thereby adding, effectively, a Test E.

Once user's smartphone 36 and the SmartBeacon device are connected, if the information provided by a SmartBeacon/Gateway indicates that the parking access gate and SmartBeacon device are able to determine whether the user's vehicle is located over a magnetic loop detector 2490 (FIG. 24) associated with the vehicle travel lane in front of the access gate, the App instructs the SmartBeacon device to poll the signal coming from the magnetic loop detector and allow the user to open the access gate only when that signal is positive. The SmartBeacon/Gateway is housed either in a container residing at the parking location or as part of an augmented vision system sensor unit, if it is installed at the parking location. At this time, the App also uses the motion detection hardware present in user's smartphone 36 to determine whether the user is indeed driving a vehicle and allows the user to open the access gate only when that condition is also satisfied. If neither the magnetic loop detector signal condition nor the vehicle motion condition is satisfied, the App, instead of providing on the smartphone screen a button to open the access gate, produces an on-screen call to action that instructs the user to pull forward the vehicle over the magnetic loop or return to the user's vehicle. The use of either one or both of the magnetic loop detector and motion detection hardware prevents accidental activation of a vehicle parking transaction session. Once the user presses an on-screen button provided in the App to open the access gate, the App begins polling a signal to detect whether the access gate opened (again if the SmartBeacon/Gateway indicates that this feature is available) and begins or ends a user's parking session on backend servers 70 once the successful opening of an access gate has been detected. If this signal fails to occur, the SmartBeacon/Gateway is notified of the failure and the user is given further on-screen instruction to troubleshoot the situation.

The App also has the ability to customize the SmartBeacon devices to the installed spaces. Because each parking garage inherently has variable signal-to-noise characteristics, the SmartBeacon device can be set to match the environment of installation through a set of proximity calibration set points that compensate for the variabilities for each site of installation.

The SmartBeacon device operating in coordination with integrated vision devices is capable of assigning detected objects to object tables in an object detection module at the point of entry and allow a pricing range for the sizes and types of the objects (such as, for example, trucks, sedans, motorcycles). The objects are reviewed in the vehicle travel lane's "field of vision" of the SmartBeacon device, and the pictorial proximities of the objects with respect to one another, as well as with respect to the SmartBeacon device (in multiple lanes of mixed ingress and egress), are determined.

Figure 21:
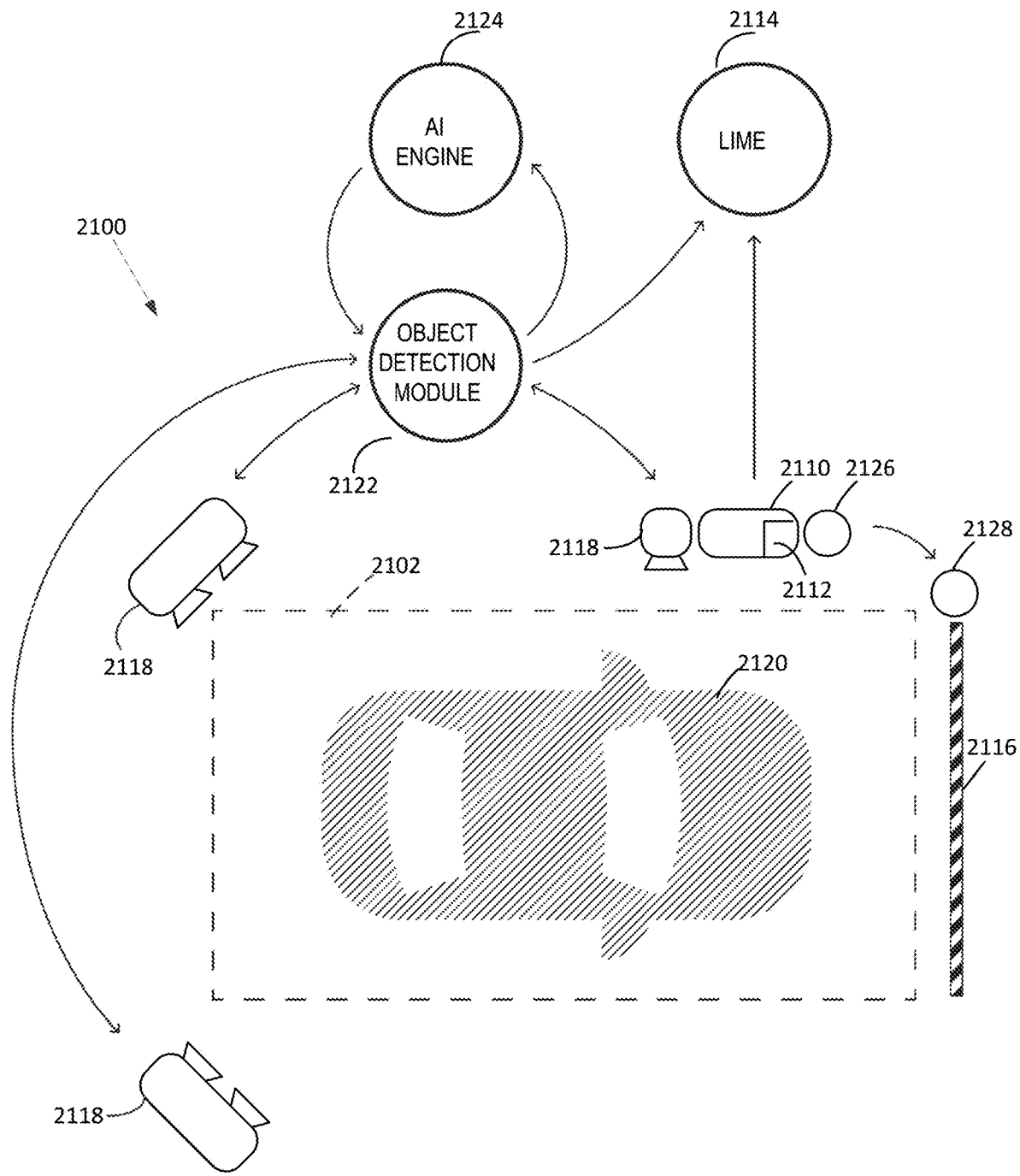
FIG. 21 is a block diagram showing the major components of a system in which a beacon operates in coordination with integrated vision devices to control and process vehicle parking.

FIG. 21 shows a SmartBeacon device operating with the capabilities described for SmartBeacon device 10 and in coordination with integrated vision devices to form a system 2100 that assigns values representing type, price, and other attributes to objects entering a detection area 2102. A SmartBeacon device 2110 includes a SmartBeacon/Gateway 2112, to which general reference was previously made. System 2100 including its source beacon component SmartBeacon device 2110 are configured and operate as described with reference to system 60 and source beacon 10, respectively, in accordance with the enhancements set forth below. SmartBeacon/Gateway 2112 is a computing platform with CPU control center, WiFi wireless connectivity, BLE, Ethernet system protocol, LTE network, and USB standard interface capabilities and performs the following functions: acts as a secure network router that connects all sensor and other smart devices to the Citifyd system virtual network; runs a LIME Vision Agent 2114; performs all SmartBeacon device 2110 functions; manages communications to any existing access gates 2116; performs indoor positioning in accordance with Citifyd system-specific positioning methodologies, including use of two inline beacons positioned a specific distance between them in one vehicle travel lane as described below with reference to FIG. 24; performs manageability functions, such as operational health of SmartBeacon devices 2110, the components of the computing platform, and the Citifyd system as a whole; and enables remote software upgrades.

SmartBeacon device 2110 with augmented vision system sensors 2118 identifies an object 2120 (shown and referred to as a vehicle) and the direction of travel of the object 2120 requesting access to a parking structure. Vision system sensors 2118 placed around detection area 2102 also identify the type of object 2120. Vision system sensors 2118, depending on the site application, may include, for example, one or more of an IR sensor, a camera, a thermal sensor, a magnetometer, a pressure sensitive bar, a sound sensor, a light detection and ranging (LIDAR) sensor, a laser-based depth sensor, a motion sensor, and a beam break technology-based sensor. Vision system sensors 2118 use an object detection module 2122 as part of a LIME Agent 2114 vision system software component to assign a proper identification to the current object 2120 in detection area 2102.

Vision processing entails the use of the Open Source Computer Vision Library (OpenCV Library) with its deep neural network (DNN) execution environment. OpenCV Library is a cross-platform library of programming functions mainly directed to real-time computer vision. LIME Agent 2114 uses DNN associated with Mobile Net-SSD, with site-specific training. Mobile nets are for mobile and embedded vision applications and are based on architecture that uses depthwise separable convolutions to build light weight deep neural networks. OpenCV 3.4.1 is a deep learning module with Mobile Net-SDD for object detection. The source code can be downloaded from https://opencv.org.

This comparison is strengthened over time through an AI Engine 2124 operating in backend servers 70 to compensate for environmental variations. AI Engine 2124 recognizes changes in ambient environment over time. Such changes include, for example, effects of weather on background illumination, daylight and nighttime conditions, and an oversize vehicle straddling two parking spaces. AI Engine 2124 enables performing parametric changes in vision system sensors 2118 to compensate for such environmental changes.

If the user has access to software that can interact with SmartBeacon device 2110, it in turn can activate an NFC/RFID communicator 2126 to cause an access gate controller 2128 to open access gate 2116, allowing vehicle entry into the parking structure. Regardless of whether SmartBeacon device 2110 and NFC/RFID communicator 2126 granted access to the user, LIME Agent 2114 operating in backend servers 70 and executing instructions on SmartBeacon/Gateway 2112 is updated with the type of object 2120, inventory count, and other metrics collected in detection area 2102 once object 2120 passes through access gate 2116 and into the parking structure.

The vision-based SmartBeacon device 2110 utilizes raster/vector-based algorithms that delineate and distinguish between object 2120 and the direction of travel. Sensors 2118 and objects 2120 are correlated through object detection module 2122. For an open surface lot environment, such as that shown in FIG. 23, an accessory pole-mounted vision system that processes images at the source (edge processing vision system) and transmits only a set of relevant interpolated results to SmartBeacon/Gateway 2112 through cellular tower connection or other methods (including the App) for transmitting the fully interpolated data to SmartBeacon/Gateway 2112. This vision system can also be installed for gated lots as well as private lots.

LIME Agent 2114 has the ability to process video streams from vision system sensors 2118 and detect vehicles of interest in each video frame it processes. LIME Agent 2114 implements AI methodologies such as deep neural network systems with a pretrained detection library for objects of interest such as, for example, cars, trucks, sport utility vehicles, buses, trailers, motorcycles, delivery trucks, and bicycles. It can use video frame subtraction methodologies to identify moving objects. The detection system of LIME Agent 2114 has the capability to decipher vehicle type, size, location, license plate, and other unique identifiers, such as make and model, color, and vehicle beacon IDs. LIME Agent 2114 software includes a kernelized correlation filter (KCF) tracking framework, a core component of which is a discriminative classifier that distinguishes between a target and surrounding environment. The source code can be downloaded from https://github.com/joaofaro/KCF/cpp. LIME agent 2114 implemented with a KCF tracking architecture has the ability to track multiple detected vehicles within predefined localized region(s) of interest and calculate relative motion vectors for each vehicle. The tracking module of LIME Agent 2114 uses a combination of movement prediction and actual image characteristics of each vehicle for tracking. This system has the ability to resolve for stagnant cars within the region of interest and track partly occluded objects. The system activates vehicle processing by locking on to each vehicle within the region of interest and thereafter computes net movement to ingress or egress after the vehicle is no longer within the region of interest. LIME Agent 2114 communicates information relating to egress and ingress vehicle movements through a secure representational state transfer (REST) application-programming interface (API) to backend servers 70. LIME Agent 2114 has an ability to change vision system sensor settings to compensate for environmental variations. LIME Agent 2114 is also implemented with redundant processing in cooperation with a thermal sensor to provide an ability to compensate for environmental conditions in which a typical RGB camera is impaired (such as snow, extremely low light, or fog) by switching to different sensors as appropriate for the given environment (for example, switching to LI DAR, a thermal sensor, or an IR sensor). This would entail switching to, for example, a thermal sensor and loading an associated neural network training file for thermal images.

Figure 22:
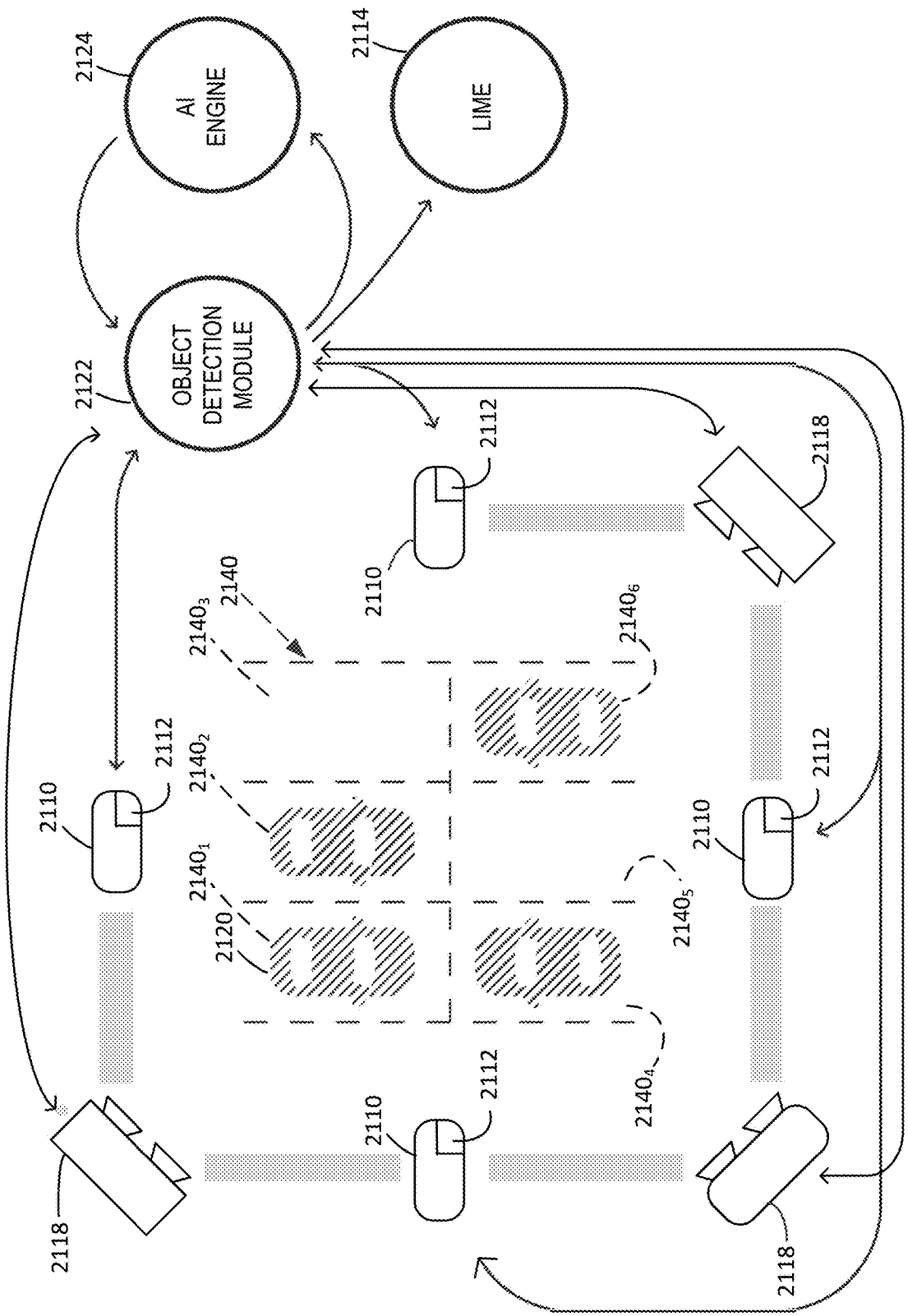
FIG. 22 is a block diagram showing for a parking lot a detection area including multiple vehicle parking spaces for use in describing the operation of a Live Inventory Management Engine.
Figure 23:
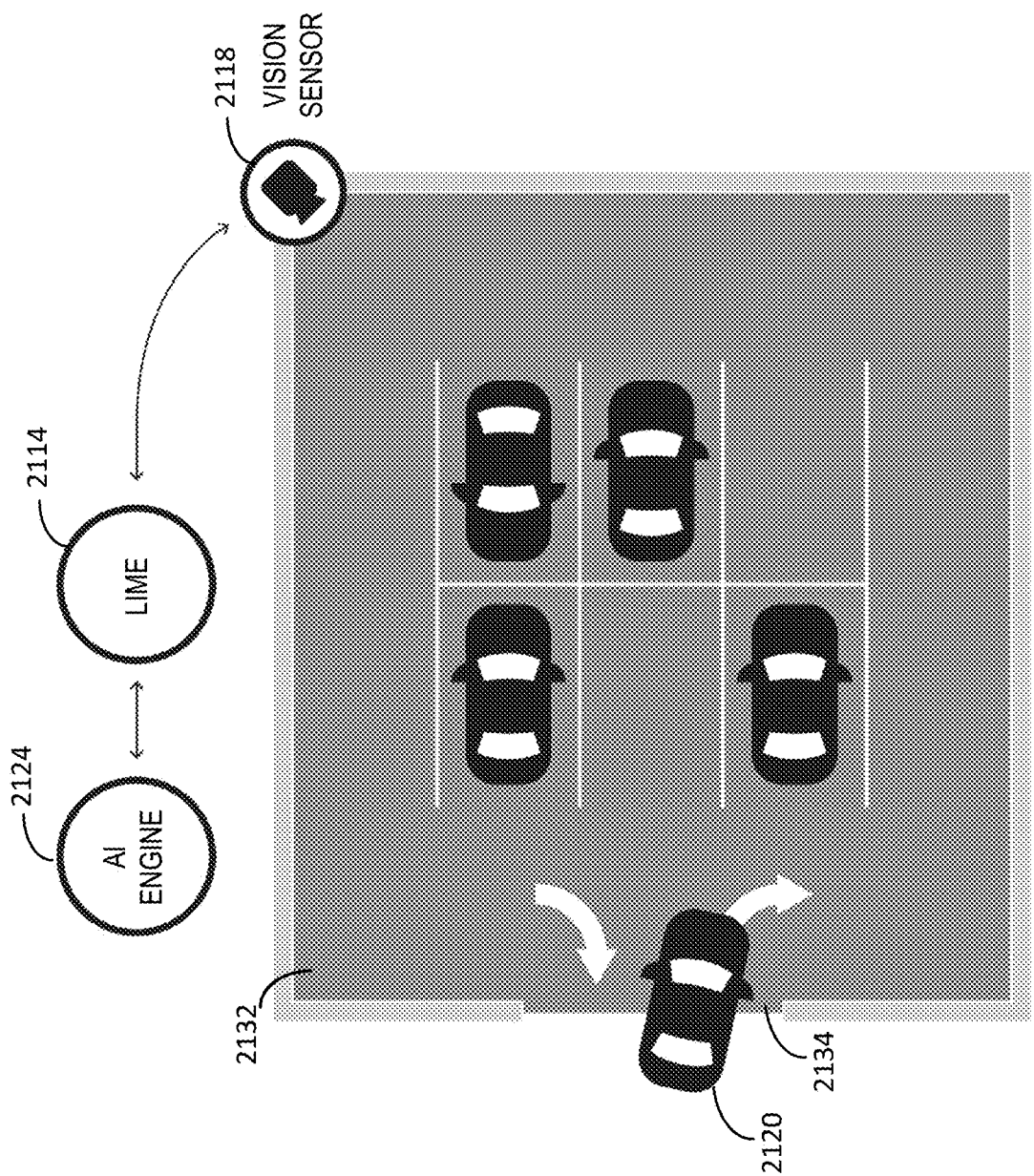
FIG. 23 is a diagram showing vehicle ingress and egress travel paths at an access region of an ungated surface parking lot monitored by a vision sensor.

FIG. 22 shows three vision system sensors 2118 and four SmartBeacon devices 2110 placed at different locations around six vehicle parking spaces or spots $2140_1$, $2140_2$, $2140_3$, $2140_4$, $2140_5$, $2140_6$ in a detection area 2140 to implement LIME Agent 2114. Surface and gated lots can also be equipped with a pole-mounted vision system to identify available parking spots for local spot guidance/navigation. FIG. 23 shows a vision system sensor 2118, preferably a camera, placed to monitor an ungated surface parking lot 2132 to identify available parking spots in it. Use of a camera to monitor ungated surface parking lot 2132 enables detection of instances of ingress and egress of vehicle 2120 through access region 2134 and thereby facilitates recordation of a vehicle parking transaction session. An object/space detection algorithm continuously compares images of larger areas to determine a change in the "state" of a parking spot through "object/spot comparisons algorithms." The methodology delineates available parking spots (i.e., parking spots $2140_3$, $2140_5$) as compared to occupied parking spots (i.e., parking spots $2140_1$, $2140_2$, $2140_4$, $2140_6$) through a vectorized methodology, as compared to rasterized methodology, for rapid processing. The comparison of an occupied parking spot with respect to a background (unoccupied reference) enables the open lot parking spot navigation through vision systems that are interpolated at the vision system sensor and only the relevant resulting data are transmitted through the network.

LIME Agent 2114 provides public and private connectivity for identifying live inventory data for all parking lots in the Citifyd system, as well as an independent channel for LIME Agent 2114 for entities outside of the Citifyd system. The algorithm compensates for weather variation, along with other environmental factors, by recalibration of reference points through AI Engine 2124 with various live feed and sensor inputs. Background reference points are compared from time to time as a result of sensors input data, as well as other live feeds (e.g., weather pattern). Random reference comparison points and times are determined through a self-learning AI Engine 2124 (cluster of vision system sensors 2118). These vision system sensors 2118 are used to activate and unleash self-learning environmental parameters and patterns that can improve the calibration of reference points. Vision system sensors 2118 that collect the input for AI Engine 2124 may include RF heat detectors in combination with a depth sensing vision system, stereo camera clusters with variable depth of field adjustment per installation, along with an RGB camera system. The RGB camera system is connected to the Citifyd SmartBeacon system, which is edge processor-enabled and extrapolates and interpolates one or both of object movements and stationary objects in larger areas.

The combination of multiple SmartBeacon sensors data and RGB remote camera systems distinguishes between objects, the heat pattern from objects, as well as the depth of an object and thereby continuously enhances AI Engine 2124 for the specific installation and site-specific data. AI Engine 2124 has the ability to coordinate and feed reference geographic based data for other nearby (zone) locations.

A stereo camera system operating as a sensor can detect patterns of movements of objects in entry and exit vehicle travel lanes. Stereo camera sensors can be a combination of RGB and RF, along with other depth sensing signals.

RFID (active) communicators are enabled at SmartBeacon device 2110 for enabling access gate control without direct wiring to the access gate mechanism. This bypasses the direct connection and, as an option, coordinates inventory counts through the vision system and LIME Agent 2114 for gated parking garages.

A Lot Navigator application operating as part of LIME Agent 2114 in backend servers 70 is a localized navigation option for larger parking garages that need to direct incoming users to an available open parking space in the parking garage. The Lot Navigator option directs a user in a vehicle to a specific available spot through a map overlay of the lot in the Lot Navigator. The communication for the Lot Navigator is coordinated between multiple clusters of SmartBeacon devices 2110 in conjunction with GPS coordinates that connect through thread communication protocol to SmartBeacon/Gateway 2112 and backend servers 70. An example of the protocol is a WiFi network or a clustered beacon network using IEEE 802.15.4 protocols. The use of multiple pole-mounted vision system sensors facilitates an ability to communicate a full lot composite image to backend servers 70 for the purpose of open spot discovery. Lot Navigator uses and references comparative images from the pole-mounted vision system sensors 2118 to the reference background image to identify an available spot through LIME Agent 2114. LIME Agent 2114 has the ability to locally log to backend servers 70 all communications, including false positive images and negative images, locally or to backend servers 70 as necessary. False positive images are objects that are identified erroneously as vehicles. Negative images are vehicles that were missed by object detection module 2122. The vectorization computation and comparison is improved through AI Engine 2124 on a regular basis to compensate for environment variations.

The Lot Navigator uses the following equipment to direct incoming users to an available parking space. Pole-mounted vision system sensors 2118 report changes in inventory by reporting objects that result in change against a reference background image. This comparison is strengthened over time through AI Engine 2124 to compensate for environmental variations. Communication between vision system sensors 2118 and object detection module 2122 happens through SmartBeacon devices 2110 clustered around the parking structure. SmartBeacon devices 2110 act as a communication conduit between vision system sensors 2118 and SmartBeacon/Gateway 2112 and backend servers 70 through thread communication protocol (e.g., WiFi, IEEE 802.15.4 protocols, and LTE). Changes in parking space state—occupied or empty—are communicated through LIME Agent 2114 to the Lot Navigator by updating a map overlay of the parking structure. This information is passed along to the user through an application that will guide the user to an empty, assigned parking space.

Figure 24:
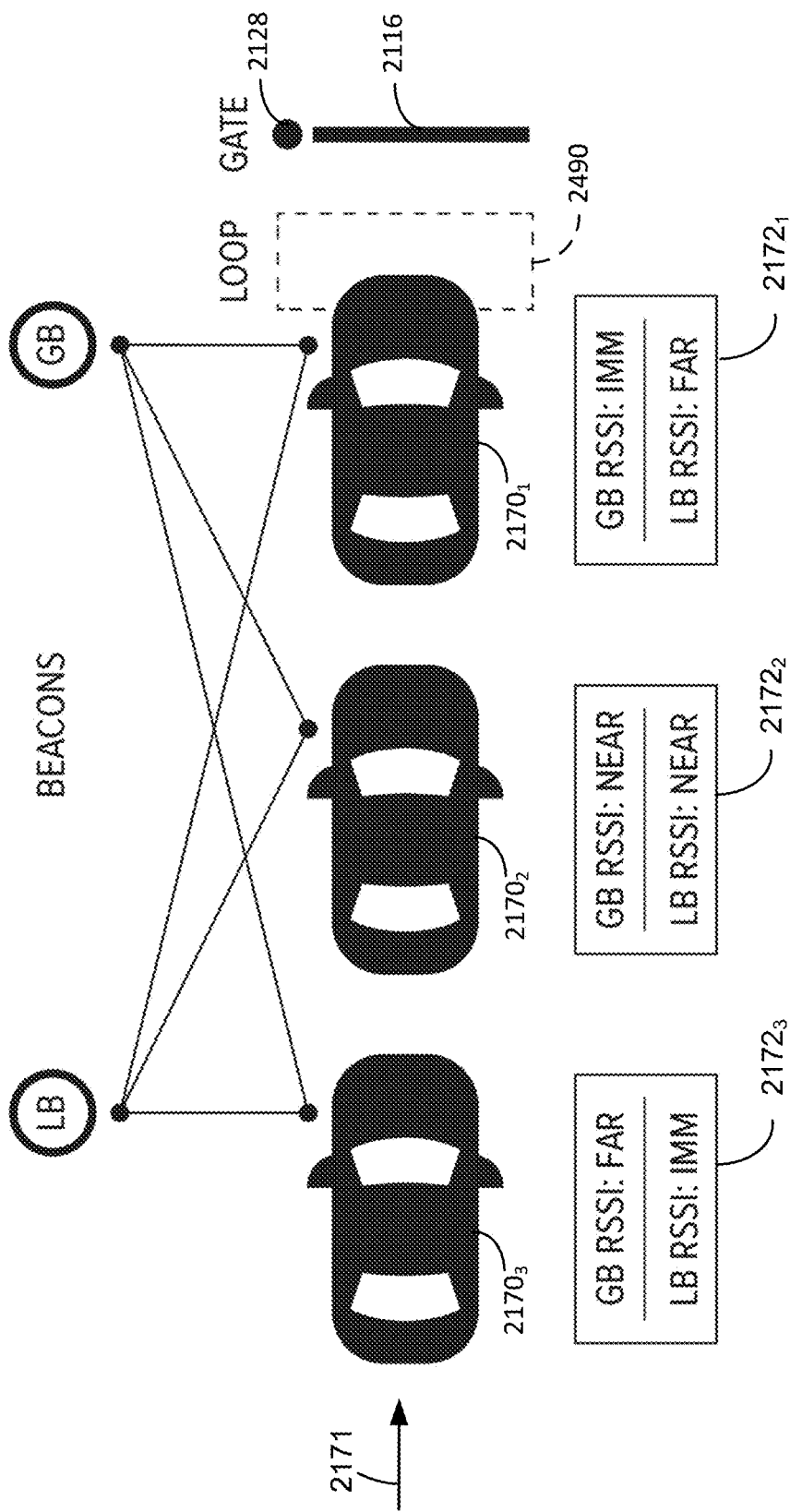
FIG. 24 is a diagram showing three vehicles arranged in a queue to illustrate a triangulation vehicle detection technique.

To facilitate description of an optional triangulation technique that is especially useful for vehicle detection at an ingress or egress access gate of a system not implemented with vision sensors, FIG. 24 presents a diagram showing vehicles $2170_1$, $2170_2$, and $2170_3$ arranged in a queue along a vehicle travel lane 2171 selectively blocked by operation of access gate 2116. The disclosed triangulation technique overcomes unreliable vehicle detection stemming from variable BLE signal absorption by different numbers of passengers occupying vehicles approaching access gate 2116 to either enter or exit a parking location. The objective is to open access gate 2116 to allow passage to the vehicle that is closest to access gate 2116, regardless of RSSI value variations resulting from hyper local environmental conditions in the vehicles (e.g., more or fewer occupants) while establishing a queue near the passage access gate beacon.

A SmartBeacon device 2110 (referred to as a gate beacon, GB) positioned near access gate 2116 is separated by a known distance from a standard BLE signal-emitting beacon (referred to as a lane beacon, LB) positioned along the travel lane. Gate beacon GB and lane beacon LB are preferably separated by 14 ft. (4.3 m), which is a distance of about two vehicle lengths, shown in FIG. 24 as extending between locations proximally forward of the lower sides of the windshields of vehicles $2170_1$ and $2170_3$. Gate beacon GB and lane beacon LB emit radio signals of substantially the same strength. Gate beacon GB and lane beacon LB cooperate to eliminate, irrespective of the number of passengers occupying a vehicle in the queue, the effect of signal absorption, which affects the RSSI radio signal strength measured by the SmartBeacon device.

In FIG. 24, boxes $2172_1$, $2172_2$, and $2172_3$ represent the GB RSSI and LB RSSI ratios of strengths of measured radio signals emitted by gate beacon GB and lane beacon LB for vehicles $2170_1$, $2170_2$, and $2170_3$, respectively. Box $2172_3$ shows, for vehicle $2170_3$, an RSSI ratio of <1 because of the immediate proximity of vehicle $2170_3$ to lane beacon LB relative to the far away distance from gate beacon GB. Box $2172_2$ shows, for vehicle $2170_2$, an RSSI ratio of about 1 because of the near proximity of vehicle $2170_2$ to each of lane beacon LB and gate beacon GB. Box $2172_1$ shows, for vehicle $2170_1$, an RSSI ratio of >1 because of the immediate proximity of vehicle $2170_1$ to gate beacon GB relative to the far away distance from lane beacon LB.

The RSSI ratios indicate the order of vehicles $2170_1$, $2170_2$, and $2170_3$ in the queue, with RSSI ratio=1 representing a tipping point at which the vehicles closest to and farthest from access gate 2116 exhibit the largest fraction>1 and the smallest fraction<1, respectively. The App operating on the smart device transmits the RSSI ratio information to gate beacon GB, which either causes the App carried by an occupant in vehicle $2170_1$ to produce an on-screen button for access gate control or causes access gate controller 2128 to open access gate 2116 for vehicle $2170_1$ to pass through.

The triangulation technique for vehicle detection is configured for use in multi-lane vehicle parking facilities, which often install access gate structures on a common lane divider. This technique enables opening the correct access gate associated with a gate beacon for a vehicle traveling in the lane associated with and positioned next to the access gate.

Figure 25:
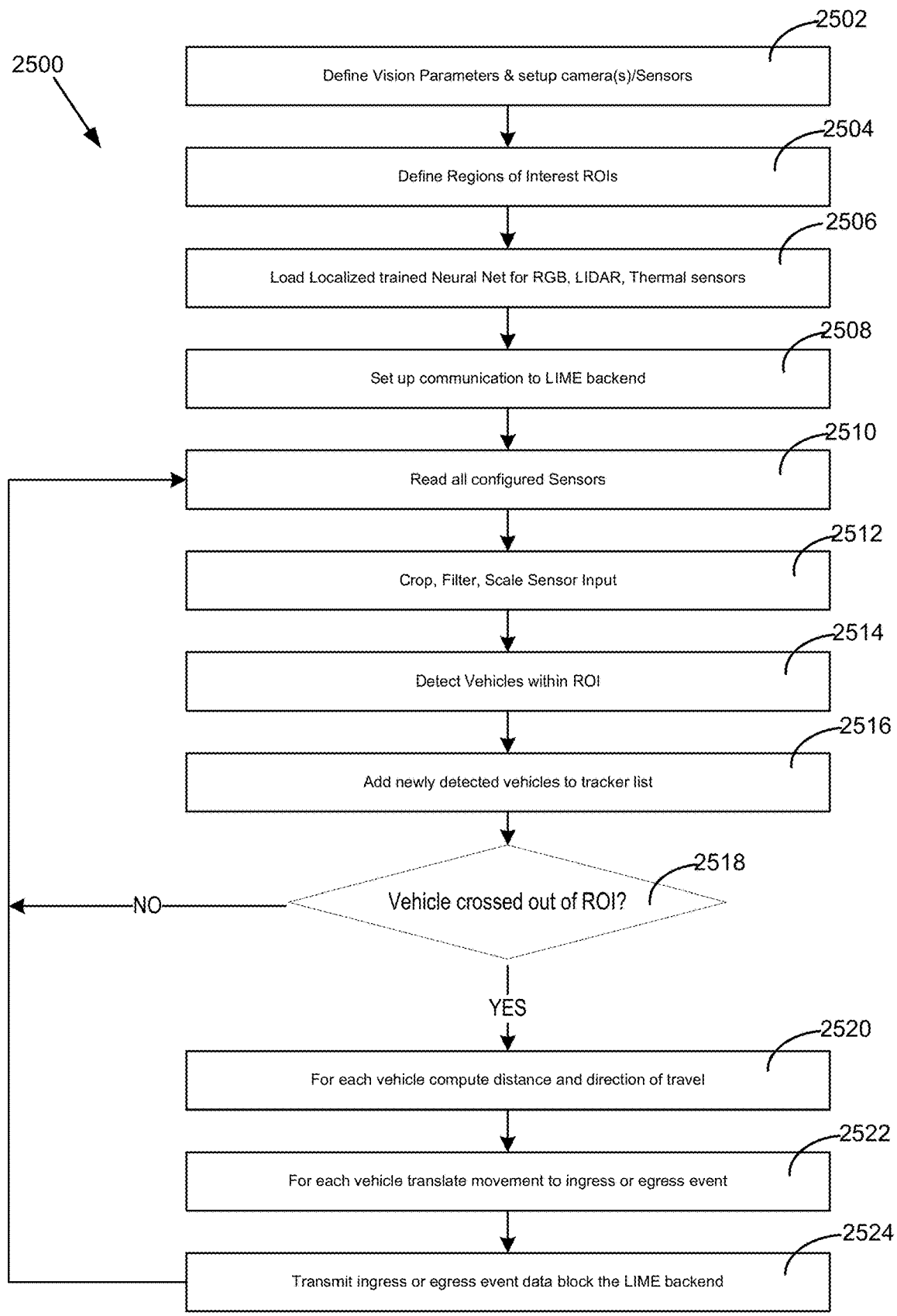
FIG. 25 is a flow diagram showing the operational process and algorithm for performing vehicle detection by the disclosed parking objects detection system.

FIG. 25 is a flow diagram 2500 showing the operational process and algorithm for performing vehicle detection by system 2100. The first four process blocks represent the functions performed to set up vision system sensors 2118, LIME Agent 2114, and communication links. Process block 2502 defines vision parameters and sets up the cameras and sensors of vision system sensors 2118. Process block 2504 defines regions of interest (ROI) for observation in detection area 2102. Process block 2506 represents loading of a localized trained neural network in LIME Agent 2114 for RGB camera, LIDAR, and thermal sensors. Process block 2508 represents a set up for establishing a communication link for LIME Agent 2114 to backend servers 70.

Upon completion of the communication link setup, vehicle detection is made ready to be performed in accordance with the following procedure. Process block 2510 represents continual reading of all configured vision system sensors 2118, and process block 2512 represents cropping, filtering, and scaling of their inputs. Process block 2514 represents detection of vehicles within the defined regions of interest. Stream video is received and processed for the regions of interest. Restricting the segment of the video to be analyzed is defined in the setup represented by process block 2502. Use of variable selectable frame rates allows for efficient processing. Once a vehicle is detected, object detection module 2122 verifies that it meets initial criteria for objects of interest. The resulting vehicles are verified and classified through object detection module 2122 using a deep neural network (DNN). The deep neural network uses an initial training file and is augmented with site-specific training parameters. Process block 2516 represents adding newly detected vehicles to a tracker list. Once verified, the vehicle is passed on to a tracking module in LIME Agent 2114 and verified to be the same in predefined or random intervals through the deep neural network. The vehicles are tracked with the customized areas of interest in a manner that, if occluded, will continue to be tracked through a predicted path within a region of interest and re-verified through the deep neural network. Decision block 2518 represents an inquiry whether any of the vehicles have crossed out of the region of interest. If the answer is NO, decision block 2518 represents a return to the vehicle detection processing operation of process block 2510, where all of the configured vision system sensors 2118 are read. Travel movement within the region of interest of vehicles is vectorized to determine the distance and direction of travel with respect to the boundaries of the region of interest. If the answer is YES, decision block 2518 directs processing to process block 2520, where the distance and direction of travel is computed for each vehicle that crossed out of the region of interest. Process block 2522 represents a determination of movement of each vehicle as either an ingress or egress event. Process block 2524 represents transmission of ingress or egress event data to LIME Agent 2114 operating in backend servers 70. Once it exits an area of interest, a vehicle is removed from the tracking module and an image of the local vehicle is stored for scheduled use to update the training file for the parking location (e.g., parking lot). Process block 2524 represents a return to the vehicle detection processing operation of process block 2510, where all of the configured vision system sensors 2118 are read.

Event operations encompass planning and stakeholder coordination activities for its parking operations. Parking operations planning and monitoring processes currently include (1) inventory and parking fee setups; (2) attendant allocation, registration, and assignment; (3) continuous monitoring of inventory, traffic flow, and gate load; (4) adjustment of resources and reassignment of attendants to different vehicle entry and exit gates and travel lanes; (5) monitoring of vehicles, transactions, and entrance authorizations for inventory and fraud management; and (6) at the end of the event, checking out attendants and consolidating and reporting transactions performed by each attendant.

These activities are time consuming and labor intensive. For example, typical attendant end-of-shift checkout and reporting tasks can take over 30 minutes. Moreover, to provide continuous inventory reporting, there are often several attendants continuously roaming the parking lot or garage to count vehicles, monitor the inventory and spaces, and report to the parking manager or other gate attendants through a mobile communication device.

There are times that the vehicle traffic load factor (i.e., cars entering the lot or garage) is low or high, resulting in, respectively, too many or too few attendants operating the entrance, thereby leading to one or more of inefficient use of resources, traffic flow congestion, and unhappy event attendees.

Among the major issues parking operators face are fraud and theft by the attendants (called "slippage"), particularly when the parking fee is paid in cash, or when an attendant allows a car to enter without charge in accordance with a previous, unauthorized arrangement with the attendant. To reduce slippage, the parking operators add personnel to supervise the attendants, require the attendant to perform many documentation and reporting tasks, or both, to track and consolidate transactions with the number of vehicles entering the lot or garage. These processes slow the flow of vehicle traffic and create congestion and, unfortunately, fail to reduce appreciably the amount of slippage that occurs during the parking operation.

Using systems and processes disclosed herein in connection with event operations planning, parking management techniques can be implemented at a parking facility (e.g., a parking lot or garage) to increase efficiency of parking operation and planning, reduce fraud and theft, and decrease traffic congestion.

Integrating the disclosed vision system, SmartBeacon devices, and mobile POS devices and connecting them to LIME Vision Agent 2114 enables identification of every vehicle entering a garage or parking lot by one or more of license plate number, make, model, and color in every vehicle travel lane (single- or multi-lane gate) at entrance and exit gates of a parking facility. Using a vision-based counting method for cars entering and exiting in each lane, a real-time inventory count for the lot or garage can be provided on, for example, a web and mobile dashboard produced by operation of LIME Vision Agent 2114.

For example, a SmartBeacon device (e.g., beacon 10) can be positioned in the vicinity of the entry or exit gate or lanes for a parking facility, and using the methodology described herein for a mobile device to communicate with a SmartBeacon device, any mobile device functioning as a POS device can be identified, for example, within ±3-foot (±0.9144 m) accuracy. By determining or assigning a POS device for a specific parking attendant, the attendant's identity and location at one or more of a particular facility, gate, and lane will be known.

Using the disclosed systems and processes, a vehicle entering or exiting a lot or garage will be known. By determining the exact time of transaction from the POS device and the exact time of entrance or exit by the vehicle, and the exact lane associated with the POS device and the attendant to which the POS device is assigned, by operation of LIME Vision Agent 2114, a vehicle can be associated with a particular transaction or lack of transaction, as well as the type of transaction and the attendant who authorized the vehicle to enter the lot or garage. This information can be delivered in real-time using the web and mobile dashboard of LIME Vision Agent 2114 to an operations manager of the parking lot or garage for one or both of analysis and consolidation upon each attendant's end-of-shift check out.

At the end of an attendant's shift, the attendant's POS device can inform the attendant about any performance discrepancy, such as a difference between one or both of transactions recorded and authorizations recorded by the POS device and a tally of those determined or expected by the vehicle counting. The attendant's POS device also informs of the amount of cash that needs to be delivered to the parking operator or operations manager. The same information is delivered through LIME Vision Agent 2114 to the parking operator or manager's web or mobile dashboard to inform of any discrepancy with the attendant's performance and the amount of cash that needs to be delivered.

By having on one or both of the operator's web and mobile dashboards real-time data on transactions and inventory, entrance and exit load factors at the lot or garage gate or lanes (e.g., through LIME Vision Agent 2114), and by knowing the number of attendants and their identities (through their assigned POS devices) at their locations of the lot or garage, the operator can determine and manage changes in operation resulting from unplanned circumstances and reassign, add, or remove attendants to optimize the operation and its cost.

Figures 1, 26:
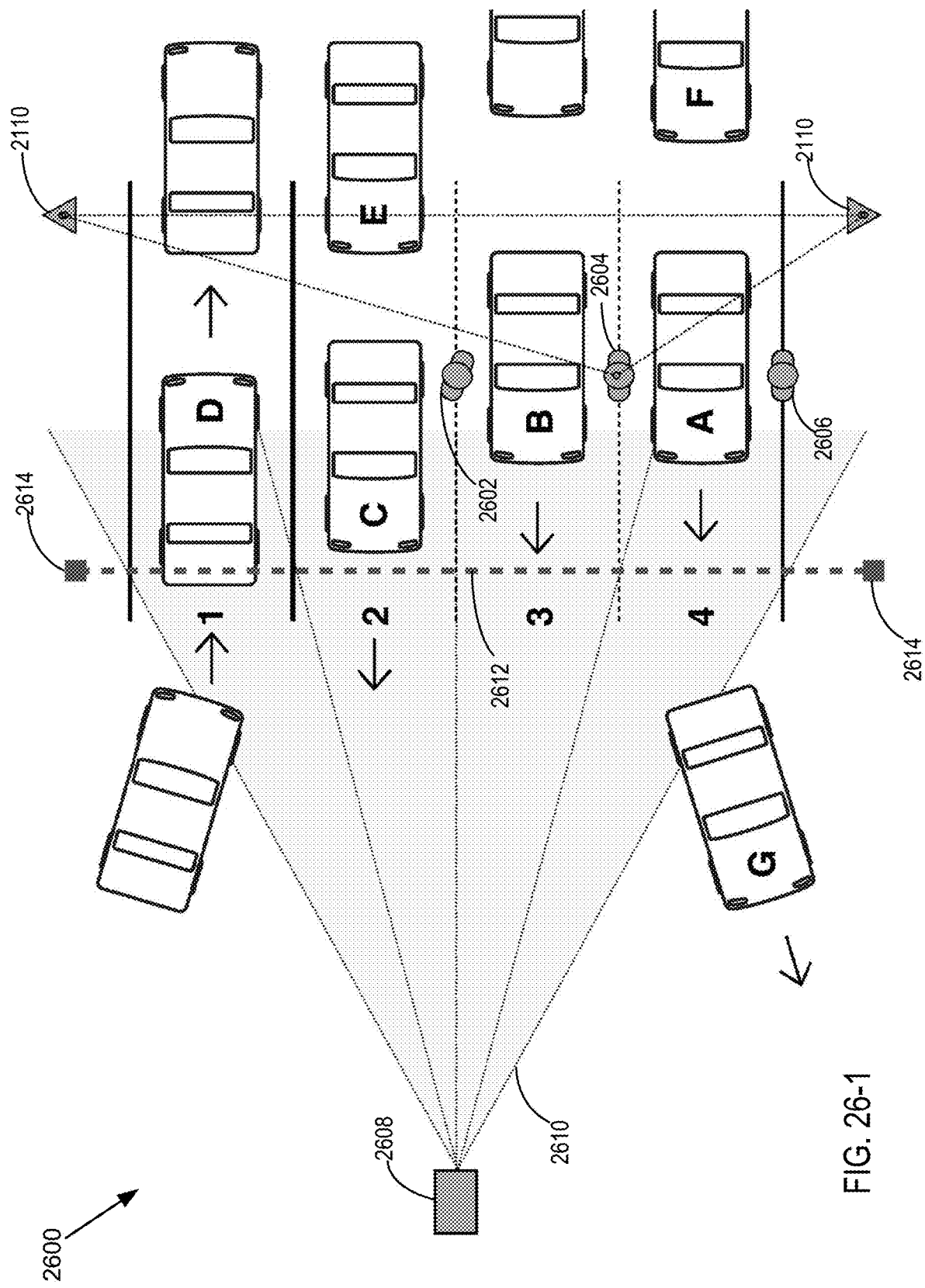
Figures 2, 26:
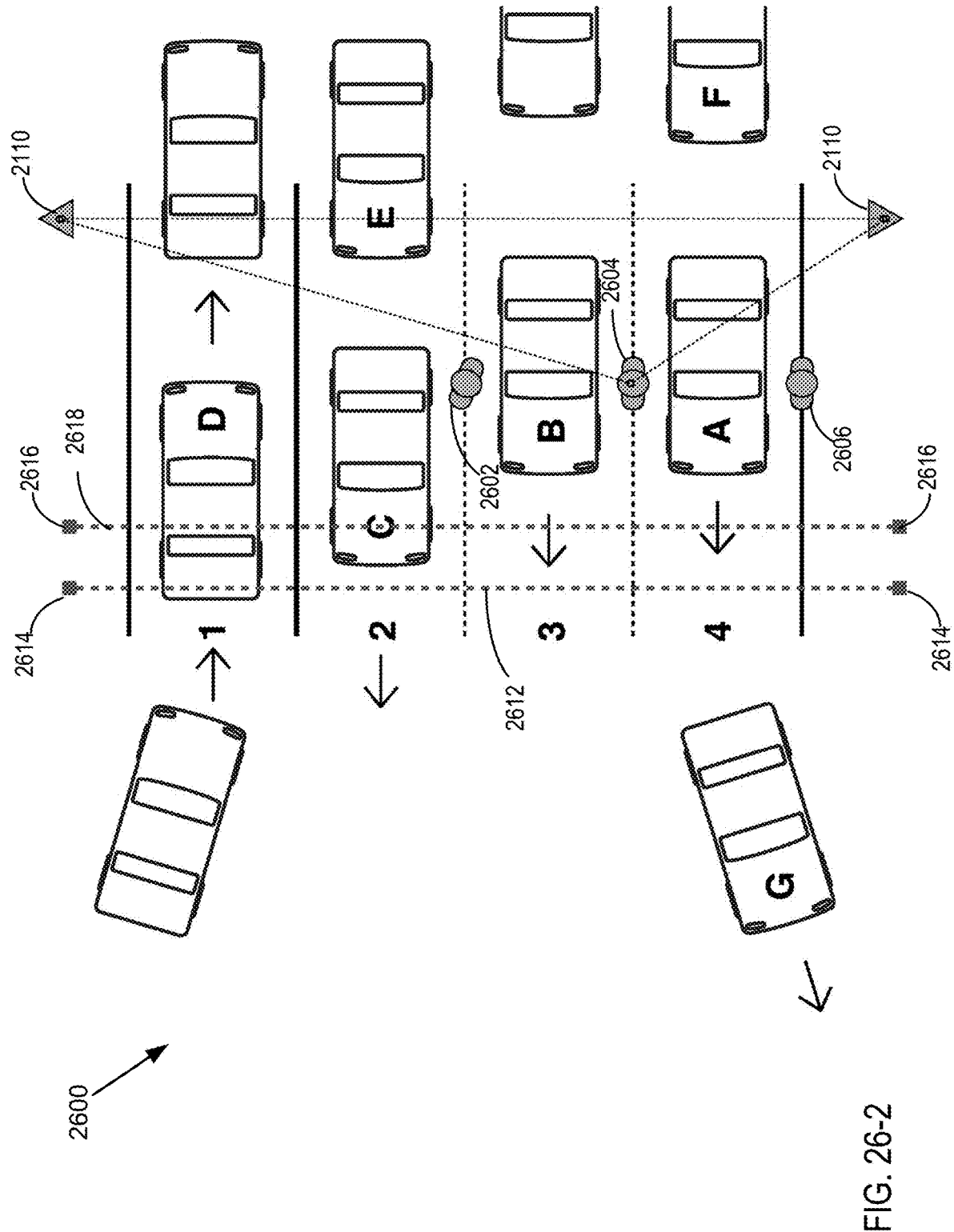
Figures 3, 26:
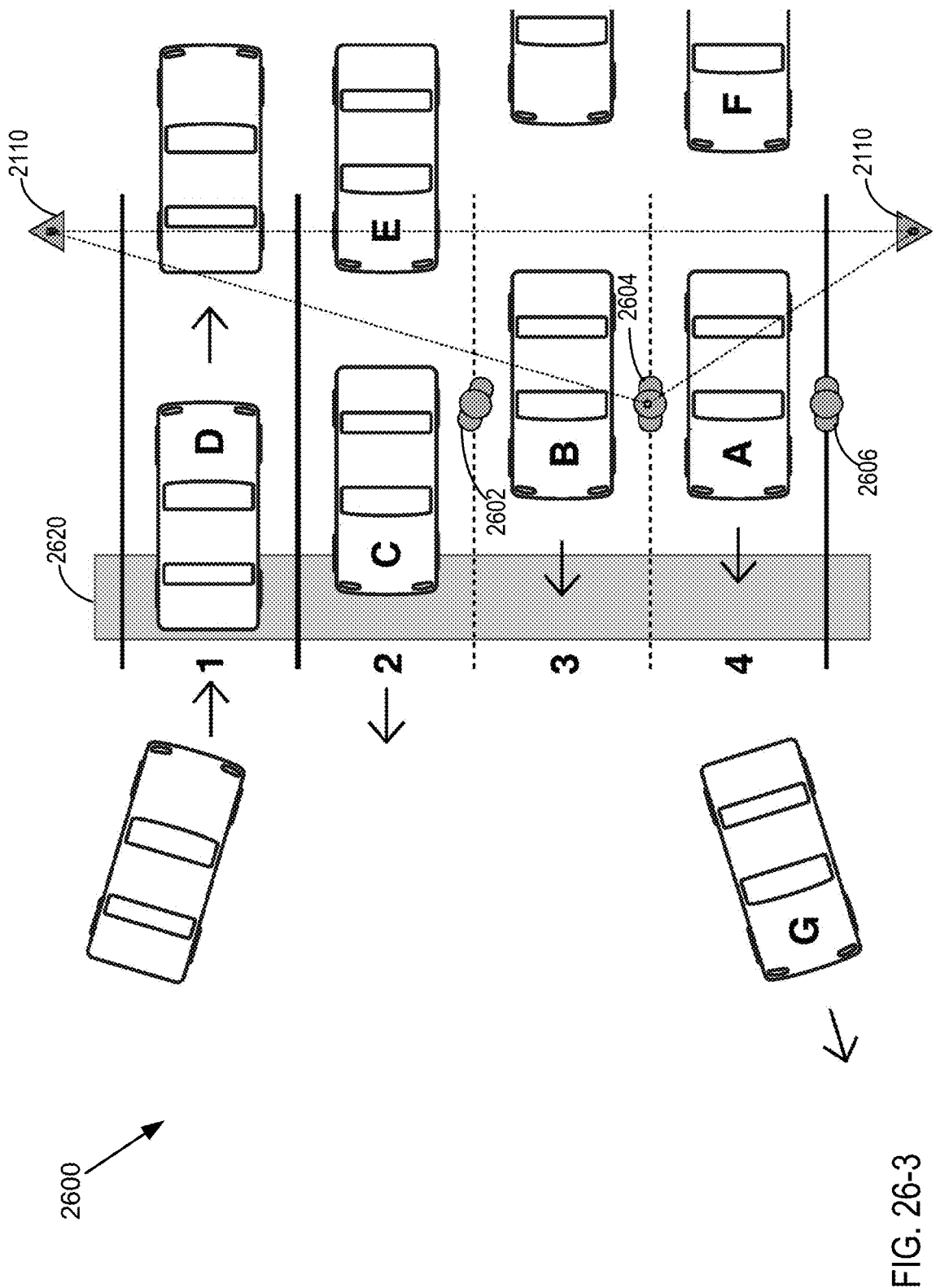
Figures 4, 26:
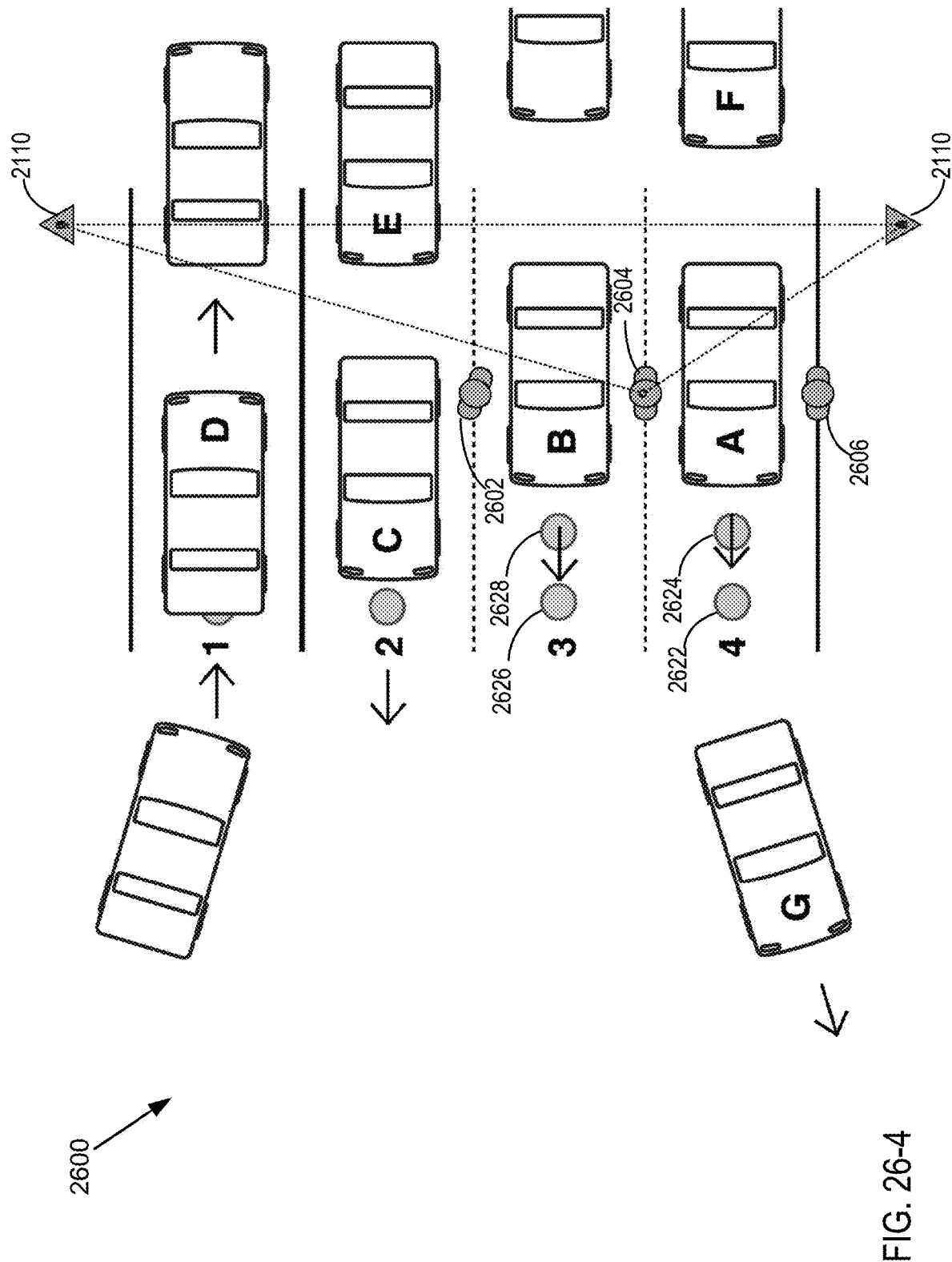

FIGS. 26-1, 26-2, 26-3, and 26-4 are pictorial diagrams illustrating several techniques for detecting vehicles entering or exiting a parking area. In each of the diagrams, a parking area 2600 includes three entrance lanes 2, 3, 4, and one exit lane 1. SmartBeacon devices 2110 are located on either side of the lanes 1 through 4 and communicate with one or more POS devices (not shown) of attendants 2602, 2604, and 2606, such that one or both of the location and lane each attendant is servicing is determined. For example, triangulation (e.g., similar to that shown in FIG. 24) using SmartBeacon devices 2110 locates POS devices of attendants 2602, 2604, and 2606 and determines the lane(s) each attendant is servicing. In the examples shown, a POS device of attendant 2604 is located using triangulation. Alternatively, the POS device can be located using GPS functionality or any other location determining process. For example, vehicles A-G of FIGS. 26-1-26-4 are identified within each lane using vehicle detection process 2500 of FIG. 25. Further, the detection techniques of FIGS. 26-1-26-4 also use the processing functionality shown in previous drawing figures, for example, using LIME Vision Agent 2114 and AI Engine 2124, to one or both identify and count vehicles.

FIG. 26-1 shows a camera technique for vehicle detection. Here, a camera 2608 spatially associated with, i.e., positioned within, a parking facility is used to identify and count vehicles within a field of view 2610 entering or exiting parking area 2600, as well as the direction of vehicles. Camera 2608 may be a vision sensor 2118, and like vision sensor 2118 in FIG. 23, camera 2608 communicates with LIME Vision Agent 2114, which communicates with AI Engine 2124. With use of LIME Vision Agent 2114 and AI Engine 2124, vehicles entering and exiting a parking area via lanes 1 through 4 (e.g., vehicles A, B, C, D, E, F, and G) are identified as vehicles, and may also be identified by one or more of a license plate number, make, model, and color. Direction of the vehicles is also determined using the system and informs whether a vehicle is exiting or entering a parking facility via lanes 1 through 4.

In FIG. 26-1, a light beam 2612 propagating from an optional beam source 2614 including a light beam emitter and a light beam detector, is broadcast across lanes 1 through 4 and used as an additional technique for counting vehicles entering or exiting the parking area 2600. Interference with light beam 2612 can be counted as a vehicle entering or exiting the parking area 2600. Each instance of interference with light beam 2612 can be cross referenced with images or video captured by camera 2608 to enhance vehicle counting accuracy. Beam source 2614 is usable in conjunction with camera 2608. Alternatively, camera 2608 functions without using beam source 2614.

FIG. 26-2 shows a light beam technique for vehicle detection. Two light beam sources 2614 and 2616, each including a light beam emitter and a light beam detector, are positioned within parking area 2600 such that their respective light beams 2612 and 2618 propagate across lanes 1-4. Vehicles passing through both of the light beams are registered as a counted vehicle. Vehicle direction is determined by the order in which the beams are passed through. For example, a vehicle moving through beam 2618 and then beam 2612 is determined to be entering the parking facility such as a parking garage or lot. A vehicle moving through the beam 2612 and then beam 2618 is determined to be exiting the parking garage or lot.

Figures 3, 20:
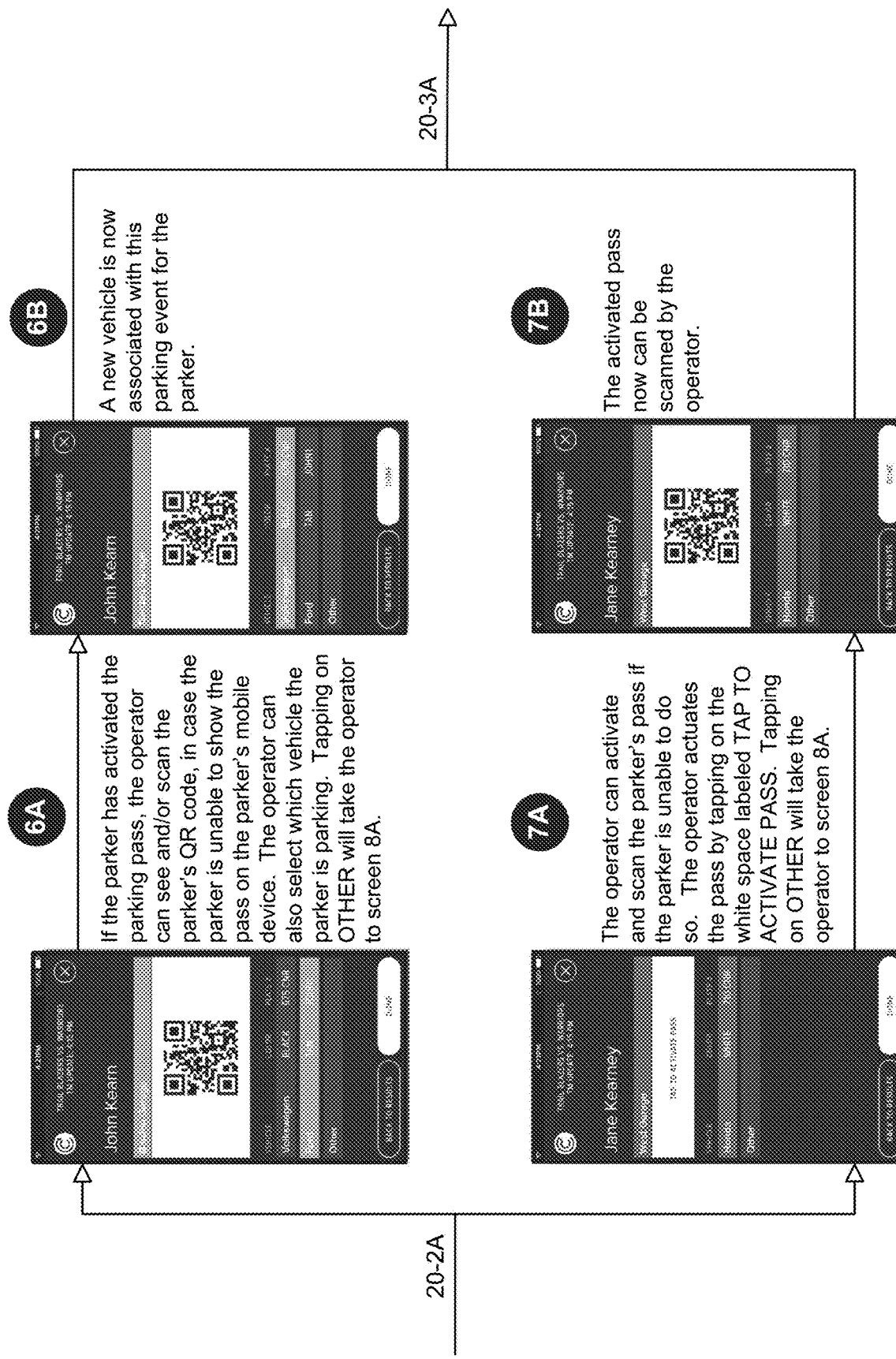
Figures 4, 20:
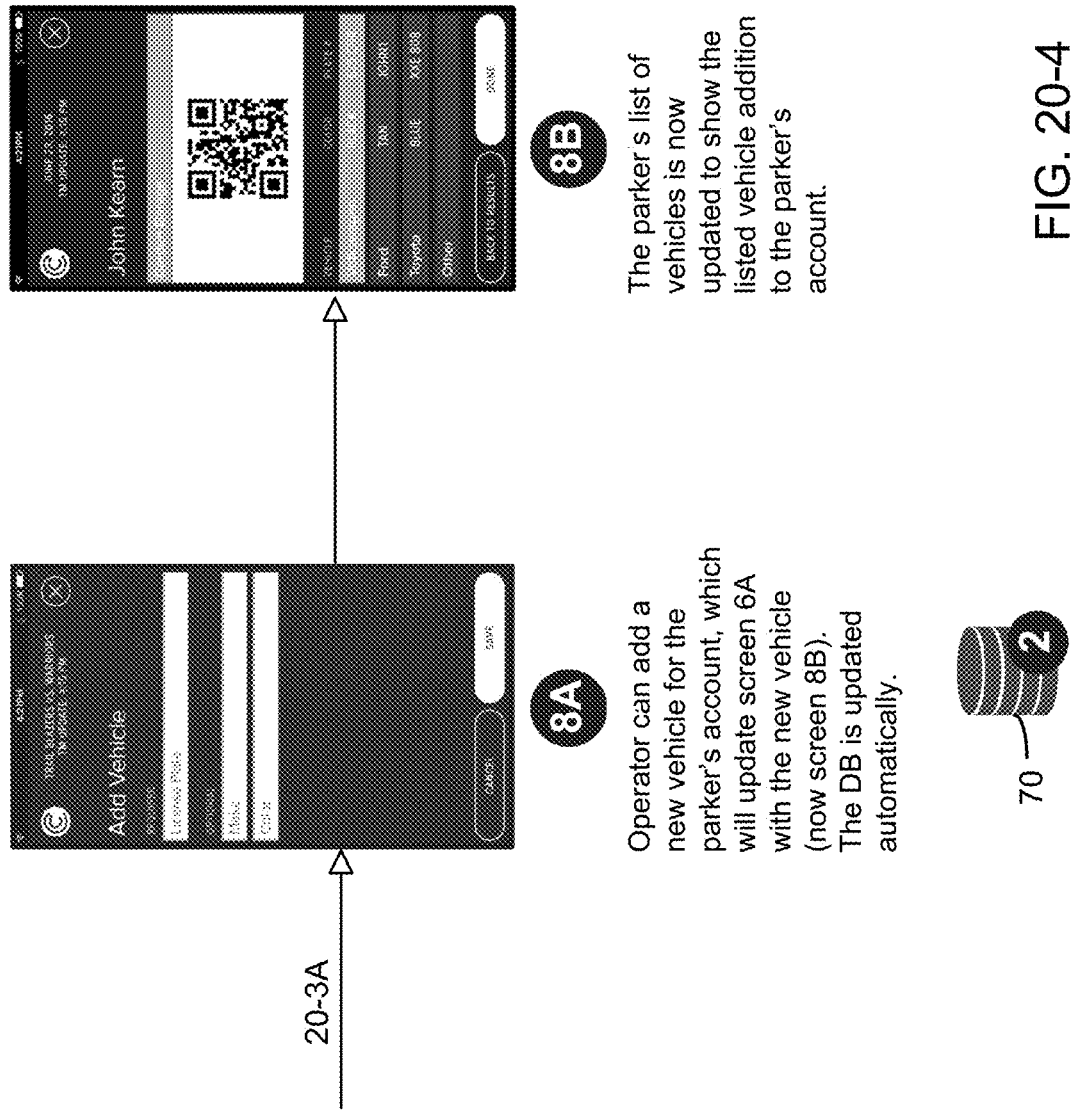

FIG. 26-3 shows an embedded magnetic loop system for vehicle detection. A magnetic layer 2620 is embedded in the ground and transversely crosses lanes 1-4 in parking area 2600. By determining interruption with a magnetic field emanating from magnetic layer 2620 and gaps of time between interruptions, vehicles are counted. For example, each interruption is counted as a vehicle. As more magnetic field interruption data are generated, AI Engine 2124 recognizes real and false vehicle counts from the interruptions and refines its analysis to make more accurate count determinations.

FIG. 26-4 shows a magnetic sensor system for vehicle detection. One or more magnetic sensors are positioned within each of lanes 1-4. In the example shown, magnetic sensors 2622 and 2624 are located in lane 4 and magnetic sensors 2626 and 2628 are located in lane 3. The magnetic sensors detect vehicles that pass over them in each lane to count the number of vehicles. A vehicle that passes over both sensors in a lane is counted. The order in which sensors in each lane detect a vehicle is used to determine direction. For example, a vehicle that passes over sensor 2624 and then sensor 2622 is determined to be entering the parking garage or lot. A vehicle that passes over sensor 2622 and then sensor 2624 is determined to be exiting the parking garage or lot.

As discussed above, the monitoring App operating on a parking attendant's hand-held device 450 in cooperation with backend servers 70 carries out parking facility management activities, including event-based inventory control, parking space pass purchase monitoring, and individual parking customer service tasks. In addition, parking attendant's hand-held device 450 in cooperation with backend servers 70 performs functions described below related to POS device tasks, for example, of a parking attendant 2604 using device 450 as a POS device to service lane 3 in FIGS. 26-1, 26-2, 26-3, and 26-4. Hand-held device 450 functions as a POS device for use by parking attendants, parking patrol officers, or parking service providers, for example.

FIGS. 27-1, 27-2, and 27-3 form an annotated flow diagram 2700 outlining and describing the process steps performed with use of vision system 2100 configured to track vehicles in a region of interest of a vehicle travel lane. The process executes vehicle parking transaction matching of POS verification to vehicle 2120 at access gate 2116 to a parking area. In this embodiment, vision system 2100 tracks a single region of interest at the end of a vehicle travel lane. POS agents are provided a set of machine-readable information-carrying objects intended for delivery to an occupant, i.e., a "vehicle parker," of each vehicle in a queue of vehicles approaching access gate 2116. An example of a machine-readable information-carrying object is a medium such as a card imprinted with a matrix barcode, e.g., QR Code, for scanning by a POS device. (The term "barcode" used herein refers to either a standard barcode or a matrix barcode.) POS agents stationed at locations down the queue and distances away from access gate 2116 verify vehicles and give the vehicle parkers a QR Code for secondary verification at the end of the queue. Vehicle parkers who were not verified at the queue would be verified at the end of the queue. (To avoid excessive delay in vehicle travel to reach access gate 2116, it may be advantageous at times to verify a vehicle parker purposefully only at the end of the queue.) The solution produced by practice of this method uses three factors (travel Lane ID, ingress time, and POS verification (transaction) time). Since every vehicle parker is verified at the end of the queue, any vehicle that is not verified by a QR Code or otherwise will be flagged as potential fraud.

Block 2702 indicates the start of the process flow, in which vehicle 2120 approaches a gated parking facility (e.g., parking garage structure or surface lot). At process block 2704, vehicle 2120 proceeding along a travel lane enters a queue of vehicles formed in front of access gate 2116.

Decision block 2706 inquires whether parking attendants or POS agents are available to perform verification of vehicles in the queue. If the answer to decision block 2706 is YES, process blocks 2708, 2710, and 2712 indicate that a POS agent, respectively, uses hand-held POS device 450 to verify vehicle 2120, optionally takes a picture of its license plate, and provides to the vehicle parker a verification QR Code. Taking a picture of the license plate enables verification whenever vision system 2100 is unable to obtain appropriate vehicle information (e.g., license plate, vehicle make and model) at the time of vehicle ingress. Upon the vehicle parker's receipt of the QR Code, or if the answer to decision block 2706 is NO, process block 2714 indicates that vehicle 2120 continues in the queue.

Decision block 2716 inquires whether vehicle 2120 has reached the end of the queue (i.e., is adjacent to access gate 2116). If the answer to decision block 2716 is NO, the process flow returns to decision block 2706 to again inquire whether POS agents are available to perform verification. If the answer to decision block 2706 is again NO, the process flow proceeds to process block 2714, indicating vehicle 2120 remains in the queue, and then again to decision block 2716. If the answer to decision block 2716 is again and remains NO, vehicle 2120 continues in the queue until its end. A YES answer to decision block 2716 indicates that vehicle 2120, in either a verified or non-verified state, reaches the end of the queue.

Decision block 2718 inquires whether a POS agent present at the end of the queue has verified vehicle 2120. This is accomplished by the vehicle parker's presenting to the POS agent the verification QR Code for secondary verification. The verification solution includes travel lane identification (ID), vehicle ingress time, and transaction time, (i.e., time verification of vehicle 2120 by POS device 450 to access gate 2116). Since a vehicle parker is verified at the end of the queue, any vehicle not verified by QR Code, or otherwise by a POS agent using POS device 450, is flagged as a potential fraud.

A NO answer to decision block 2718 initiates a fraud prevention aspect that proceeds as follows. Process blocks 2720 and 2722 indicate that, respectively, vehicle 2120 leaves the travel lane and vision system 2100 identifies vehicle 2120. Vision system 2100 transmits, at process block 2724, vehicle information, travel lane ID, and ingress time to backend server 70, which is rendered in cloud 2726. Backend server 70 verifies that no POS verification was executed after vehicle 2120 had left its travel lane, and block 2728 indicates that vehicle 2120 is flagged as non-verified.

A YES answer to decision block 2718 directs the end of queue verification process flow to decision block 2730, which inquires whether the vehicle parker possesses a QR Code. If the answer to decision block 2730 is NO, process blocks 2732 and 2734 indicate that the POS agent uses POS device 450 to, respectively, verify vehicle 2120 and optionally take a picture of its license plate. If the answer to decision block 2730 is YES, process block 2736 indicates that the POS agent scans the verification QR Code. After the POS agent has performed either type of verification, process block 2738 indicates that a positioning algorithm implemented in POS device 450 identifies the travel lane occupied by vehicle 2120.

Process block 2740 indicates that POS device 450 sends to backend server 70 a picture of the vehicle license plate, together with verification information for delivery to vision system 2100 in the event it is unable to read a license plate or properly identify vehicle 2120. Process blocks 2742 and 2744 indicate that, respectively, vehicle 2120 leaves the travel lane and vision system 2100 identifies vehicle 2120. Vision system 2100 transmits, at process block 2746, vehicle information, travel lane ID, and ingress time to backend server 70. Process block 2748 indicates that vehicle 2120 is flagged with POS verification, and block 2750 indicates parking of vehicle 2120.

FIGS. 28-1, 28-2, and 28-3 form an annotated flow diagram 2800 outlining and describing the process steps performed with use of vision system 2100 configured to track vehicles crossing multiple regions of interest (i.e., rows of vehicles) of a vehicle travel lane. The process executes vehicle parking transaction matching of POS verification to multiple vehicles approaching an access gate 2116 to a parking area. In this embodiment, vision system 2100 tracks vehicles crossing multiple regions of interest (rows of vehicles) in a vehicle travel lane, and, as POS agents verify vehicles, vision system 2100 flags them as verified. Any POS attendant stationed along the queue or at the end of the queue would know which vehicle is verified, since vision system 2100 is persistently keeping track of all vehicles and verifications proceeding along the travel lane. The solution practiced by this method, by using four factors (region of interest ID, ingress time at the region of interest, egress time at the region of interest, and verification time), enables verification of multiple vehicles in a travel lane and pinpointing potential fraud to a specific vehicle.

Block 2802 indicates the start of the process flow, in which vehicle 2120 approaches a gated parking facility (e.g., parking garage structure or surface lot). At process block 2804, vehicle 2120 proceeding along a travel lane enters a queue of vehicles formed in front of access gate 2116. Process block 2806 indicates vehicle 2120 crossing a region of interest established in vision system 2100. Process block 2808 indicates that vision system 2100 identifies vehicle 2120 by license plate number, vehicle make and model, and other identifying information and stores the time of ingress of vehicle 2120 into the region of interest. Process block 2810 indicates that POS agents are available to execute verification of vehicles in the region of interest.

A decision block 2812 inquires whether POS device 450 has registered verification of vehicle 2120. If the answer to decision block 2812 is NO, process block 2814 indicates that vehicle 2120 leaves the region of interest, and decision block 2816 inquires whether there are additional regions of interest established in vision system 2100. A NO answer to decision block 2816 initiates a fraud prevention aspect that operates as follows. Process block 2818 indicates that vision system 2100 sends to backend server 70, which is rendered in cloud 2820, the region of interest ID and the vehicle ingress time to and egress as time from the region of interest. Backend server 70 verifies that no POS verification had been executed between the time of ingress to or time of egress from the region of interest. Block 2822 indicates that vehicle 2120 is flagged as non-verified. A YES answer to decision block 2816 directs the registration process of vehicle 2120 occupying an additional region of interest back to and through process blocks 2806, 2808, and 2810 until vehicle 2120 reaches a point in the queue where a POS agent registers a vehicle verification at decision block 2812.

A YES answer to registration of POS verification at decision block 2812 directs the process flow to process blocks 2824 and 2826 indicating that the POS agent uses POS device 450 to, respectively, take a picture of the vehicle license plate and identify the region of interest by operation of a positioning algorithm implemented in POS device 450. The positioning algorithm determines the current location of vehicle 2120 relative to the region of interest. POS device 450 stores the region of interest ID at the time of verification for use by backend server 70 to match against vehicle 2120 detected by vision system 2100.

Process block 2830 indicates that POS device 450 sends to backend server 70 a picture of the vehicle license plate, together with verification information, for delivery to vision system 2100 in the event it was unable to read a license plate or properly identify vehicle 2120. Process blocks 2832 and 2834 indicate that, respectively, vehicle 2120 leaves the region of interest and vision system 2100 transmits vehicle information, region of interest ID, and ingress and egress times to backend server 70. Process block 2836 indicates that backend server 70 matches vehicle detection by vision system 2100 to verification by operation of POS device 450, using region of interest ID, time of verification, and time of ingress to and time of egress from the region of interest. Process block 2838 receives as inputs from process blocks 2834 and 2836, respectively, the vehicle information sent by vision system 2100 and the vision system detection with POS verification match produced by backend server 70.

Decision block 2840, after vehicle 2120 is flagged as verified with the POS transaction, inquires whether there are additional regions of interest. If the answer to decision block 2840 is YES, vehicle 2120 continues in the queue and, as indicated by process block 2842, the POS agents are notified that vehicle 2120 is verified. If the answer to decision block 2840 is NO, process blocks 2844 and 2846 indicate that, respectfully, that vehicle 2120 approaches the end of the queue and, and the POS agents are notified that vehicle 2120 is verified. Block 2848 indicates parking of vehicle 2120.

Figures 1, 29:
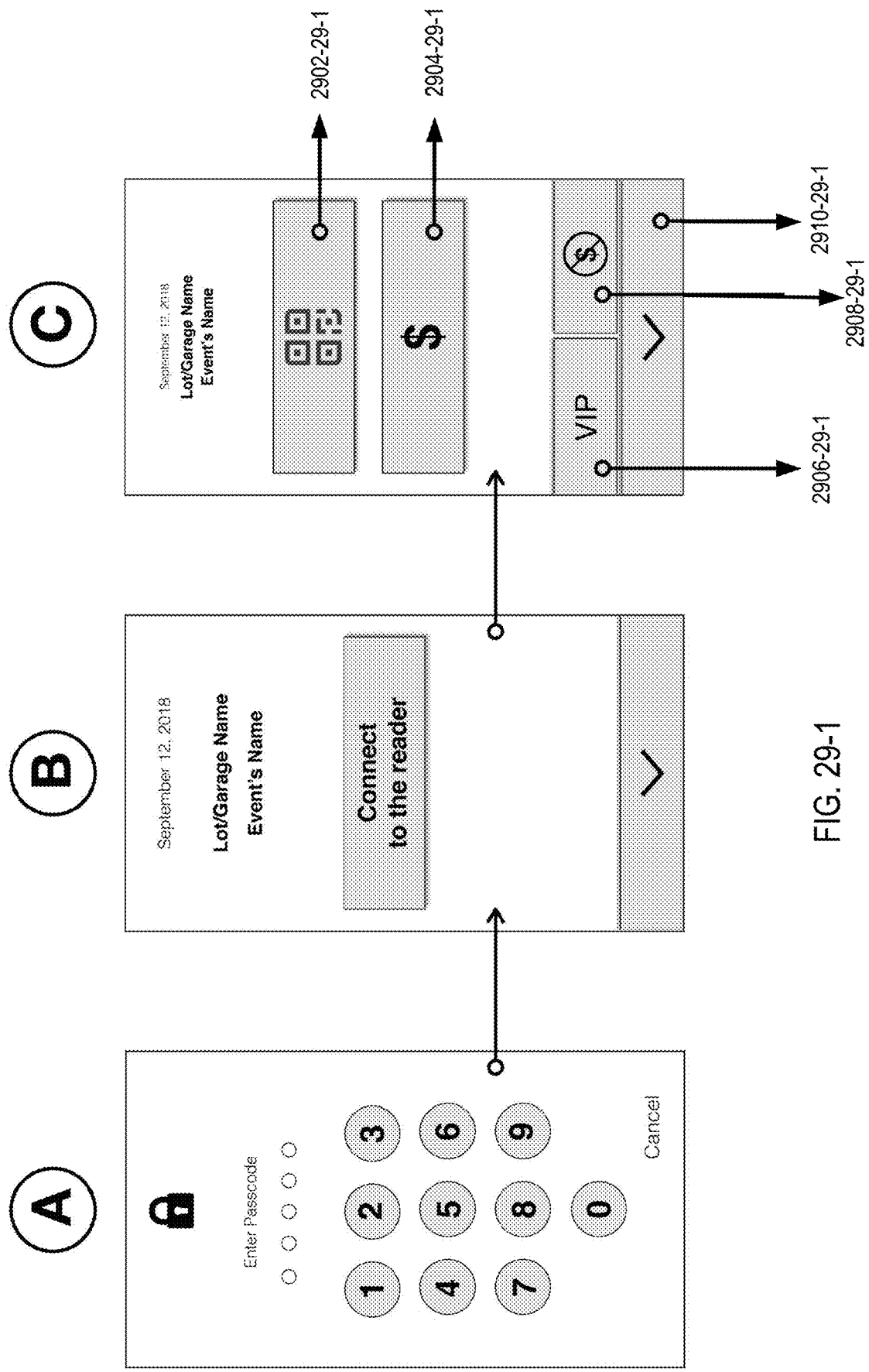
Figures 3, 29:
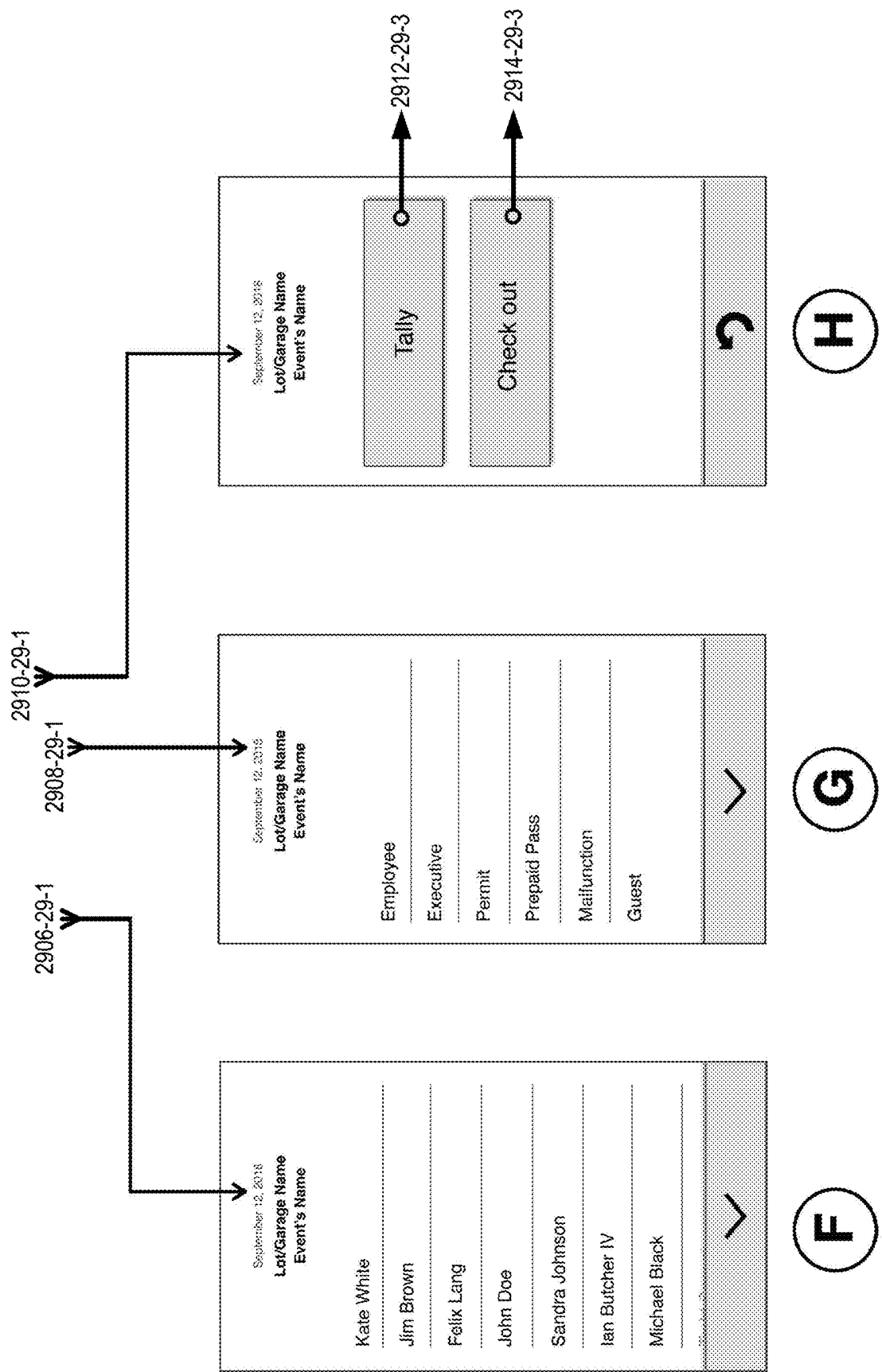
Figures 4, 29:
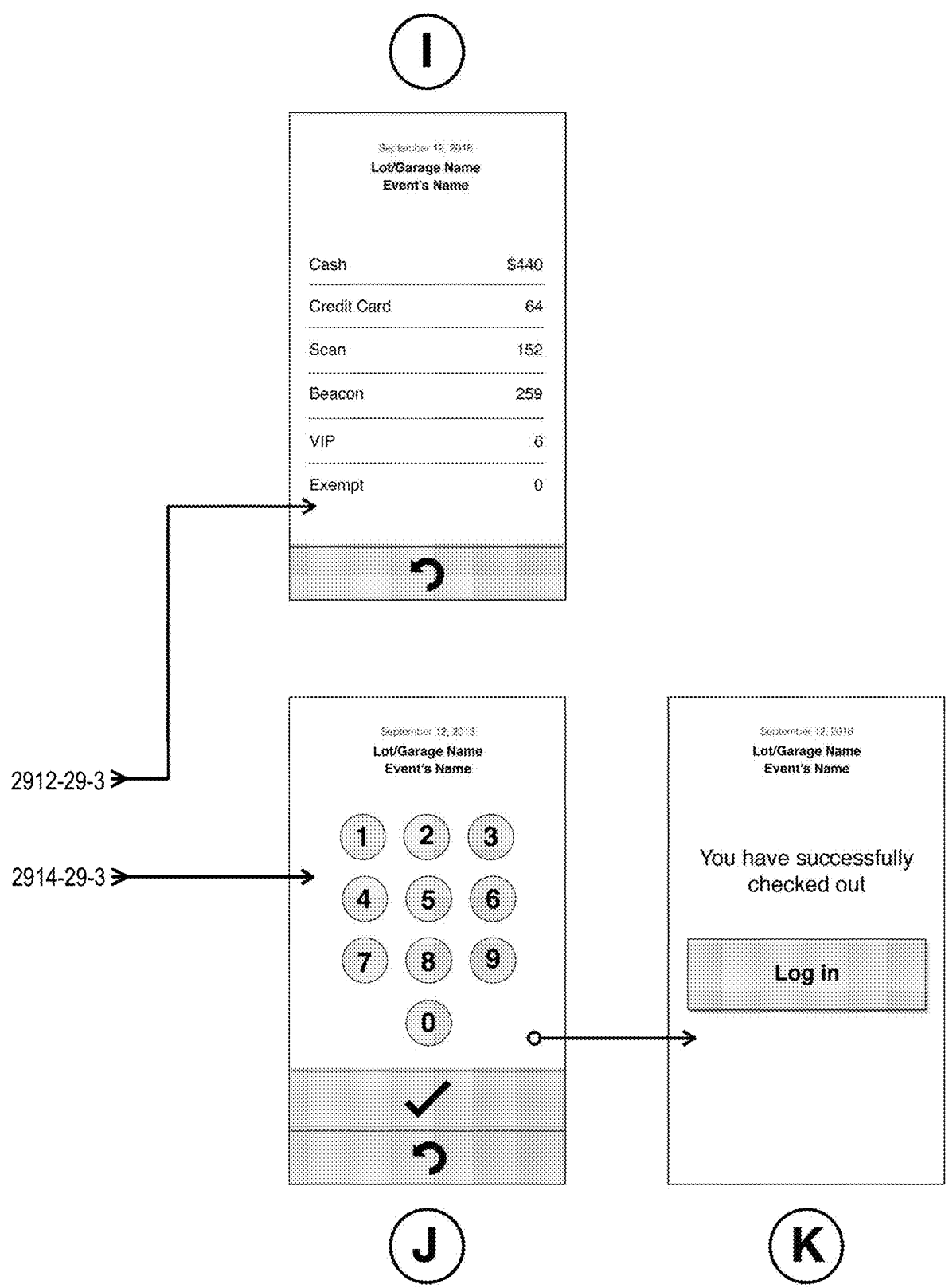

FIG. 29, which includes a set of four drawing sheets (FIGS. 29-1, 29-2, 29-3, and 29-4) describes the functions performed by the App operating on a parking attendant's hand-held device 450, used as a POS device, in cooperation with backend servers 70 in carrying out parking facility management activities, including space pass purchase. FIGS. 29-1, 29-2, 29-3, and 29-4 show eleven screenshots of information appearing on a display surface of POS device 450 during different points in time of a parking transaction. These screenshots show what a user, such as a parking patrol officer or parking service attendant, operating POS device 450 would observe. A parking manager may set up the required information about a particular event, such as the event name, garage or parking lot name, and parking rates, and may assign POS device 450 to an attendant through a web portal or dashboard (e.g., LIME Vision Agent 2114 dashboard).

FIG. 29-1 shows screens A, B, and C. At screen A, a passcode screen of POS device 450 is shown. The POS device user (hereafter, user) logs into POS device 450, using his or her passcode to unlock the device. At screen B, a screen of POS device 450 is shown that lists the lot or garage name, an event name (e.g., a basketball game, concert, or other event), and includes a button (e.g., a region of a graphical user interface of the screen a user may tap or touch to interact with POS device 450) that prompts the user to connect to POS device 450 a credit card reader for use in charging a fee to customers of the parking lot or garage. The user may tap the button to connect a credit card reader to POS device 450. At screen C, a screen of POS device 450 is shown that lists the different types of transactions allowed by POS device 450. In the example shown, the transaction types are a cash transaction, a barcode/QR Code scan transaction, a VIP list transaction, or an exempt transaction. Each of these transactions may be shown on the screen as a button for selection by the user. A credit card transaction (not shown) may also be listed. POS device 450 may, however, automatically recognize credit card or charge account information via Apple Pay, Google Pay, or other mobile payment service when a parker's phone is touched or brought within a communication range of POS device 450. POS device 450 may further automatically recognize credit card or charge account information when a credit card is swiped, inserted (for chip-enabled cards), or touched against POS device 450 (for NFC-enabled cards). Here, POS device 450 automatically recognizes the type of transaction and executes it based on the associated fee for the venue, garage, or lot; and the user (parking patrol officer or parking service attendant) does not have to interact with the POS device screen. Only a momentary confirmation of the transaction may be displayed on the POS device screen. Screen C also shows for selection by the user a status button that, when selected, allows a user to view a tally of his or her performance at any time during a shift or at check out of the shift.

When the user selects (e.g., by tapping, swiping, pressing, or the like) the barcode/QR Code scan transaction button of Screen C, which is an image of a QR Code, Screen D shown in FIG. 29-2 is produced. Screen D includes a scan window, which is a live image captured by camera functionality of POS device 450. A barcode or QR Code reflecting payment for parking may be placed within the scan window for capture. After capturing the correct barcode or QR Code, authorization is registered in the parking management system and the screen may automatically revert to the transaction Screen C, ready for a next transaction.

When the user selects the cash transaction button of Screen C, which is an image of a dollar sign, Screen E shown in FIG. 29-2 is produced. By selecting the cash transaction button, a confirmation screen with the amount of fee to be collected for parking payment appears on the screen, which is $20.00 in the example shown. After tapping the confirmation button, shown as a check mark of Screen E, the cash transaction is registered in the parking management system and the screen automatically reverts back to Screen C, ready for a next transaction. Alternatively, the cash transaction can be canceled by tapping the "cancel" button of Screen E, which reverts the App to Screen C, ready for a next transaction.

Figures 1, 27:
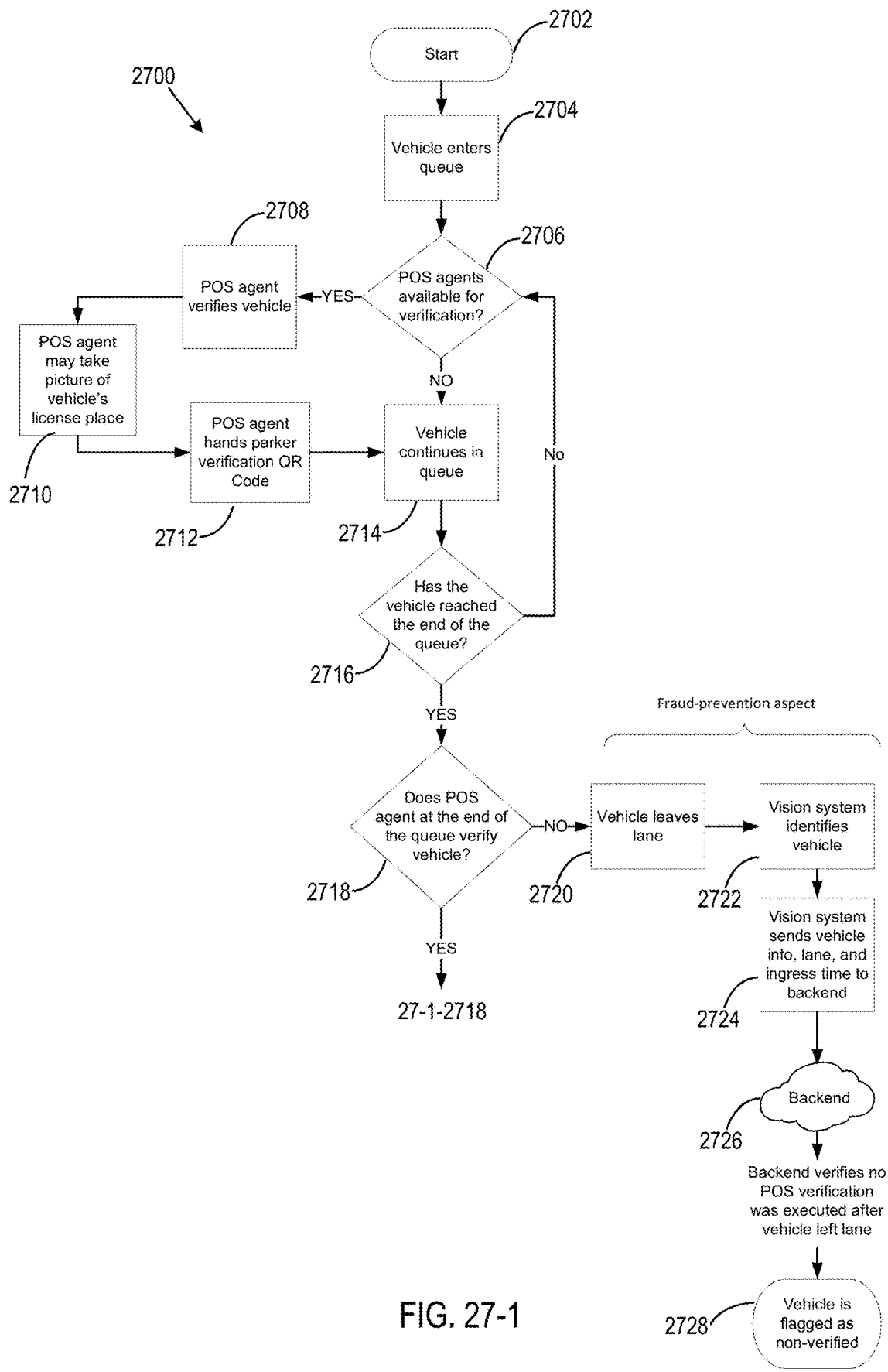
Figures 2, 27:
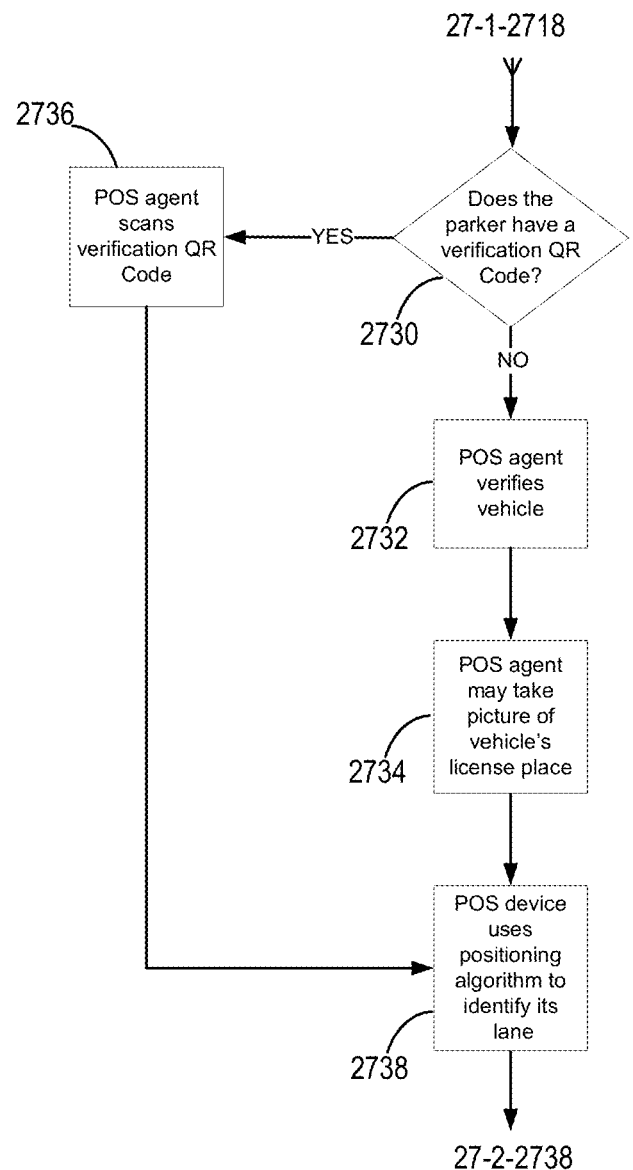
Figures 3, 27:
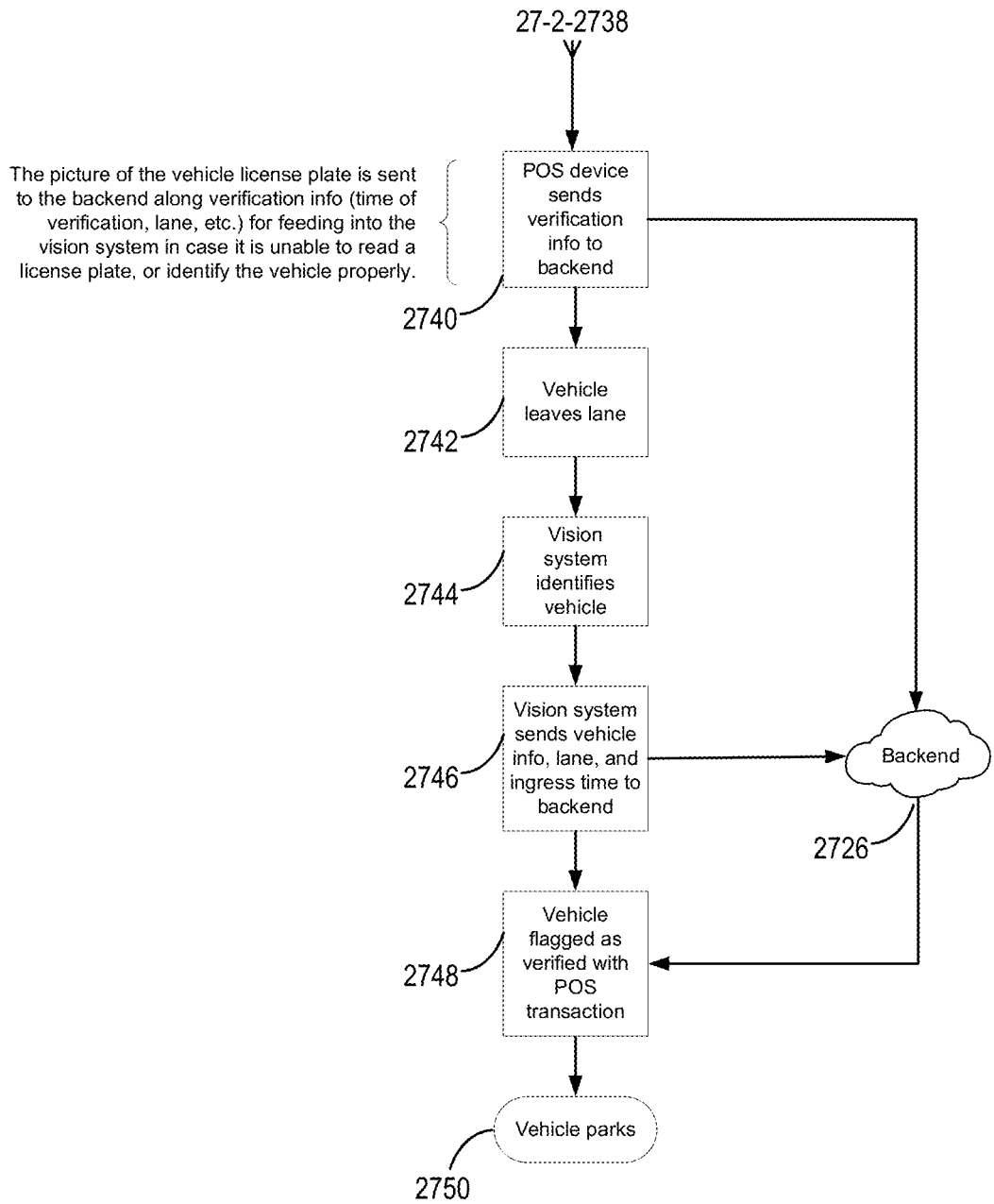
Figures 1, 28:
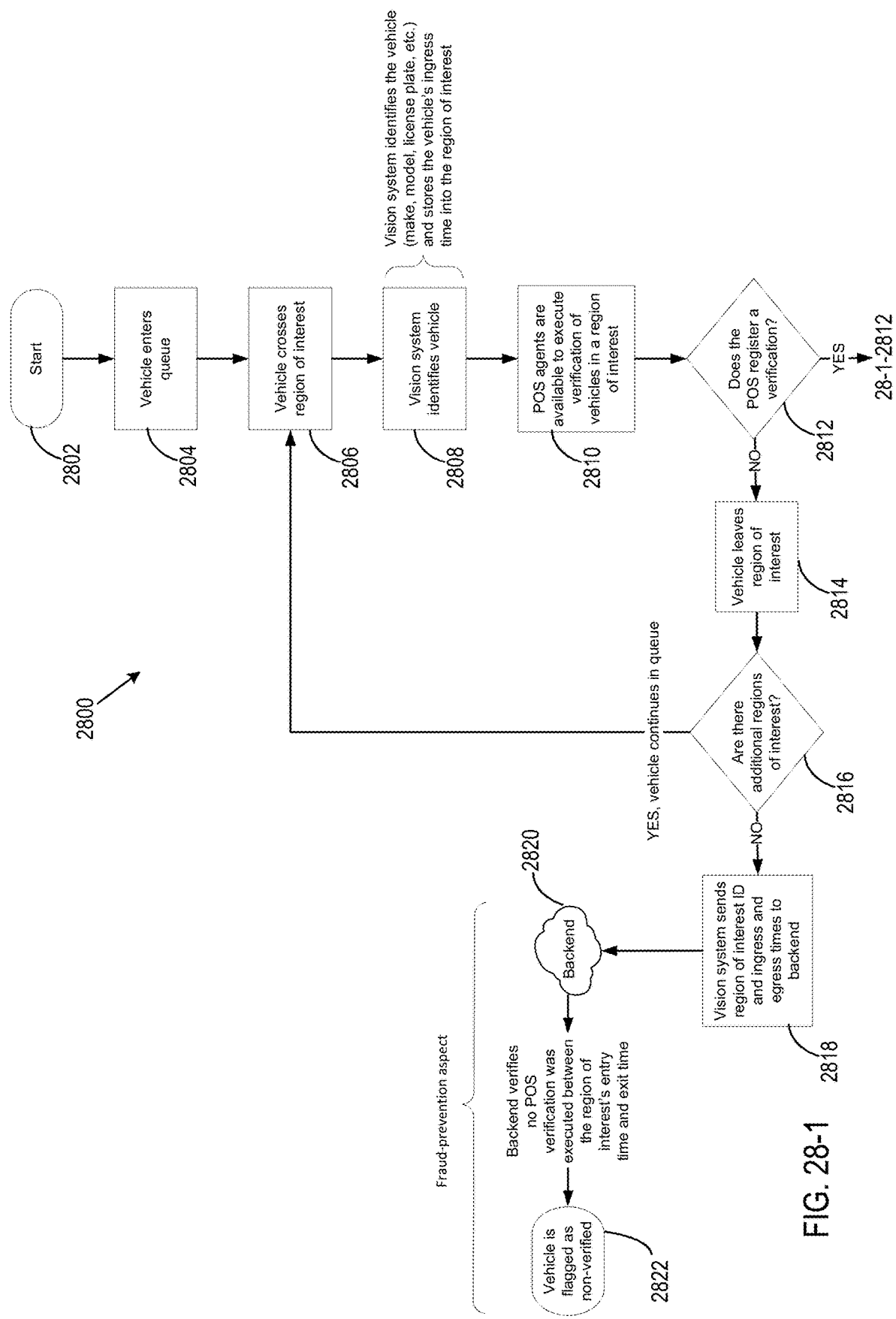
Figures 2, 28:
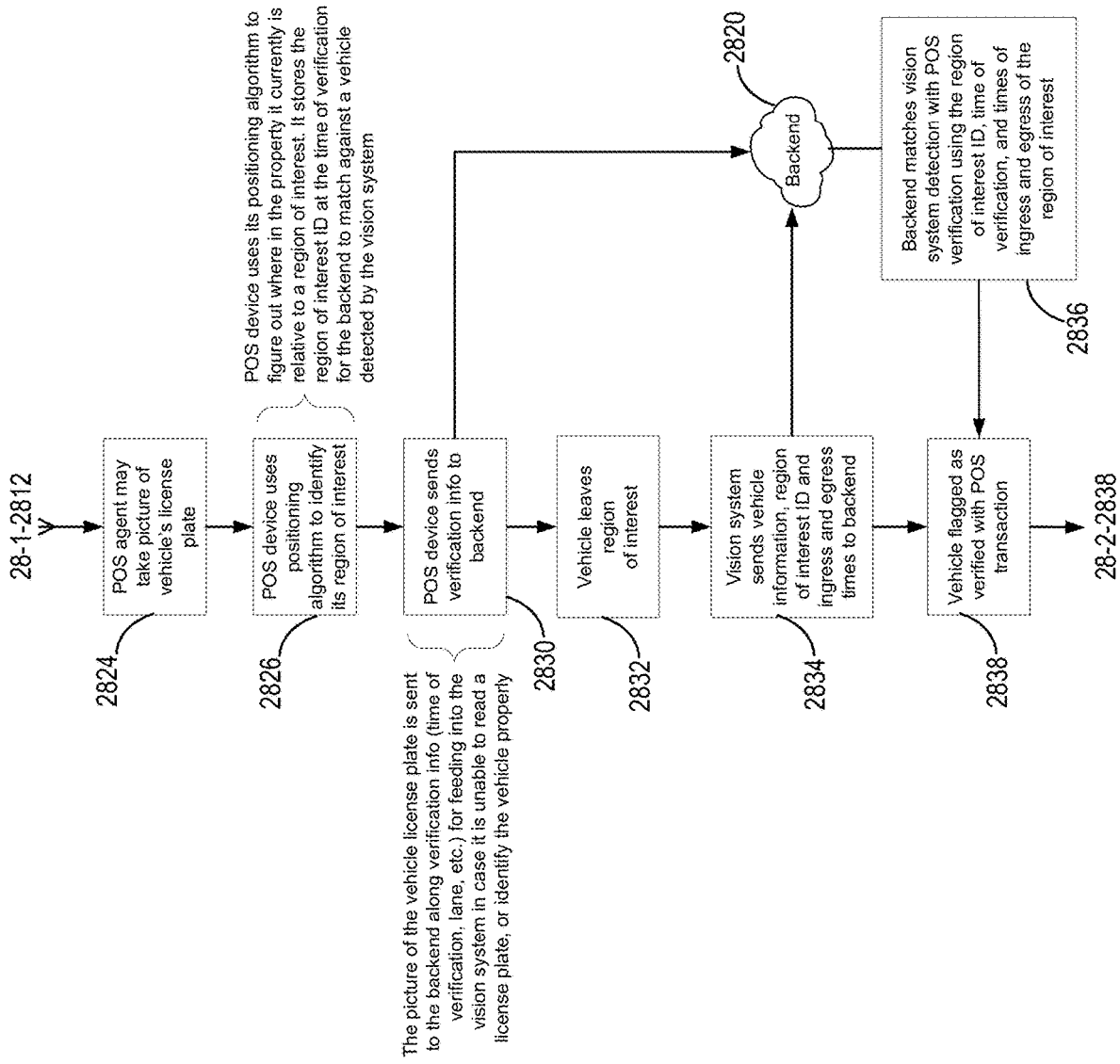
Figures 3, 28:
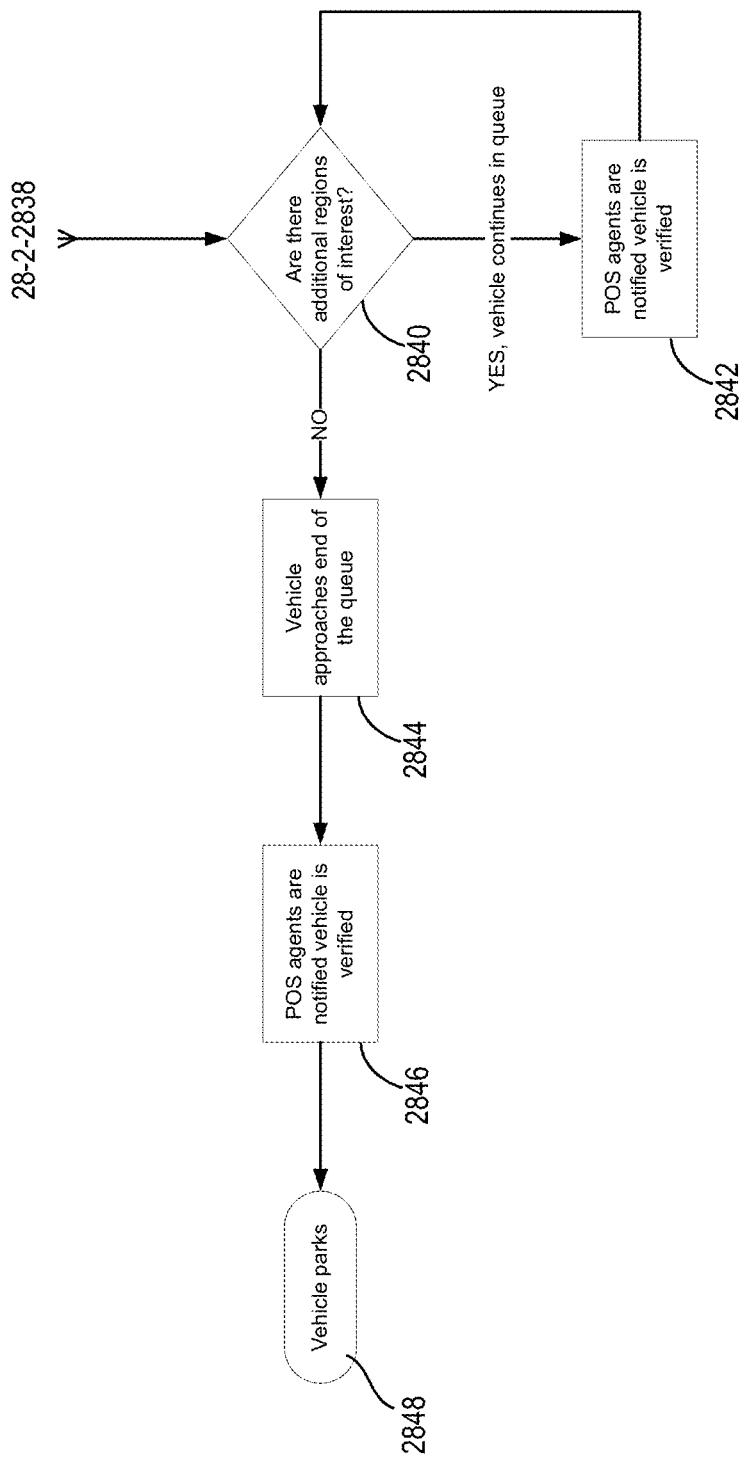

When the user selects the VIP list transaction button of Screen C, which is an image of the letters "VIP", Screen F shown in FIG. 27-3 is produced. Screen F shows a list of names of very important people (VIPs) or individuals who are exempt from paying for parking within the garage or lot that is displayed on the screen of POS device 450. A user may select the particular VIP customer from the list to register or authorize the transaction in the parking management system, and the screen automatically reverts to the transaction Screen C, ready for a next transaction.

When a user selects the exempt transaction button of Screen C, which is an image of a crossed-out dollar sign, Screen G shown in FIG. 29-3 is produced. Screen G shows a list individuals who are exempt from paying for parking within the garage or lot that is displayed on the screen of POS device 450. The list may include individuals such as employees of the garage or lot, employees of certain businesses, executives, individuals with a permit or prepaid pass, or guests. A malfunction entry is also provided within the list in case a customer is to be provided with fee-free parking because of an error with POS device 450 or parking management system. A user may select an entry from the list to register or authorize the transaction in the parking management system, and the screen automatically reverts to the transaction Screen C, ready for a next transaction.

When a user selects the status button of Screen C, which is an image of a downward arrow toward the bottom of the screen, Screen H shown in FIG. 29-3 is produced. Screen H allows a user to view a tally of his or her performance at any time during a shift. The user views a tally by interacting with a Tally button or by interacting with a Checkout button to check out of his or her shift. If the user selects the Tally button, Screen I of FIG. 27-4 is produced. Screen I displays information regarding the tally of various transaction types performed by the user on POS device 450. The tally shows the dollar amount of cash transactions and the number of credit card, scan, beacon, VIP, and exempt transactions. The beacon transactions are for transactions recorded by POS device 450 interacting with beacons of associated vehicles during the user's shift. These transactions include parking management system beacon-activated passes. After a parking management system passholder's vehicle moves past the attendant, POS device 450 connects with the passholder's smart device, registers the pass, and indicates the passholder's vehicle is authorized to enter and park. Alternatively, the attendant can view the activated pass shown on the passholder's smart device display screen and tap the Beacon button presented at Screen I of POS device 450 to register a beacon pass. During the user's shift, all of his or her transaction tally, together with its associated information, is captured in the parking management system and is accessible by a parking manager in real time. The parking manager can also see and record in real time a location of the attendant and his or her relocation to a different gate, lane, or both, of the garage or parking lot, and the associated (corresponding) transactions. Screen I also includes located at the bottom of the screen a "back" button which, when interacted with, produces Screen H. Screen H also includes located at the bottom of the screen a "back" button, which, when interacted with, produces Screen C.

If the user selects the Checkout button of Screen H, Screen J of FIG. 29-4 is produced. Screen J allows a user to enter a passcode and select a confirmation "check mark" button to check out of the shift. The user may alternatively cancel check out by pressing the "back" button displayed at the bottom of the screen, returning POS device 450 to screen H. Screen K of FIG. 29-4 shows a screen of POS device 450 after a user has successfully checked out of the shift at Screen J. The user may log back into POS device 450 device by selecting the log in button of Screen K, which brings POS device 450 back to screen A.

It should be noted that the fee for parking is automatically configured based on one or more of the day, location of the attendant (e.g., different lanes, garages, lots, or venues), time of the day, and type of event, using the systems described herein.

Another concept of the present disclosure relates to the issuance of permitting for parking spaces. For example, residential properties may have a limited number of visitor parking spaces for their tenants. To create adequate parking space availability for visitors, a property owner may have to limit the period and amount of parking duration in such spaces, verify the purpose of parking in the spaces, verify a relationship between a visitor to occupy a space and the property or its tenants, and monitor the parked vehicles for violations to prevent non-authorized parking. This type of situation may also occur for other types of municipal and commercial properties such as, for example, multifamily residential properties, neighborhoods, universities, hospitals, shared garage and parking lots, airports, and companies.

To achieve parking compliance, some properties and municipalities require that a visitor attempting to park a vehicle acquire a parking permit in advance or at the time of visit (e.g., on demand). The visitor then displays the permit in the vehicle for inspection and enforcement.

There exist methods of purchasing and registering a vehicle in advance or on demand for parking in a designated area. However, when it comes to registering or providing a permit for a vehicle in advance or on demand by a third party, such as a tenant, by an administrator who knows neither one nor both of a driver's identity and vehicle information (such as the license plate), the process becomes cumbersome, delayed, or sometimes impossible to carry out. Accordingly, the permit invitation techniques described below provide one or both of registration and payment in advance or on demand for parking of a vehicle of a third party ("invitee"), and without an inviter's knowledge about the invitee, the vehicle, or both.

Figure 30:
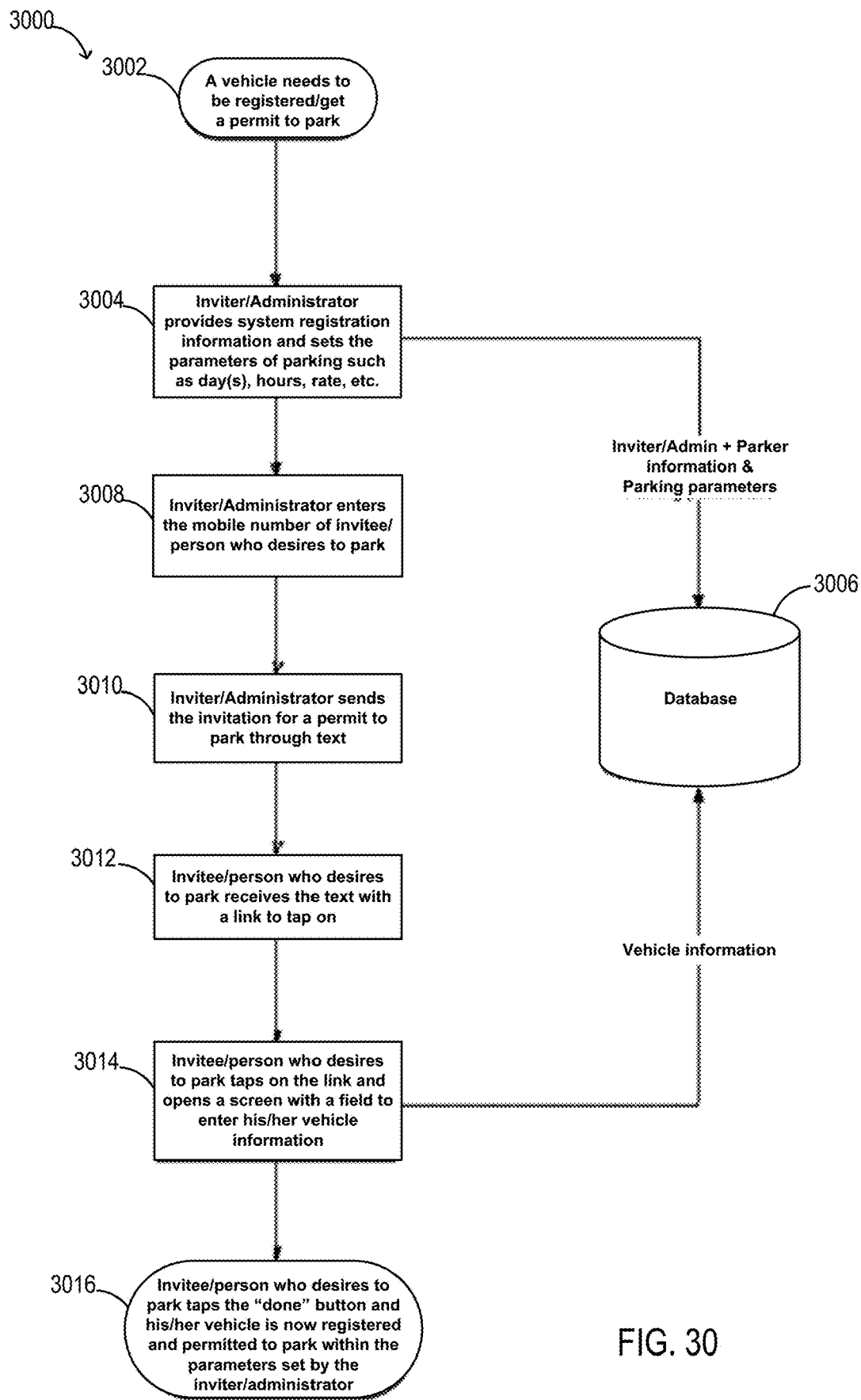
FIG. 30 is an annotated flow diagram showing a parking permit invitation and registration process.

FIG. 30 shows an embodiment implementing a process 3000 for parking permit invitation and registration. Process 3000 may be implemented using the systems operating in association with a backend server, such as backend server 70 (FIG. 4), via an App of a smartphone or mobile device, as described herein.

Block 3002 indicates a user's need to register or get a permit for parking a vehicle at, for example, a particular parking space or parking facility. A user is also referred to herein as an invitee or requester. At process block 3004, an inviter or administrator for a particular parking space (e.g., a parking facility operator or owner) provides to the system registration information such as the parking facility, owner, number of available spaces, space names, payment information if the inviter chooses to pay for the vehicle parking space reserved for the invitee. The inviter or administrator sets parameters for parking, such as a location available for parking (e.g., particular spaces in a facility), date of available parking, and available parking duration. The parameters may also include the rate or fee required for parking, as well as requirements for user payment in advance of the parking date and via a particular mobile app, website, or payment system. The inviter or administrator provides the parking facility information, parameters, and user payment instructions from an Internet-connected device through, for example, a mobile app or website to a database 3006 for storage. Database 3006 may be implemented as one or more of servers 70, for example.

At process block 3008, the inviter or administrator receives a mobile phone number or email address of the invitee desiring to park and, in response, provides, e.g., via a smartphone, to the system the invitee's number or address information. The inviter or administrator in turn, at process block 3010, sends to the invitee an electronic message, such as a text or an email message, including a link to a website page or an application screen. At process block 3012, the invitee receives the message with the link. At process block 3014, the invitee interacts with the link (e.g., by tapping on the link) to display to the invitee the website page or application screen via a smartphone or computer. The invitee's Internet-connected device needs no App operating to interact with the link to respond to it. For example, the invitee could scan a QR Code in response to a text message. The invitee desiring to park provides via the website page or application screen additional parker information, updated vehicle information, or new vehicle information about the vehicle that is to park. The invitee may also provide payment information (e.g., credit card number and expiration date). The information is transmitted from the invitee's smartphone or mobile device to database 3006, where it is consolidated in the backend server and the vehicle is registered. Block 3016 indicates that, upon completion of the foregoing method steps, the invitee desiring to park is registered and issued a permit. Based on the flexibility of the parameters, if there is any change in the vehicle information, driver or invitee information, or any other information used to obtain a permit for the invitee, the system allows for modification of the stored information in database 3006 at the start time of and during the parking session. The changes are reflected on the registration, the permit, or both, for monitoring and enforcement. The invitee and vehicle information uploaded by the invitee to, and stored in, database 3006 is not made available to the inviter or administrator, thereby making the invitation process convenient to the inviter and affording confidentiality of the invitee and of vehicle and payment information in carrying out process 3000.

Figures 1, 31:
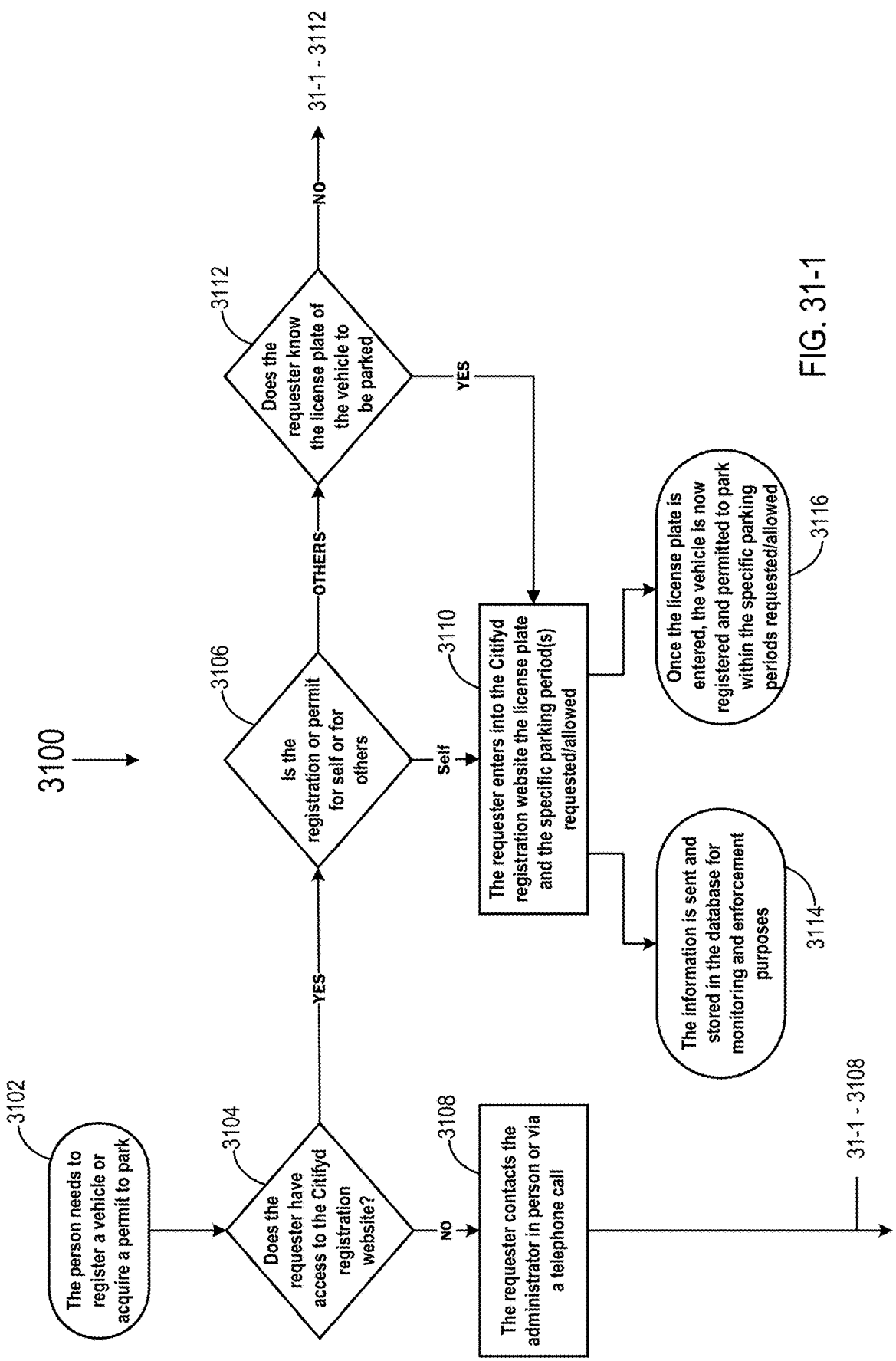
Figures 2, 31:
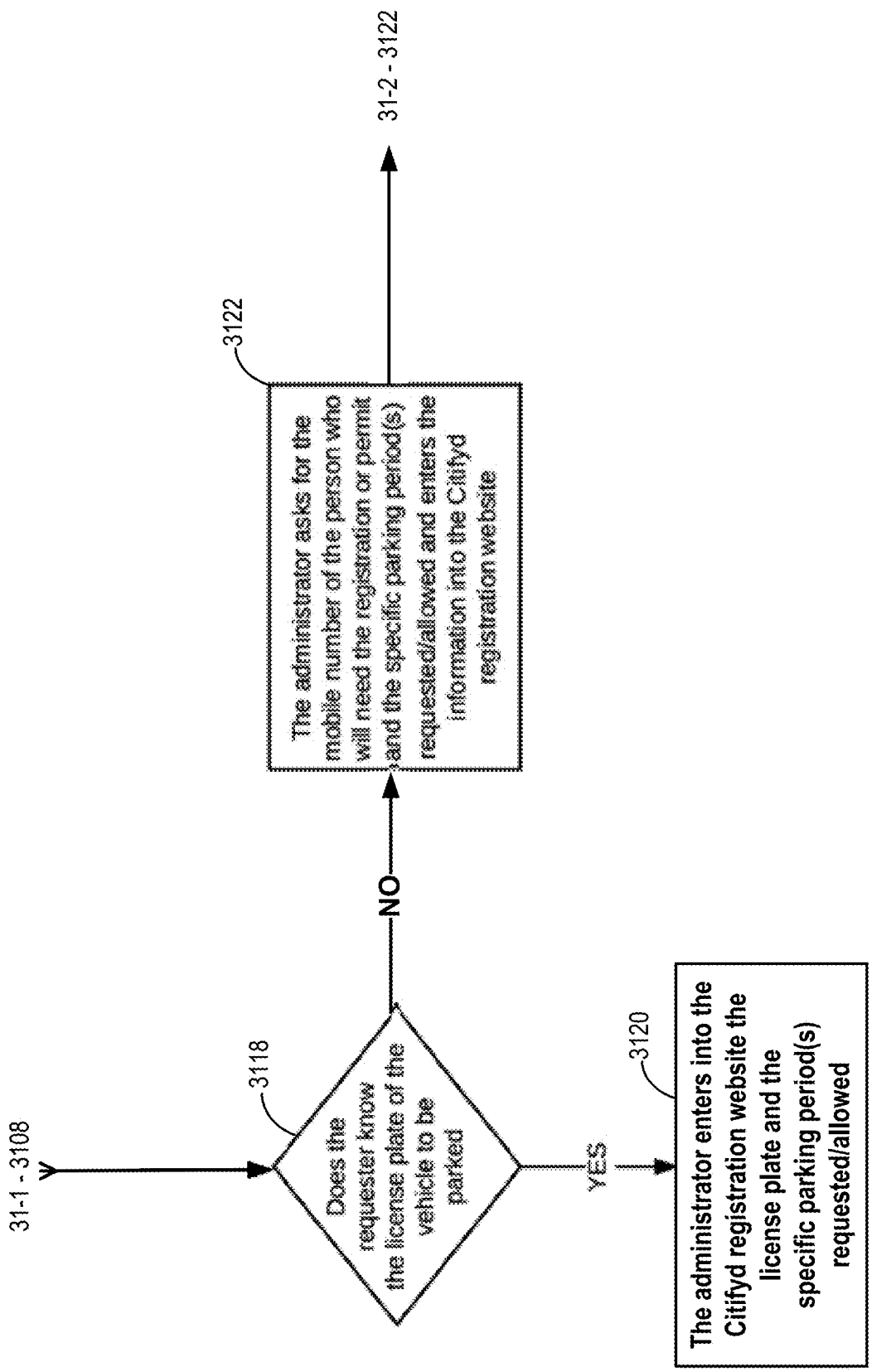
Figures 3, 31:
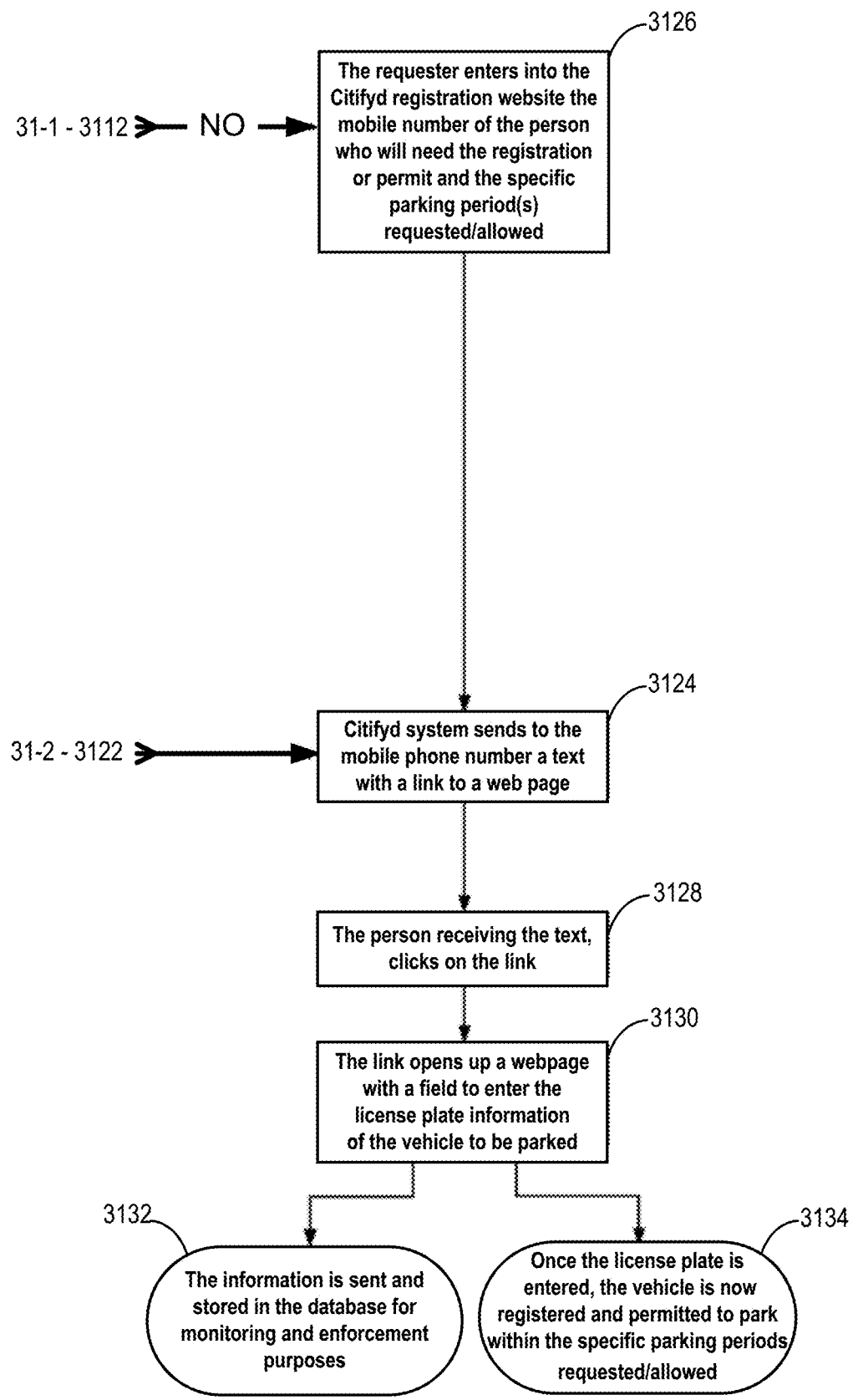

FIG. 31, which is divided into three FIGS. 31-1, 31-2, and 31-3, shows a detailed process flow 3100, presenting further details of process 3000 in FIG. 30.

Block 3102 indicates an invitee's need to register or get a permit for parking, for example, at a particular parking space or parking facility. At decision block 3104, a determination is made as to whether the invitee has access to a parking management (e.g., Citifyd, the administrator of the Citifyd App) registration website. If the invitee has access, the process continues to decision block 3106. If the invitee does not have access, the process continues as follows to process block 3108. At process block 3108, the invitee requesting a parking permit contacts a permit inviter or an administrator to register, and the process continues to decision block 3118 of FIG. 31-2. At decision block 3118, the invitee is asked whether he or she knows the license plate number of the vehicle to be parked. If the answer is YES, the process continues to process block 3120, in which the administrator or inviter enters into the Citifyd system parking management registration website the license plate number and the parking periods (e.g., date, time, or combination of both) desired for parking the vehicle. The user may provide additional parker information, updated vehicle information, or new vehicle information for the vehicle that is to park, as well as payment information (e.g., credit card number and expiration date). If the answer is NO, then the process continues to process block 3122, in which the administrator or inviter obtains and enters into the Citifyd system parking management registration website the mobile phone number or email address of the invitee needing the registration or permit and the requested parking period. The process then continues to process block 3124 of FIG. 31-3.

With reference again to FIG. 31-1, at decision block 3106, a determination is made as to whether the registration or permit of parking a vehicle is for the invitee himself or herself or for somebody else. If the registration is for the invitee himself or herself, the process continues to process block 3110. If the registration is for somebody else, the process continues to decision block 3112.

At process block 3110, the invitee enters into the Citifyd system parking management registration website the license plate and parking periods (e.g., date, time, or combination of both) desired for parking the vehicle. At block 3114, the entered license plate and parking period information is stored in database 3006 (FIG. 30) for monitoring and enforcement purposes. The invitee may provide via the website page or application screen additional parker information, updated vehicle information, or new vehicle information about the vehicle that is to park, as well as payment information (e.g., credit card number and expiration date). At block 3116, the vehicle is registered and permitted to park within the specific parking periods requested and allowed by the inviter, subject to any changes made during the parking session.

At decision block 3112, the invitee is asked whether he or she knows the license plate number of the vehicle to be parked. If the answer is YES, the process continues to process block 3110, discussed above. If the answer is NO, the process continues to process block 3126 of FIG. 31-3.

With reference again to FIG. 31-3, at process block 3126, the invitee enters into the Citifyd system parking management registration website the mobile phone number or email address of the person needing the registration or permit and the requested parking period (e.g., date, time, or combination of both). The process continues to process block 3124, in which the parking management system sends a message (e.g., a text or an email message) to one or both of the phone number and email address entered by the administrator or inviter at process block 3120. The message includes a link to a webpage for the invitee to enter vehicle information for a vehicle to be parked. At process block 3128, the recipient of the text or email message interacts with (e.g., taps or clicks) the link, and at process block 3130, the link opens a webpage or application screen having a field in which information about a vehicle to be parked can be entered. The information includes license plate information. At block 3132, the information is sent and stored in database 3006 (FIG. 30) for monitoring and enforcement purposes. The invitee may provide via the website page or application screen additional parker information, updated vehicle information, or new vehicle information about the vehicle that is to park, as well as payment information (e.g., credit card number and expiration date). At block 3134 the vehicle is registered and permitted to park within the requested time period.

If there is any change in the vehicle information, driver or user information, or any other information used to obtain a permit for the invitee, the system allows for modification of the information up until the end time of the parking session. The changes are reflected on one or both of the registration and permit for monitoring and enforcement.

The ability to make changes to vehicle information is especially advantageous when the disclosed method is practiced in commercial parking permit management of a multi-tenant single parking lot having a fixed block of parking spaces. A parking administrator can control a fixed number of parking spaces shared among a group of registered residents by managing the invitees and their desired parking arrival times and durations. For example, a tenant having access to an apartment manager's website can schedule a parking permit for the arrival time and duration of a plumber or other service provider carrying out an episodic service activity.

Skilled persons will appreciate that many changes may be made to the details of the above-described embodiments without departing from the underlying principles of the invention. For example, skilled persons will appreciate that JavaScript functions may be performed server- or device-side, and results thereof readily exchanged wirelessly between a server and smartphone 36. The scope of the present invention should, therefore, be determined only by the following claims.

The invention claimed is:

1. A parking management system, comprising:
 a beacon configured to broadcast a short-range wireless radio signal from a location of a parking facility associated with a lane of an access region of the parking facility, the beacon configured to establish, on a short-range wireless communication link, connectivity with a point of sale (POS) device when in proximity with the POS device;
 a mobile application provided to and operating on the POS device to accept and record vehicle parking transactions for vehicle parking within the parking facility, the POS device assigned to a parking attendant;
 a counting device spatially associated with the parking facility and configured to determine a count of vehicles entering or exiting the parking facility via the lane of the access region; and
 a backend server in communication with the POS device through a first wireless communication link and the counting device through a second wireless communication link, the backend server executing a live inventory and management engine (LIME) to determine an expected tally of vehicle parking transactions using the determined count of vehicles entering or exiting the parking facility via the lane of the access region, the LIME further determining that the POS device is recording the vehicle parking transactions for the vehicles entering or exiting the parking facility via the lane of the access region of the parking facility when the beacon is in proximity with the POS device, receiving from the POS device the recorded vehicle parking transactions for vehicle parking within the parking facility, and comparing the expected tally of vehicle parking transactions to the vehicle parking transactions recorded by the POS device for vehicle parking within the parking facility to analyze whether a difference exists between the expected tally of and the recorded vehicle parking transactions.

2. The system of claim 1, in which the counting device comprises a camera, the camera having a field of view in which vehicles entering or exiting the parking facility via the lane of the access region are identified and counted.

3. The system of claim 2, further comprising a beam source producing a light beam propagating across the lane of the access region, and in which instances of vehicles entering or exiting the parking facility via the lane of the access region and interfering with the light beam represent vehicle counts for use in cross-referencing with the count of vehicles determined by the camera to enhance vehicle counting accuracy.

4. The system of claim 1, in which:
the counting device comprises first and second light sources producing respective first and second spaced-apart light beams propagating across the lane of the access region;
instances of vehicles entering or exiting the parking facility via the lane of the access region and interfering with the first and second light beams represent vehicle counts; and
for each instance of interference representing a vehicle count, a direction of travel of the vehicle counted is determined by order of the interference with the first and second light beams.

5. The system of claim 1, in which the counting device comprises a magnetic loop system that includes a magnetic layer embedded in and transversely crossing the lane of the access region, and in which instances of vehicles entering or exiting the parking facility via the lane of the access region that interrupt a magnetic field emanating from the magnetic layer and gaps of time between the interruptions determine the count of vehicles.

6. The system of claim 1, in which:
the counting device comprises first and second magnetic sensors positioned within the lane of the access region;
instances of vehicles entering or exiting the parking facility via the lane of the access region and detected by the first and second magnetic sensors represent vehicle counts; and
for each instance of detection representing a vehicle count, a direction of travel of the vehicle counted is determined by order of the detection by the first and second magnetic sensors.

7. The system of claim 1, in which the expected tally of vehicle parking transactions and the recorded vehicle parking transactions are displayable by a software application executing a dashboard on a computing device of a parking operation manager.

8. The system of claim 1, in which the LIME is configured to determine an entrance load factor using the count of vehicles entering the parking facility via the lane of the access region, the entrance load factor reflecting a rate at which vehicles enter the parking facility via the lane of the access region.

9. The system of claim 8, in which, when the entrance load factor is above a predetermined threshold, the LIME determines that one or more additional parking attendants should be assigned to service the lane of the access region and notifies a computing device associated with a parking operation manager.

10. The system of claim 1, in which the vehicles entering the parking facility are arranged in a queue along the lane of the access region, the lane of the access region includes an access barrier to the parking facility, and the POS device is a first device and the attendant to which the first POS device is assigned is a first attendant who is stationed at a location in proximity to the access barrier at the end of the queue, and further comprising:
a second POS device to which a second attendant is assigned and stationed along the queue of vehicles at a location a distance away from the access barrier; and
a set of machine-readable information-carrying objects prepared for provision to the second attendant, the machine-readable information-carrying objects intended for delivery by the second attendant to vehicle parkers in the queue and for presentation for reading by the first POS device assigned to the first attendant stationed at the end of the queue, a failure of a vehicle parker of any one of the vehicles in the queue to present for reading the information-carrying object representing a non-verified, possibly fraudulent transaction.

11. The system of claim 10, in which machine-readable information-carrying objects are media on which barcodes are printed.

12. The system of claim 11, in which the barcode is a matrix barcode and the first POS device scans the matrix barcode to read it.

13. A method of reserving by an inviter, for benefit of an invitee, a parking space to park a vehicle operated by the invitee, the invitee including a requester, or the requester's delegate, for permission to park a vehicle in a parking space available in a parking area affiliated with the inviter, and the inviter desiring to reserve for the invitee the vehicle parking space, without making available to the inviter, invitee vehicle information obtained to reserve the parking space for monitoring purposes, comprising:
storing, in a database associated with a platform server, an inviter's registration information and parking session parameters sent by the inviter from an Internet-connected device, the parking session parameters including location of a vehicle parking area and date and time of permitted use by an invitee of a vehicle parking space in a vehicle parking area affiliated with the inviter;
the platform server receiving, from a mobile device associated with the invitee, the invitee's vehicle information in response to an electronic message sent from the platform server to the invitee's mobile device, the electronic message communicating from the inviter an invitation to park a vehicle in accordance with the parking session parameters;
consolidating on the platform server the inviter's registration information and parking session parameters and the invitee's vehicle information; and
issuing, from the platform server to the invitee's mobile device, registration of the vehicle, a parking permit, or both, to reserve the vehicle parking space for the invitee.

14. The method of claim 13, in which the invitee's vehicle information received by the platform server originates from invitee actuation of a web screen made accessible in response to a link provided in the electronic message sent to the invitee's mobile device.

15. The method of claim 14, in which the electronic message is a text message.

16. The method of claim 14, in which the electronic message is an email message.

17. The method of claim 14, in which the electronic message providing the link originates from a website associated with the platform server.

18. The method of claim 14, in which the electronic message providing the link originates from a parking management registration website.

19. The method of claim 13, further comprising changing, by the platform server, one or both of the vehicle registration and the parking permit in response to the invitee's mobile device communicating to the platform server a modification of the invitee vehicle information, the communication of a modification taking place no later than an end date and time of permitted use.

20. The method of claim 13, further comprising storing, in the database associated with the platform server, payment information of the inviter paying for the vehicle parking space reserved for the invitee.

21. The method of claim 13, in which the platform server delivers the electronic message to a contact number assigned to the invitee's mobile device.

22. The method of claim 13, in which the parking session parameters include a requirement for invitee payment in advance of the date of permitted use.

\* \* \* \* \*